United States Patent
Wada et al.

(10) Patent No.: US 7,265,905 B2
(45) Date of Patent: Sep. 4, 2007

(54) OPTICAL FILTER AND OPTICAL INSTRUMENT

(75) Inventors: Yorio Wada, Hanno (JP); Ken Kawamata, Tokyo (JP); Nobuyoshi Toyohara, Sagamihara (JP); Yoshiki Shinta, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/649,045

(22) Filed: Jan. 2, 2007

(65) Prior Publication Data

US 2007/0109648 A1    May 17, 2007

Related U.S. Application Data

(62) Division of application No. 10/917,479, filed on Aug. 13, 2004, now Pat. No. 7,193,780.

(30) Foreign Application Priority Data

| Aug. 22, 2003 | (JP) | ............................ P2003-299224 |
| Aug. 22, 2003 | (JP) | ............................ P2003-299225 |
| Aug. 22, 2003 | (JP) | ............................ P2003-299226 |
| Oct. 14, 2003 | (JP) | ............................ P2003-354027 |

(51) Int. Cl.
    *G02B 1/10* (2006.01)

(52) U.S. Cl. .................. 359/586; 359/584; 359/588; 359/589

(58) Field of Classification Search ................ 359/580, 359/584, 586, 588, 589
See application file for complete search history.

(56) References Cited

U.S. PATENT DOCUMENTS 5,828,489 A * 10/1998 Johnson et al. ............. 359/487

(Continued)

FOREIGN PATENT DOCUMENTS

EP    0 967 496    12/1999

(Continued)

OTHER PUBLICATIONS

W.H.Southwell, Using apodization functions to reduce sidelobes in rugate filters, Applied Optics, 28(23), pp. 5091-5094 (Dec. 1, 1989).*

(Continued)

*Primary Examiner*—Leonidas Boutsikaris
(74) *Attorney, Agent, or Firm*—Kenyon & Kenyon LLP

(57) ABSTRACT

In an optical filter, a thin film is formed by laminating low refractive index layers alternatingly from a substrate side with high refractive index layers. The thin film is provided with first, second, and third laminated portions. In the first laminated portion, the refractive indices of the high refractive index layers become gradually higher. In the second laminated portion, the refractive indices of the high refractive index layers are substantially equal to the highest refractive index of the high refractive index layers constituting the first laminated portion. In the third laminated portion, the refractive indices of the high refractive index layers become gradually lower, and the refractive indices of the low refractive index layers are substantially equal to the lowest refractive index of the low refractive index layers constituting the second laminated portion. The low refractive index layers of the first and second laminated portions have a low refractive index layer uniform portion or a low refractive index layer decreasing portion.

4 Claims, 38 Drawing Sheets

U.S. PATENT DOCUMENTS 6,115,180 A * 9/2000 Hirai et al. .................. 359/586
2003/0002157 A1 * 1/2003 Someno ....................... 359/586

FOREIGN PATENT DOCUMENTS

JP             61-19962        5/1986

OTHER PUBLICATIONS

X.Wang et al., "Design and experimental approach of optical reflection filters with graded refractive index profiles", J. Vac. Sci. Technol. A 17(1), pp. 206-211 (Jan./Feb. 1999).*

William H. Southwell: Using anodization functions to reduce sidelobes in rugate filters, Applied Optics, Dec. 1, 1989, vol. 28, No. 23, pp. 5091-5094.

P.G. Verly, et al.: Synthesis of high rejection filters with the Fourier transform method, Applied Optics, vol. 28, No. 14, Jul. 15, 1989, pp. 2864-2875.

Handbook of Optics, Second Edition, vol. 1, Fundamentals, Techniques, and Design, Optical Society of America-McGraw-Hill Inc., 1995, pp. 42.49-42.60.

Bertrand G. Bovard: "Rugate Filter Design: The Modified Fourier Transform Technique" Applied Optics, Optical Society of America, Washington, US, vol. 29, No. 1. Jan. 1990.

X. Wang et al.: Design and experimental approach of optical reflection filters with graded refractive index profiles J. Vac. Sci. Technol., vol. 17, No. 1, Jan. 1999, pp. 206-211.

Qu Tang et al.: "Fabrication and characteristics of rugate filters deposited by the TSH reactive sputtering method", J. Vac. Sci. Technol., vol. 16, No. 6, Nov. 1998 pp. 3384-3388.

Qu Tang et al.: "Fabrication and chracterisitics of rugate filters deposited by the TSH reactive sputtering method", J. Vac. Sci. Technol., vol. 16, No. 6, Nov. 1998 pp. 3384-3388.

T.D. Rahmlow, Jr. and J.E. Lazo-Wasem, "Rugate and discrete hybrid filter designs", Jan. 1997, SPIE, vol. 3133, pp. 25-35.

H.A. Abu-Safia et al., "Rugate filter sidelobe suppression using half-apodization", Sep. 1, 1993, Applied Optics, vol. 32 No. 25, pp. 4831-4835.

B.G. Bovard, "Derivation of a matrix describing a rugate dielectric thin film", May 15, 1988, Applied Optics, vol. 27 No. 10, pp. 1998-2005.

* cited by examiner

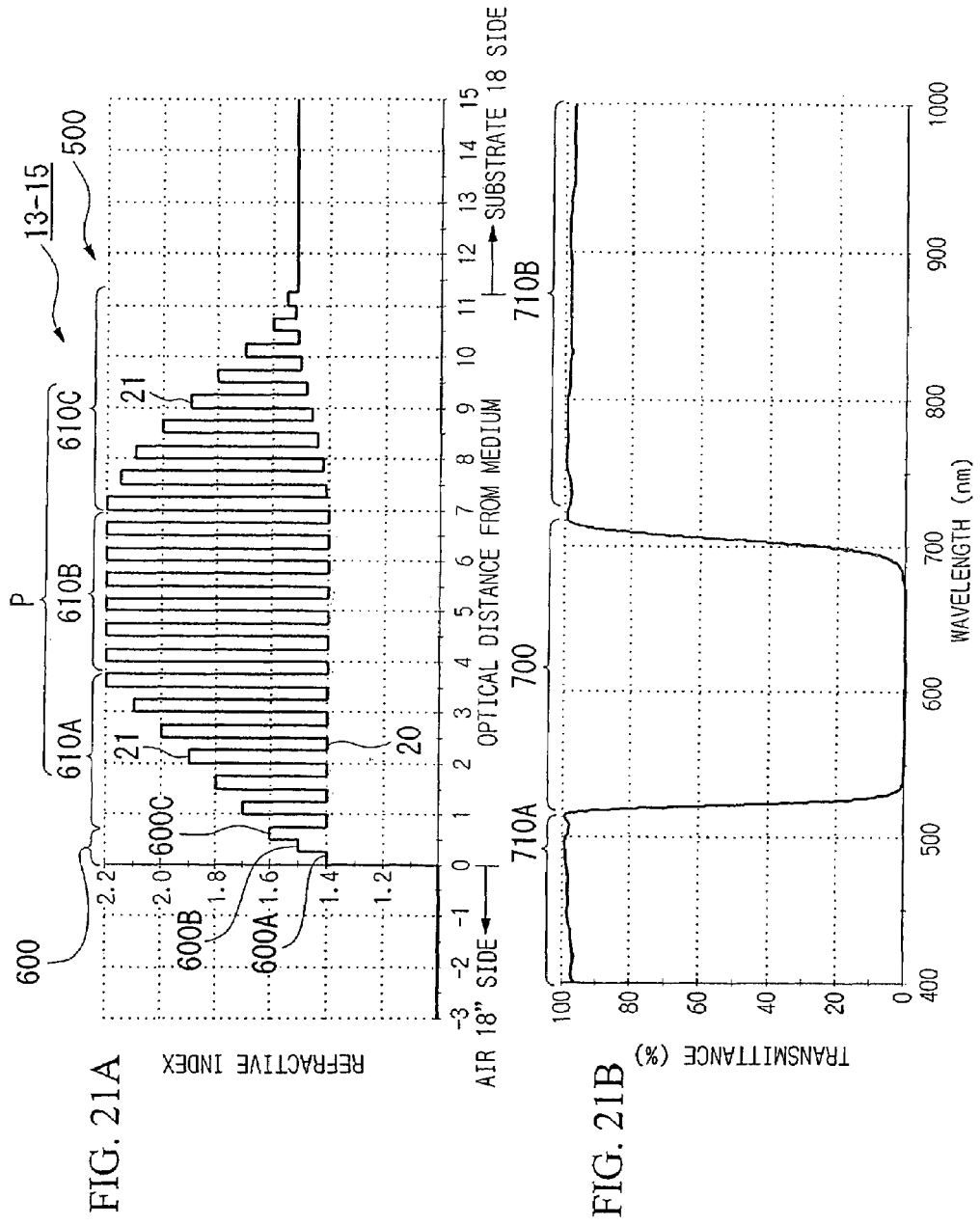

OPTICAL FILTER AND OPTICAL INSTRUMENT

RELATED APPLICATION INFORMATION

This application is a divisional application of prior U.S. application Ser. No. 10/917,479 filed Aug. 13, 2004, now U.S. Pat. No. 7,193,780 which claims priority to Japanese Patent Application No. 2003-299224, filed Aug. 22, 2003, Japanese Patent Application No. 2003-299225, filed Aug. 22, 2003, Japanese Patent Application No. 2003-299226, filed Aug. 22, 2003, and Japanese Patent Application No. 2003-354027, filed Oct. 14, 2003, the contents of each of which are incorporated herein by reference.

BACKGROUND OF THE INVENTION

1. Field of the Invention

The present invention relates to an optical filter and optical instrument.

2. Description of Related Art

A fluorescence microscope, which is an optical instrument used when observing biological specimens, is able to analyze the structure and nature of a specimen, such as a cell that has been treated with dye, by observing fluorescent light emitted by the specimen when excitation light is irradiated thereon.

In order to perform the latest genomic analysis, there is a need to observe, for example, both fluorescent light having a peak at 526 nm and excitation light having a wavelength of 502 nm. In this case, because the wavelength of the excitation light is close to the wavelength of the fluorescent light, in order for the fluorescent light to be more efficiently detected, an optical filter that cuts out the excitation light using a stopband and that allows light of the fluorescent light observation wavelength to pass through using a transmission band is used as an extremely important key part in order to determine the sensitivity and accuracy of the fluorescent light measurement.

In this optical filter, properties that permit a sharp rise in the spectral characteristics at boundaries between transmission bands and stopbands, and that also allow substantially 100% of light to be transmitted in the transmission band are demanded. Furthermore, in the transmission band, it is desirable that there are no cyclic variations (i.e., ripples) in the transmittance in response to increases or decreases in the wavelength.

A minus filter, which is an optical filter that cuts out light in a predetermined wavelength band and allows light of other wavelengths to pass through in this manner, is manufactured, as is shown in FIG. 33A, using a multi-layer film in which layers having a high refractive index and layers having a low refractive index are laminated alternatingly on a substrate. Here, the horizontal axis shows the optical thickness while the vertical axis shows the film refractive index. In addition, in FIG. 33B the relationship between the transmittance and the wavelength of light that passes through a film during construction of the film is shown as a spectral characteristic. Here, the optical thickness is determined by multiplying the physical thickness of the film by the index of the film.

The optical filter is able to make the rise at boundaries between transmission bands and stopbands sharper as the number of the aforementioned layers is increased. However, the problem arises that as the number of layers is increased, the ripples in the transmission bands also increase. Moreover, as is shown in FIG. 34A, it is possible to design a film in which ripples are reduced by changing the optical thickness of each layer, however, as is shown in FIG. 34B, it is difficult to do away with ripples completely.

In contrast to this, as is shown in FIG. 35A, if the refractive index of the film is changed cyclically and continuously in the optical thickness direction such that the refractive index distribution thereof is formed into what is known as a "wavelet" configuration, then, as is shown in FIG. 35B, it is possible to fundamentally do away with ripples in the transmission band. Moreover, for example, as is shown in FIG. 36A, FIG. 36B, FIG. 37A, FIG. 37A, FIG. 38A, and FIG. 38A, various types of structures have been proposed in which a continuous refractive index distribution is divided into stages and approximated.

SUMMARY OF THE INVENTION

The present invention is an optical filter formed by a substrate and a thin film that is formed on the substrate, wherein the thin film is formed by laminating low refractive index layers whose refractive index is relatively low alternatingly from the substrate side with high refractive index layers whose refractive index is relatively high, and wherein the thin film is provided with a first laminated portion, a second laminated portion that is adjacent to this first laminated portion, and a third laminated portion that adjacent to this second laminated portion, and wherein in the first laminated portion, the refractive indices of the high refractive index layers becomes gradually higher approaching the substrate, in the second laminated portion, the refractive indices of the high refractive index layers are substantially equal to the highest refractive index of the high refractive index layers constituting the first laminated portion, and in the third laminated portion, the refractive indices of the high refractive index layers become gradually lower from the second laminated portion side, and the refractive indices of the low refractive index layers are substantially equal to the lowest refractive index of the low refractive index layers constituting the second laminated portion, and wherein the low refractive index layers of the first and second laminated portions have at least one of a low refractive index layer uniform portion in which the refractive indices are substantially uniform, or a low refractive index layer decreasing portion in which the refractive indices become gradually lower approaching the substrate.

The present invention is an optical filter formed by a substrate and a thin film that is formed on the substrate, wherein the thin film is formed by laminating low refractive index layers whose refractive index is relatively low alternatingly from the substrate side with high refractive index layers whose refractive index is relatively high, and wherein the thin film is provided with a first laminated portion, a second laminated portion that is adjacent to this first laminated portion, a third laminated portion that is adjacent to this second laminated portion, and a fourth laminated portion that is adjacent to this third laminated portion, and wherein in the first laminated portion, the refractive indices of the high refractive index layers becomes gradually higher approaching the substrate, and the refractive indices of the low refractive index layers become gradually lower approaching the substrate, in the second laminated portion, the refractive indices of the high refractive index layers become gradually higher from the highest refractive index of the high refractive index layers constituting the first laminated portion, and the refractive indices of the low refractive index layers are substantially equal to the lowest refractive index of the low refractive index layers constituting the first laminated portion, in the third laminated portion, the refractive indices of the high refractive index layers become gradually lower from the highest refractive index of the high refractive index layers constituting the second laminated portion, and the refractive indices of the low refractive index layers are substantially equal to the refractive indices of the low refractive index layers constituting the second laminated portion, and in the fourth laminated portion, the refractive indices of the high refractive index layers become gradually lower from the lowest refractive index of the high refractive index layers constituting the third laminated portion, and the refractive indices of the low refractive index layers become gradually higher from the low refractive index layers constituting the third laminated portion.

The present invention is an optical filter formed by a substrate and a thin film that is formed on the substrate, wherein the thin film is formed by laminating low refractive index layers whose refractive index is relatively low alternatingly from the substrate side with high refractive index layers whose refractive index is relatively high, and wherein the thin film is provided with a first laminated portion, a second laminated portion that is adjacent to the first laminated portion, and a third laminated portion that is adjacent to the second laminated portion, and wherein in the first laminated portion, the refractive indices of the high refractive index layers becomes gradually higher approaching the substrate, in the second laminated portion, the refractive indices of the high refractive index layers are substantially equal to the highest refractive index of the high refractive index layers constituting the first laminated portion, and in the third laminated portion, the refractive indices of the high refractive index layers become gradually lower from the second laminated portion side, and wherein the refractive indices of the low refractive index layers constituting the first through third laminated portions are substantially equal to the refractive index of the substrate, and an absolute value of a refractive index gradient of the high refractive index layers constituting the first laminated portion is different from an absolute value of a refractive index gradient of the high refractive index layers constituting the third laminated portion.

The present invention is an optical filter formed by a substrate and a thin film that is formed on the substrate, wherein the thin film is formed by laminating low refractive index layers whose refractive index is relatively low alternatingly from the substrate side with high refractive index layers whose refractive index is relatively high, and wherein the thin film is provided with a first laminated portion, a second laminated portion that is adjacent to the first laminated portion, and a third laminated portion that is adjacent to the second laminated portion, and wherein in the first laminated portion, the refractive indices of the low refractive index layers become gradually lower approaching the substrate side, in the second laminated portion, the refractive indices of the low refractive index layers are substantially equal to the lowest refractive index of the low refractive index layers constituting the first laminated portion, and in the third laminated portion, the refractive indices of the low refractive index layers become gradually higher from the second laminated portion side, and wherein the refractive indices of the high refractive index layers constituting the first through third laminated portions are substantially equal to the refractive index of the substrate.

The present invention is an optical filter formed by a substrate and a thin film that is formed on the substrate, wherein the thin film is provided with laminated portions having predetermined refractive index profiles, and wherein the refractive index profiles are formed by laminating low refractive index layers whose refractive index is relatively low alternatingly from the substrate side with high refractive index layers whose refractive index is relatively high, and wherein the refractive index profiles are represented by a first laminated portion, a second laminated portion that is laminated on the substrate side of the first laminated portion, and a third laminated portion that is laminated on the substrate side of the second laminated portion, and wherein in the first laminated portion, the refractive indices of the high refractive index layers become gradually higher approaching the substrate side, in the second laminated portion, the refractive indices of the high refractive index layers are substantially equal to the highest refractive index of the high refractive index layers constituting the first laminated portion, and in the third laminated portion, the refractive indices of the high refractive index layers become gradually lower approaching the substrate side, and wherein an optical thickness of the high refractive index layers and an optical thickness of the low refractive index layers are different from each other.

The present invention is an optical filter formed by a substrate and a thin film that is formed on the substrate, wherein the thin film is provided with laminated portions having predetermined refractive index profiles, and wherein the refractive index profiles are formed by laminating low refractive index layers whose refractive index is relatively low alternatingly from the substrate side with high refractive index layers whose refractive index is relatively high, and wherein the refractive index profiles are represented by a first laminated portion and a second laminated portion that is adjacent to the substrate side of the first laminated portion, and wherein in the first laminated portion, the refractive indices of the high refractive index layers become gradually higher approaching the substrate side, and the refractive indices of the low refractive index layers become gradually lower approaching the substrate side, and in the second laminated portion, the refractive indices of the high refractive index layers become gradually lower approaching the substrate side, and the refractive indices of the low refractive index layers become gradually higher approaching the substrate side, and wherein an optical thickness of the high refractive index layers and an optical thickness of the low refractive index layers are different from each other.

The present invention is an optical filter formed by a substrate and a thin film that is formed on the substrate, wherein the thin film is provided with laminated portions having a first refractive index profile and a second refractive index profile, and wherein the first and second refractive index profiles are formed by laminating low refractive index layers whose refractive index is relatively low alternatingly from the substrate side with high refractive index layers whose refractive index is relatively high, and wherein the first refractive index profile and the second refractive index profile are continuous, and wherein each of the first refractive index profile and the second refractive index profile is represented by a first laminated portion, a second laminated portion that is laminated on the substrate side of the first laminated portion, and a third laminated portion that is laminated on the substrate side of the second laminated portion, and wherein in the first laminated portion, the refractive indices of the high refractive index layers become gradually higher approaching the substrate side, in the second laminated portion, the refractive indices of the high refractive index layers are substantially equal to the highest refractive index of the high refractive index layers constituting the first laminated portion, and in the third laminated portion, the refractive indices of the high refractive index layers become gradually lower approaching the substrate side, and wherein at least one of an optical thickness of the high refractive index layers in the first refractive index profile, an optical thickness of the low refractive index layers in the first refractive index profile, an optical thickness of the high refractive index layers in the second refractive index profile, and an optical thickness of the low refractive index layers in the second refractive index profile is different from the others.

The present invention is an optical filter formed by a substrate and a thin film that is formed on the substrate, wherein the thin film is provided with laminated portions having a first refractive index profile and a second refractive index profile, and wherein the first and second refractive index profiles are formed by laminating low refractive index layers whose refractive index is relatively low alternatingly from the substrate side with high refractive index layers whose refractive index is relatively high, and wherein the first refractive index profile and the second refractive index profile are continuous, and wherein each of the first refractive index profile and the second refractive index profile is represented by a first laminated portion and a second laminated portion that is adjacent to the substrate side of the first laminated portion, and wherein in the first laminated portion, the refractive indices of the high refractive index layers become gradually higher approaching the substrate side, and the refractive indices of the low refractive index layers become gradually lower approaching the substrate side, in the second laminated portion, the refractive indices of the high refractive index layers become gradually lower approaching the substrate side, and the refractive indices of the low refractive index layers become gradually higher approaching the substrate side, and wherein at least one of an optical thickness of the high refractive index layers in the first refractive index profile, an optical thickness of the low refractive index layers in the first refractive index profile, an optical thickness of the high refractive index layers in the second refractive index profile, and an optical thickness of the low refractive index layers in the second refractive index profile is different from the others.

The present invention is an optical filter formed by a substrate and a thin film that is formed on the substrate, wherein the thin film is formed by laminating low refractive index layers whose refractive index is relatively low alternatingly from the substrate side with high refractive index layers whose refractive index is relatively high, and wherein the thin film is provided with a first laminated portion, a second laminated portion that is adjacent to the first laminated portion, and a third laminated portion that is adjacent to the second laminated portion, and wherein in the first laminated portion, the refractive indices of the high refractive index layers become gradually higher approaching the substrate, in the second laminated portion, the refractive indices of the high refractive index layers are substantially equal to the highest refractive index of the high refractive index layers constituting the first laminated portion, and in the third laminated portion, the refractive indices of the high refractive index layers become gradually lower from the second laminated portion side, and wherein lamination patterns in which the first laminated portion, the second laminated portion, and the third laminated portion are arranged in this sequence approaching the substrate are repeated twice or more in a thickness direction of the film, and the optical thickness of each lamination pattern is different.

The present invention is an optical filter formed by a substrate and a thin film that is formed on the substrate, wherein the thin film is formed by laminating low refractive index layers whose refractive index is relatively low alternatingly from the substrate side with high refractive index layers whose refractive index is relatively high, and wherein the thin film is provided with a first laminated portion, a second laminated portion that is adjacent to the first laminated portion, and a third laminated portion that is adjacent to the second laminated portion, and wherein in the first laminated portion, the refractive indices of the low refractive index layers become gradually lower approaching the substrate, in the second laminated portion, the refractive indices of the low refractive index layers are substantially equal to the lowest refractive index of the low refractive index layers constituting the first laminated portion, and in the third laminated portion, the refractive indices of the low refractive index layers become gradually higher from the second laminated portion side, and wherein lamination patterns in which the first laminated portion, the second laminated portion, and the third laminated portion are arranged in this sequence approaching the substrate are repeated twice or more in a thickness direction of the film, and the optical thickness of each lamination pattern is different.

The present invention is an optical filter provided with a substrate and a thin film that is formed on the substrate, wherein the thin film has an outermost layer portion that is in contact with an optical medium whose refractive index is lower than the refractive index of the substrate, and has laminated portions having predetermined refractive profiles, and wherein the refractive index profiles are formed by laminating low refractive index layers alternatingly with high refractive index layers approaching the substrate side, and wherein the refractive indices of the low refractive index layers is higher than the refractive index of the optical medium, and the refractive indices of the high refractive index layers is relatively higher than the refractive index of the low refractive index layers, and wherein the outermost layer portion is provided with an outermost low refractive index layer, a first outermost high refractive index layer that is laminated on the outermost low refractive index layer, and a second outermost high refractive index layer that is laminated on the first outermost high refractive index layer, and wherein the refractive index of the outermost low refractive index layer is higher than the refractive index of the optical medium, the refractive index of the first outermost high refractive index layer is higher than the refractive index of the outermost low refractive index layer, and the refractive index of the second outermost high refractive index layer is higher than the refractive index of the first outermost high refractive index layer, and wherein the refractive index profile is represented by a first laminated portion that is laminated on the outermost layer portion side, a second laminated portion that is laminated on the substrate side of the first laminated portion, and a third laminated portion that is laminated on the substrate side of the second laminated portion, and wherein in the first laminated portion, the refractive indices of the high refractive index layers are higher than the second outermost high refractive index layer, and become gradually higher approaching the substrate side, in the second laminated portion, the refractive indices of the high refractive index layers are substantially equal to the highest refractive index of the high refractive index layers constituting the first laminated portion, and in the third laminated portion, the refractive indices of the high refractive index layers become gradually lower approaching the substrate side.

BRIEF DESCRIPTION THE DRAWINGS

FIGS. 21A and 21B are graphs showing a film structure and spectral characteristics of an absorption filter in a fifteenth embodiment of the present invention.

DETAILED DESCRIPTION OF THE INVENTION

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

Next, the first embodiment of the present invention will be described with reference made to FIGS. 1, 2A, and 2B.

Figure 1:
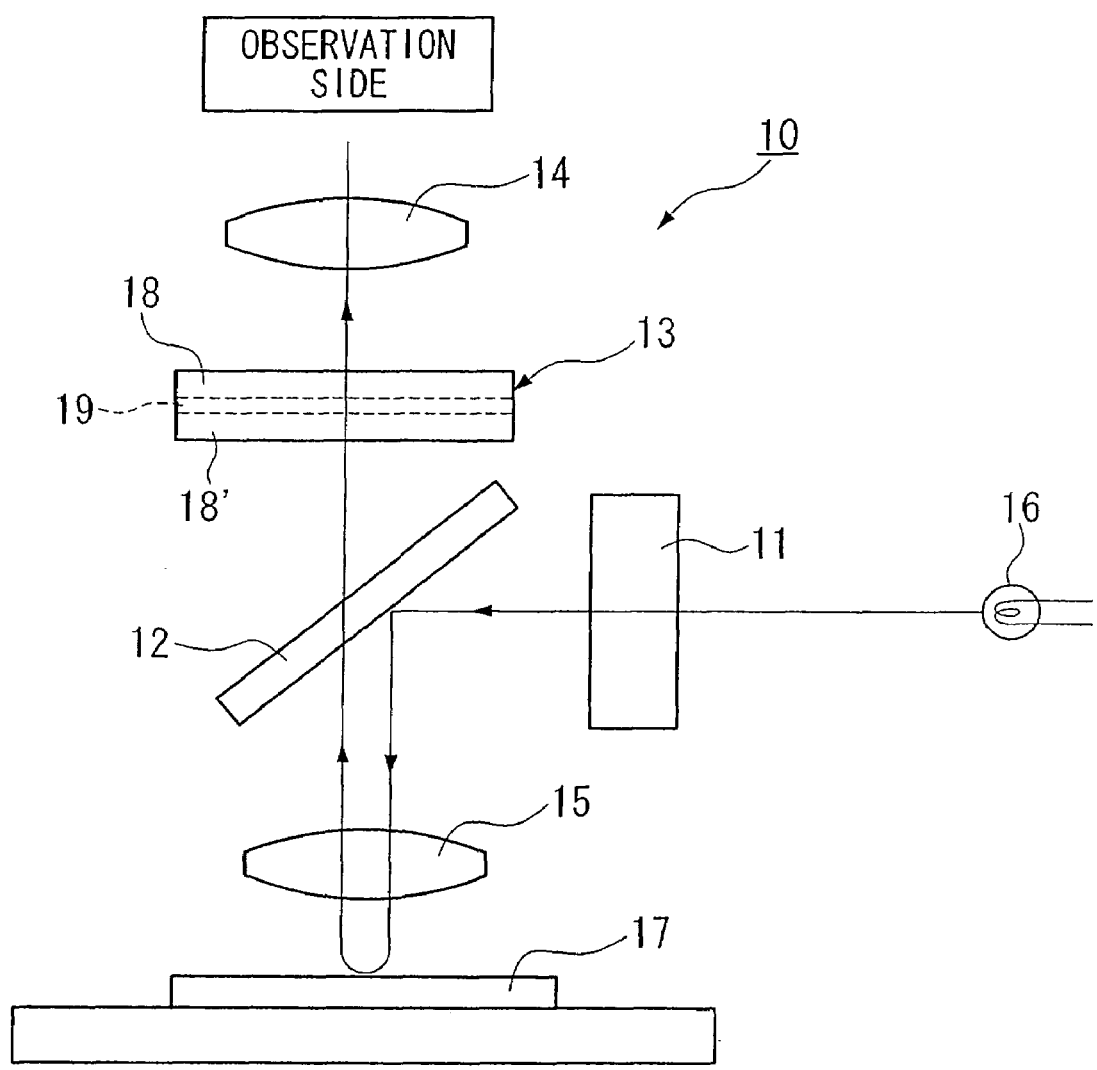
FIG. 1 is a view showing an outline of the fluorescence microscope according to the first embodiment of the present invention.
Figure 2A:
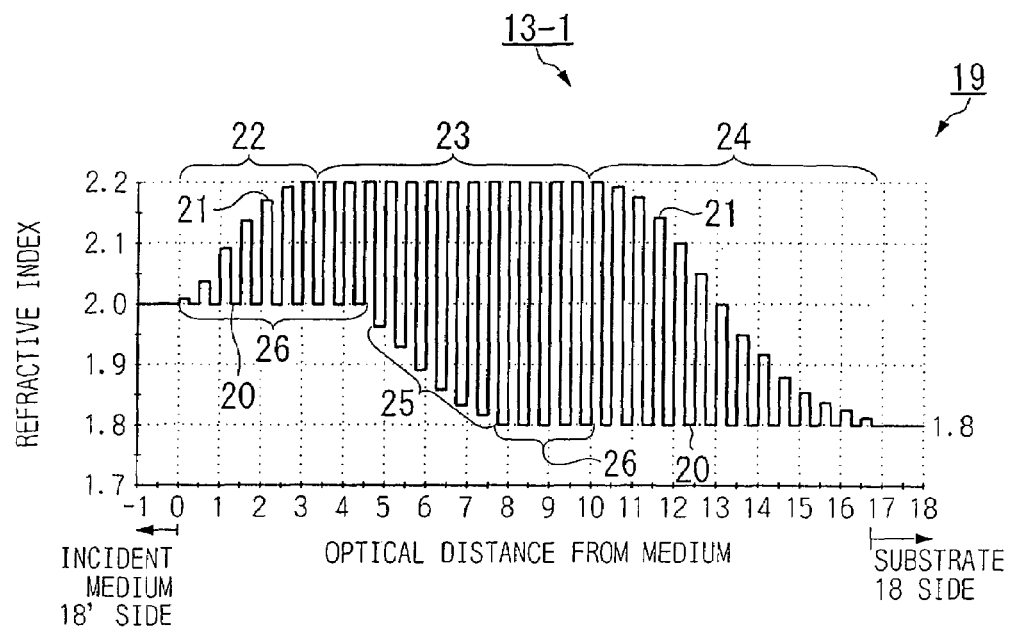
FIGS. 2A and 2B are graphs showing a film structure and spectral characteristics of an absorption filter in a first embodiment of the present invention.

The optical instrument according to the present embodiment is shown in FIG. 1. The optical instrument in FIG. 1 is a fluorescence microscope. The fluorescence microscope 10 is provided with an excitation filter 11, a dichroic mirror 12, an absorption filter (i.e., an optical filter) 13, an ocular lens 14, and an objective lens 15.

The excitation filter 11 is placed on an optical path of the light source 16. As a result of this placement, it selectively allows only specific wavelengths out of the light that is generated from the light source 16 to pass through in the form of excitation light.

The dichroic mirror 12 is placed on the opposite side from the light source 16 sandwiching the excitation filter 11 so as to bend the optical axis at an angle of 45°. Accordingly, excitation light that has passed through the excitation filter 11 is irradiated via the objective lens 15 onto a specimen 17 such as, for example, a biological cell. As a result of this irradiation fluorescent light is generated from the specimen 17. Because the generated fluorescent light has a different wavelength from that of the excitation light, it passes through the dichroic mirror 12 and arrives at the observing side.

The ocular lens 14 and objective lens 15 form an observation optical system. Using this observation optical system, an image of the aforementioned fluorescent light can be observed.

The absorption filter 13 is formed by a glass substrate 18, a thin film 19, and an incident medium 18'. Here, the thin film 19 is formed on top of the substrate 18. In addition, the incident medium 18' is provided on top of the thin film 19. This absorption filter 13 has optical characteristics that selectively allow only the aforementioned fluorescent light to pass through. The incident medium 18' is formed by a member (for example, a glass plate) having the same refractive index as that of the substrate 18.

The absorption filter 13 will now be described. In FIG. 2A, the absorption filter is shown by the symbol 13-1. As is shown in FIG. 2A, the thin film 19 is formed by low refractive index layers 20 and high refractive index layers 21. The refractive indices of the high refractive index layers 21 have a relatively high refractive index in comparison with the refractive indices of the low refractive index layers 20. The low refractive index layers 20 and the high refractive index layers 21 are laminated alternatingly from the substrate 18 side.

The thin film 19 is also formed by a first laminated portion 22, a second laminated portion 23, and the third laminated portion 24. From the substrate 18 side towards the incident medium 18', the laminated portions are laminated in order of the third laminated portion 24, the second laminated portion 23, and the first laminated portion 22. In addition, each laminated portion has low refractive index layers 20 and high refractive index layers 21.

In the first laminated portion 22, the refractive indices of the high refractive index layers 21 become gradually higher approaching the substrate 18. Furthermore, in the first laminated portion 22, the refractive indices of the low refractive index layers 20 are substantially uniform. In this case, the low refractive index layers 20 have a low refractive index layer fixed portion.

The second laminated portion 23 is adjacent to the first laminated portion 22. In the second laminated portion 23, the refractive indices of the high refractive index layers 21 are substantially uniform. The refractive indices of the high refractive index layers 21 are substantially the same as the highest refractive index of the high refractive index layers 21 constituting the first laminated portion 22. In the second laminated portion 23, the refractive indices of the low refractive index layers 20 are substantially uniform at first. Thereafter, from partway along the refractive indices become gradually lower. Then, once again, the refractive indices become substantially uniform at the end. In this way, the second laminated portion 23 has a low refractive index layer fixed portion 26 where the refractive indices are at first substantially uniform, and a low refractive index layer decreasing portion 25 where the refractive indices become gradually lower. Low refractive index layer fixed portions 26 are provided on both sides of the low refractive index layer decreasing portion 25. Note that portions of a low refractive index layer fixed portion 26 also form the low refractive index layers 20 of the first laminated portion 22.

The third laminated portion 24 is adjacent to the second laminated portion 23. In this third laminated portion 24, the refractive indices of the high refractive index layers 21 become gradually lower from the second laminated portion 23 side. Moreover, in the third laminated portion 24 the refractive indices of the low refractive index layers 20 are substantially uniform. The refractive indices of the low refractive index layers 20 are substantially the same as the lowest refractive index of the low refractive index layers 20 constituting the second laminated portion 23.

The low refractive index layers 20 are mainly formed from silicon oxide. In contrast, the high refractive index layers 21 are mainly formed from niobium oxide.

In the present embodiment, the refractive index of the substrate 18 is set to 1.8. In addition, the refractive indices of the high refractive index layers 21 change from 1.81 to 2.2. Moreover, the refractive indices of the low refractive index layers 20 change from 2.0 to 1.8 in the low refractive index layer decreasing portion 25.

Here, a central wavelength of a wavelength band in which transmission is blocked is taken as $\lambda$. A design wavelength is taken as $\lambda/n$ (wherein n is an integer). If, for example, n=1, the design wavelength becomes $\lambda$. The optical thicknesses of the high refractive index layers 21 and the low refractive index layers 20 are set at one quarter of the design wavelength.

In the present embodiment, because $\lambda$ is set to 600 nm, the optical thicknesses of the high refractive index layers 21 and the low refractive index layers 20 are each 150 nm.

Here, the results are shown when a simulation was performed for spectral transmittance of the absorption filter. In this simulation, in addition to the above structure, the total number of laminated layers is set at 68. In addition, a substrate having a refractive index of 2.0 is also provided on the incident medium 18' side of the thin film 19. In this simulation, there is also no refractive index dispersion in each layer. The results of a simulation with these parameters and conditions are shown in FIG. 2B.

Next, a method of observation using the fluorescence microscope 10 will be described.

Light emitted from the light source 16 is irradiated onto the excitation filter 11. Here, by passing through the excitation filter excitation light of a specific wavelength is obtained. This excitation light is irradiated into the dichroic mirror 12.

This excitation light is reflected by the dichroic mirror 12 and is irradiated onto the objective lens 15. The excitation light is then condensed by the objective lens 15 and is irradiated onto the specimen 17. At this time, fluorescent light is generated from the specimen 17 by this irradiation. This fluorescent light is formed into parallel light via the objective lens 15. This parallel light arrives at the dichroic mirror 12, passes through the dichroic mirror 12, and arrives at the absorption filter 13.

The fluorescent light that reaches the absorption filter 13 (i.e., the filter 13-1 in FIG. 2A) is irradiated from the first laminated portion 22. The fluorescent light then passes through the second laminated portion 23 and the third laminated portion 24 and is once again emitted to the outside from the substrate 18 side.

Reflected light, which includes excitation light in addition to fluorescent light, that is reflected from the specimen 17 is reflected by the dichroic mirror 12. However, a portion passes through the dichroic mirror 12. As a result, excitation light is also irradiated onto the absorption filter 13. However, the thin film 19 is provided with the above described first laminated portion 22 through the third laminated portion 24. Therefore, it is possible to provide the absorption filter 13 with the spectral transmittance characteristics shown in FIG. 2B. Here, the absorption filter 13-1 is manufactured such that the wavelength band to which the excitation light and the like belongs is matched to the stopband 28, while the wavelength band to which the fluorescent light belongs is matched to the transmission bands. If this type of structure is employed, it is possible to allow fluorescent light only to pass through while preventing excitation light from passing through.

At this time, the optical thicknesses of the high refractive index layers 21 and the low refractive index layers 20 are set to one quarter of the design wavelength. If this type of structure is employed, then control of the optical thickness during film formation is simplified. As a result, a uniform optical thickness can be consistently formed. Accordingly, it is possible to improve the optical characteristics of the obtained thin film.

Fluorescent light that is emitted from the absorption filter 13 in this manner is irradiated onto the ocular lens 14. This fluorescent light passes through the ocular lens 14 and is condensed and then arrives at the observation side.

Figure 2B:
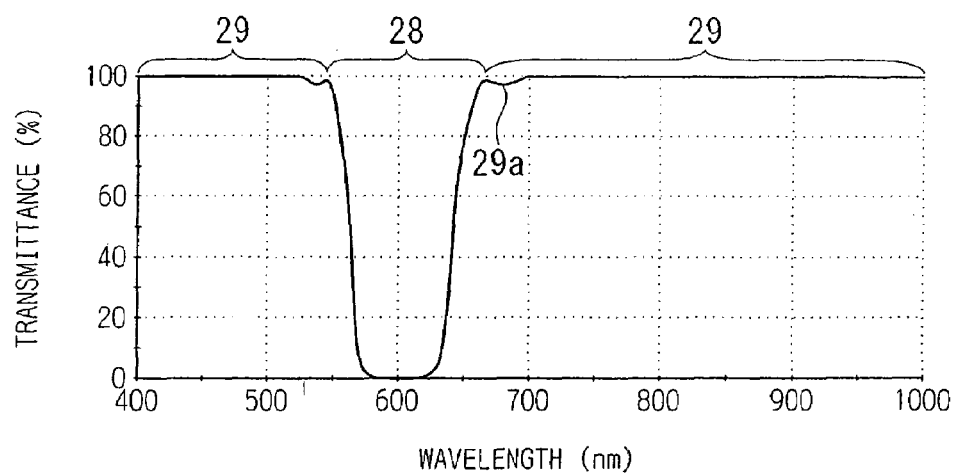

As is shown, for example, in FIG. 2B, according to this absorption filter 13, rises in spectral characteristics at the boundaries between the stopband 28 and the transmission bands 29 can be made extremely sharp. Furthermore, it is possible to almost completely suppress ripples 29a in the transmission bands 29. Moreover, because the film structure simplifies control during film formation, it is possible to improve the consistency of the optical characteristics.

Figure 3A:
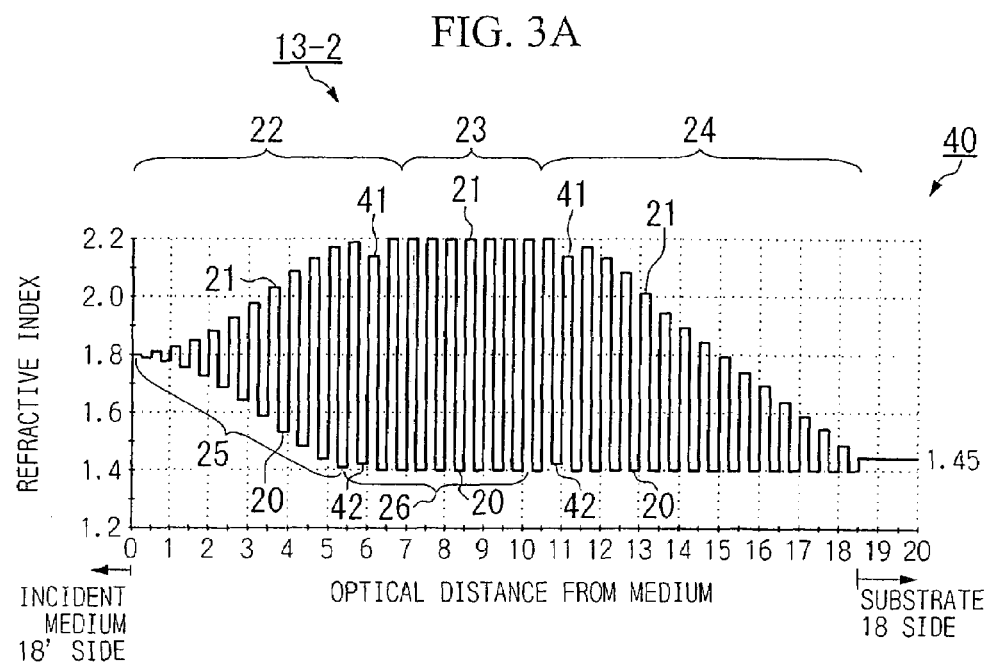
FIGS. 3A and 3B are graphs showing a film structure and spectral characteristics of an absorption filter in a second embodiment of the present invention.

Next, the second embodiment will be described with reference made to FIG. 3A. Note that, in the description below, component elements that are the same as those in the above described embodiment are given the same symbols and a description thereof is omitted.

The second embodiment differs from the first embodiment in the following point. Namely, in a thin film 40 according to the second embodiment a low refractive index layer decreasing portion 25 is provided at a distal end side of the first laminated portion 22. The second embodiment also differs in that the refractive indices of the low refractive index layers of the second laminated portion 23 are substantially uniform.

Namely, the absorption filter 13-2 is provided with the thin film 40. In this thin film 40, a low refractive index layer decreasing portion 25 is provided in the low refractive index layers 20 of the first laminated portion 22. In addition, a low refractive index layer fixed portion 26 is provided moving from the low refractive index layer decreasing portion 25 towards the substrate 18 side in the low refractive index layers 20 that constitute the first and second laminated portions 22 and 23.

A refractive index variation layer portion is provided in the thin film 40. For example, if the vicinity of the boundary between the first laminated portion 22 and the second laminated portion 23 is observed, it can be seen that a layer 41 is present here that is lower than the high refractive index layers 21 on both sides thereof. Because this layer 41 is on the high refractive index side, here, it is taken as a high refractive index variation layer portion 41. This high refractive index variation layer portion 41 is provided on the first laminated portion 22 side.

In the same way, a high refractive index variation layer portion 41 is also provided in the vicinity of the boundary between the second laminated portion 23 and the third laminated portion 24. This high refractive index variation layer portion 41 is provided on the third laminated portion 24 side. Note that the high refractive index variation layer portions 41 are adjacent to the high refractive index layers 21 on both sides thereof via low refractive index layers 20.

Low refractive index variation layer portions are also provided in the low refractive index layers 20. If the vicinity of the boundary between the first laminated portion 22 and the second laminated portion 23 is observed, it can be seen that a layer 42 is present here in which the refractive index of the low refractive index layer 20 is higher than that of the low refractive index layers 20 on both sides thereof. This is a low refractive index variation layer portion 42. This low refractive index variation layer portion 42 is provided on the first laminated portion 22 side. In the same way, a low refractive index variation layer portion 42 is also provided in the vicinity of the boundary between the second laminated portion 23 and the third laminated portion 24. This low refractive index variation layer portion 42 is provided on the third laminated portion 24 side.

In the present embodiment, the refractive indices of the high refractive index layer 21 in the second laminated portion 23 are 2.2. In contrast to this, the refractive indices of the high refractive index variation layer portions 41 are set to 2.15. Moreover, the refractive indices of the low refractive index layers 20 in the second laminated portion 23 are set to 1.4. In contrast to this, the refractive indices of the low refractive index variation layer portions 42 are set to 1.42.

Again, the results are shown when a simulation was performed for spectral transmittance of the absorption filter. In this simulation, in addition to the above structure, the total number of laminated layers is set at 75. The thin film 40 is inserted between an incident medium 18' having a refractive index of 1.8 and a substrate 18 having a refractive index of 1.4. In this simulation, there is also no refractive index dispersion in each layer. The results of a simulation with these parameters and conditions are shown in FIG. 3B.

Figure 3B:
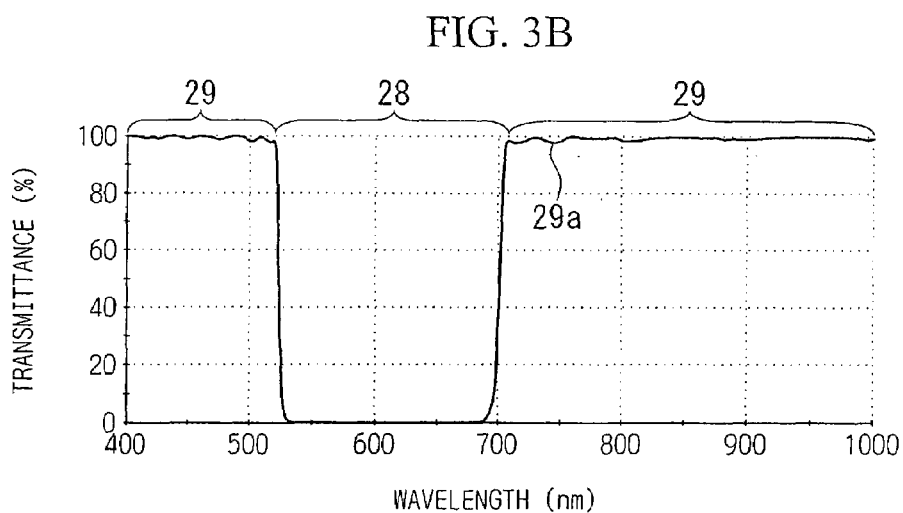

According to the absorption filter 13-2 of the present embodiment, as is shown, for example, in FIG. 3B, by altering the position of the low refractive index layer decreasing portion 25, it is possible to alter the width of the stopband 28. Furthermore, because both the high refractive index variation layer portion 41 and the low refractive index variation layer portion 42 are provided, it is possible to suppress ripples even further. Accordingly, in the same way as in the first embodiment, it is possible to reduce ripples 29a in the transmission bands of fluorescent light and to consistently obtain a sufficient quantity of light.

Figure 4A:
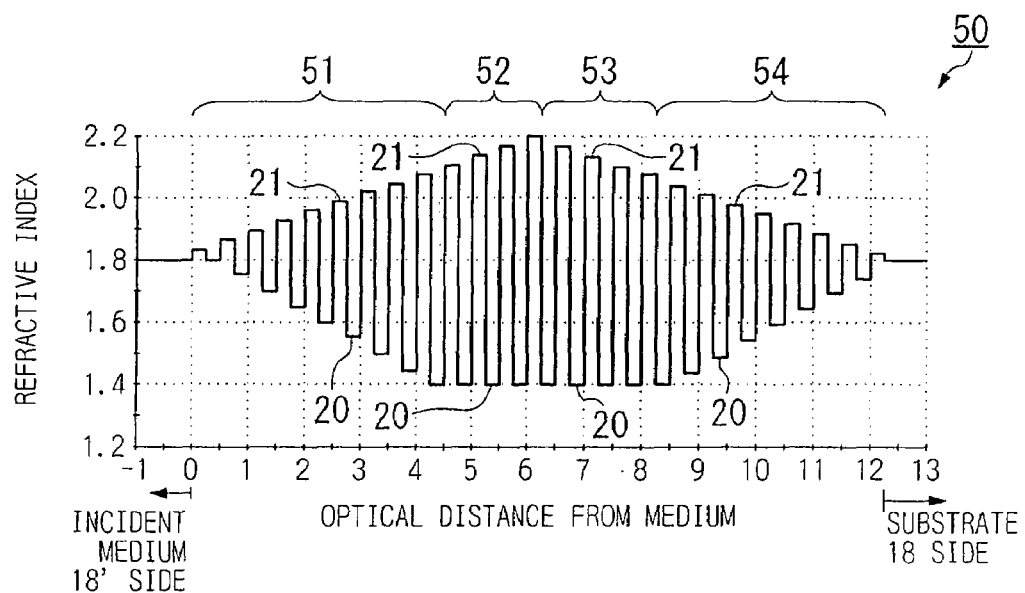
FIGS. 4A and 4B are graphs showing a film structure and spectral characteristics of an absorption filter in a third embodiment of the present invention.

Next, the third embodiment will be described with reference made to FIG. 4A. Note that in the description given below, component elements that are the same as those of the above described embodiments are given the same symbols and a description thereof is omitted.

The absorption filter 13-3 of the third embodiment is provided with a thin film 50. The thin film 50 is formed by a first laminated portion 51, a second laminated portion 52, a third laminated portion 53, and a fourth laminated portion 54. From the substrate 18 side towards the incident medium 18', the laminated portions are formed in order of the fourth laminated portion 54, the third laminated portion 53, the second laminated portion 52, and the first laminated portion 51. In addition, each laminated portion has low refractive index layers 20 and high refractive index layers 21.

In the first laminated portion 51, the refractive indices of the high refractive index layers 21 become gradually higher approaching the substrate 18. In addition, in the first laminated portion 51, the refractive indices of the low refractive index layers 20 become gradually lower approaching the substrate 18.

The second laminated portion 52 is adjacent to the first laminated portion 51. In the second laminated portion 52, the refractive indices of the high refractive index layers 21 become gradually higher from the first laminated portion 51 side. In addition, in the second laminated portion 52, the refractive indices of the low refractive index layers 20 are substantially uniform. The refractive indices of these low refractive index layers 20 are substantially the same as the lowest refractive index of the low refractive index layers 20 constituting the first laminated portion 51.

The third laminated portion 53 is adjacent to the second laminated portion 52. In the third laminated portion 53, the refractive indices of the high refractive index layers 21 become gradually lower from the second laminated portion 52 side. In addition, in the third laminated portion 53, the refractive indices of the low refractive index layers 20 are substantially uniform. The refractive indices of these low refractive index layers 20 are substantially the same as the lowest refractive index of the low refractive index layers 20 constituting the first laminated portion 51.

The fourth laminated portion 54 is adjacent to the third laminated portion 53. In this fourth laminated portion 54, the refractive indices of the high refractive index layers 21 become gradually lower from the third laminated portion 53 side. In addition, in the fourth laminated portion 54, the refractive indices of the low refractive index layers 20 become gradually higher from the third laminated portion 53 side.

In the present embodiment, the refractive index of the substrate 18 is set to 1.8. The refractive indices of the high refractive index layers 21 change from 1.81 to 2.2. In addition, the refractive indices of the low refractive index layers 20 change from 1.4 to 1.8.

Here, the results are shown when a simulation was performed for spectral transmittance of the absorption filter. In this simulation, in addition to the above structure, the total number of laminated layers is set at 45. A substrate having a refractive index of 1.8 is also inserted on the incident medium 18' side of the thin film 32. In this simulation, there is also no refractive index dispersion in each layer. The results of a simulation with these parameters and conditions are shown in FIG. 4B.

Figure 4B:
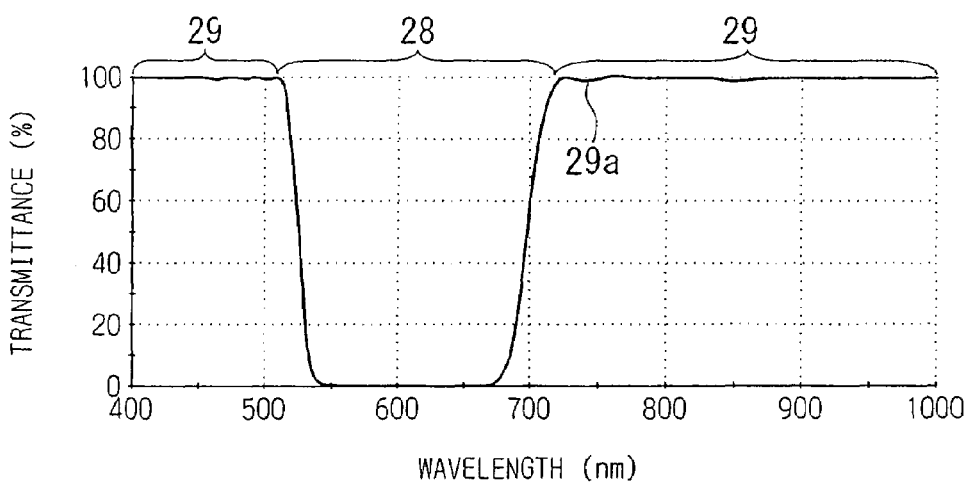

According to the absorption filter 13-3 of the present embodiment, as is shown, for example, in FIG. 4B, it is possible to suppress ripples 29a in the same way as in the other embodiments. Furthermore, because the refractive indices of the low refractive index layers 20 constituting the second and third laminated portions 52 and 53 are substantially uniform, control of the refractive indices during film formation is a simple matter.

Figure 5A:
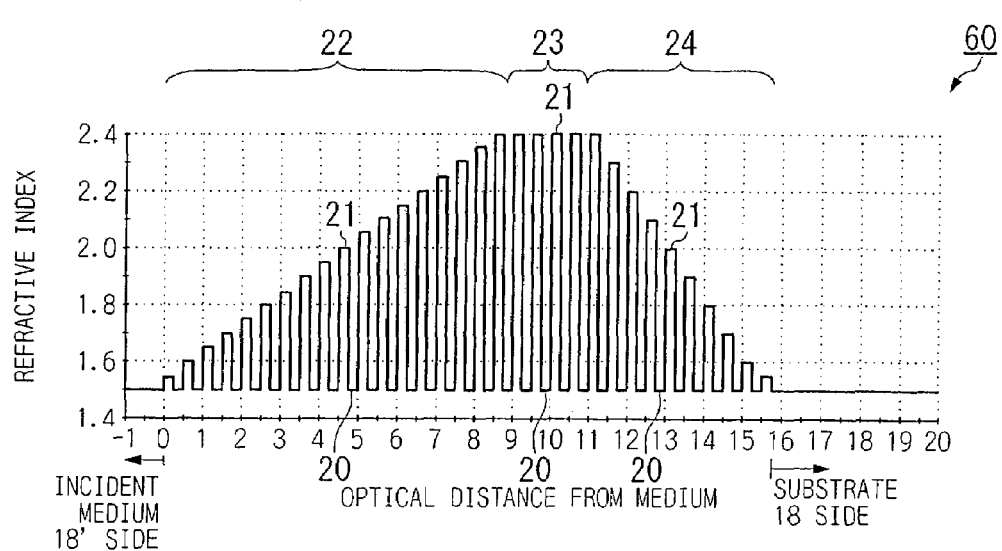
FIGS. 5A and 5B are graphs showing a film structure and spectral characteristics of an absorption filter in a fourth embodiment of the present invention.

Next, the fourth embodiment will be described with reference made to FIG. 5A. Note that in the description given below, component elements that are the same as those in the above described embodiments are given the same symbols and a description thereof is omitted.

The absorption filter 13-4 according to the fourth embodiment is provided with a thin film 60. The thin film 60 is formed by a first laminated portion 22, a second laminated portion 23, and a third laminated portion 24. From the substrate 18 side towards the incident medium 18', the laminated portions are formed in order of the third laminated portion 24, the second laminated portion 23, and the first laminated portion 22. In addition, each laminated portion has low refractive index layers 20 and high refractive index layers 21.

In the first laminated portion 22, the refractive indices of the high refractive index layers 21 become gradually higher approaching the substrate 18. In addition, in the first laminated portion 22, the refractive indices of the low refractive index layers 20 are substantially uniform.

The second laminated portion 23 is adjacent to the first laminated portion 22. In this second laminated portion 23, the refractive indices of the high refractive index layers 21 are substantially uniform. The refractive indices of the high refractive index layers 21 are substantially the same as the highest refractive index of the high refractive index layers 21 constituting the first laminated portion 22. In addition, in the second laminated portion 23, the refractive indices of the low refractive index layers 20 are substantially uniform.

The third laminated portion 24 is adjacent to the second laminated portion 23. In this third laminated portion 24, the refractive indices of the high refractive index layers 21 become gradually lower from the second laminated portion 23 side. In addition, in the third laminated portion 24, the refractive indices of the low refractive index layers 20 are substantially uniform.

Note that the refractive indices of the low refractive index layers 20 constituting the first through third laminated portions 22 to 24 are substantially uniform.

Here, if the refractive index gradients of the high refractive index layers 21 are observed, it will be seen that the absolute value of the gradient of the refractive index in the first laminated portion 22 is smaller than the absolute value of the gradient of the refractive index in the third laminated portion. Moreover, the area where the absolute value of the gradient of the refractive index is small is broader in comparison with the area in which the absolute value of the gradient of the refractive index is large. In the present embodiment, a thin film 60 is formed that provides this type of refractive index gradient.

In the present embodiment, the refractive index of the substrate 18 is set to 1.5. The refractive indices of the high refractive index layers 21 change from 1.55 to 2.4. In addition, the refractive indices of the low refractive index layers 20 are a uniform value of 1.5.

Figure 5B:
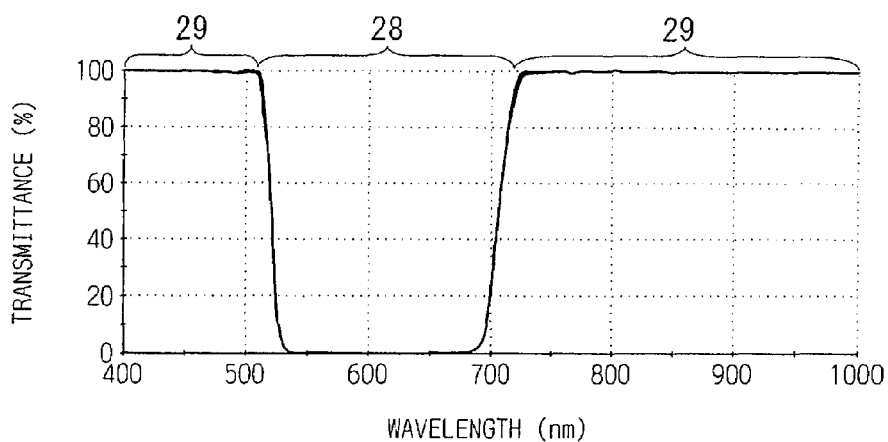

Here, the results are shown when a simulation was performed for spectral transmittance of the absorption filter. In this simulation, in addition to the above structure, the total number of laminated layers is set at 63. A substrate having a refractive index of 1.5 is also inserted on the incident medium 18' side of the thin film 60. In this simulation, there is also no refractive index dispersion in each layer. The results of a simulation with these parameters and conditions are shown in FIG. 5B.

Generally, control of the refractive index during film formation is more difficult than control of the optical thickness. Accordingly, if there are irregularities in the refractive indices of the refractive index layers, it is difficult to obtain the desired optical performance. However, as is the case in the present embodiment, if the refractive index gradients of the high refractive index layers 21 are set such that the absolute value of the refractive index gradient in the first laminated portion 22 is smaller than the absolute value of the refractive index gradient in the third laminated portion, then even if irregularities occur in the refractive index layer in the first laminated portion 22, the effects thereof can be reduced. Accordingly, even if the refractive index varies during film formation, the film structure has little deterioration in the optical performance (such as ripples or blunting of the sharpness of the rise in the spectral characteristics).

Figure 6A:
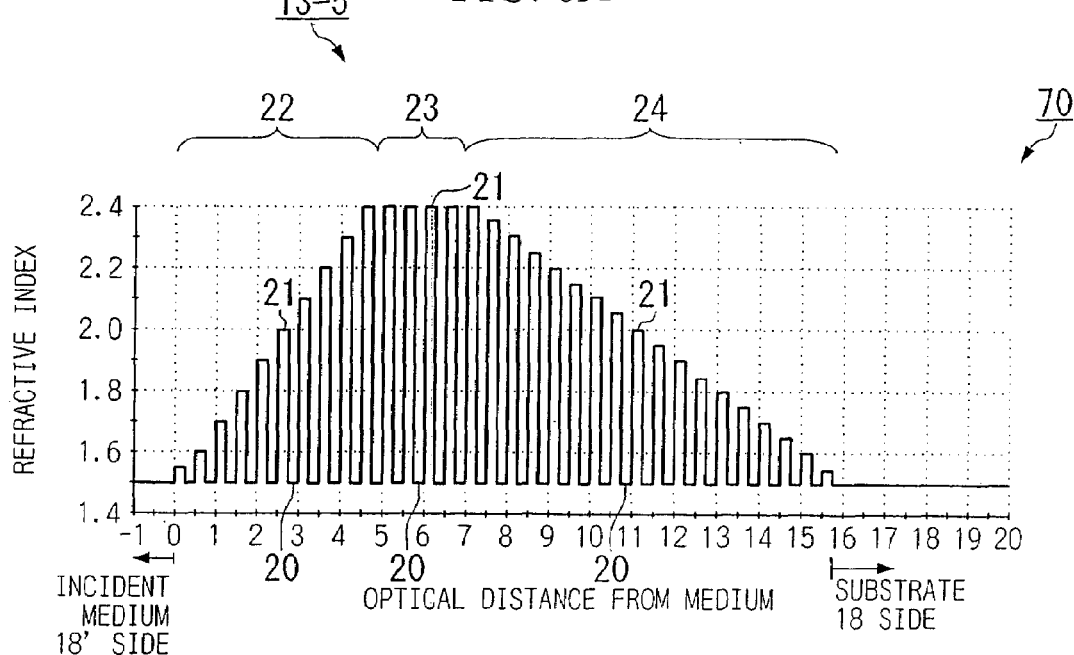
FIGS. 6A and 6B are graphs showing a film structure and spectral characteristics of an absorption filter in a fifth embodiment of the present invention.

Next, the fifth embodiment will be described with reference made to FIG. 6A. Note that in the description given below, component elements that are the same as those in the above described embodiments are given the same symbols and a description thereof is omitted.

The absorption filter 13-5 of the fifth embodiment is provided with a thin film 70. The absorption filter 13-5 differs from that of the fourth embodiment in the following points. Namely, in the thin film 70 according to the fifth embodiment, the gradients of the refractive indices of the high refractive index layers 21 are formed such that the absolute value of the gradient of the refractive indices of the high refractive index layers 21 in the first laminated portion 22 is larger than the absolute value of the gradient of the refractive indices of the high refractive index layers 21 in the third laminated portion 24.

Figure 6B:
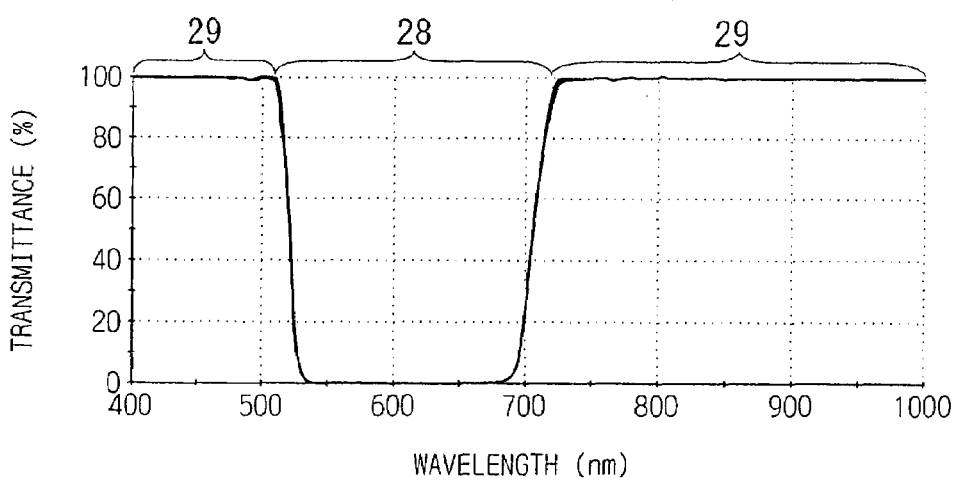

Here, the results are shown when a simulation was performed for spectral transmittance of the absorption filter. In this simulation, in addition to the above structure, the total number of laminated layers is set at 63. A substrate having a refractive index of 1.5 is also inserted on the incident medium 18' side of the thin film 70. In this simulation, there is also no refractive index dispersion in each layer. The results of a simulation with these parameters and conditions are shown in FIG. 6B.

The thin film 70 of the present embodiment has the same operation and effects as the thin film 60 of the fourth embodiment.

Figure 7A:
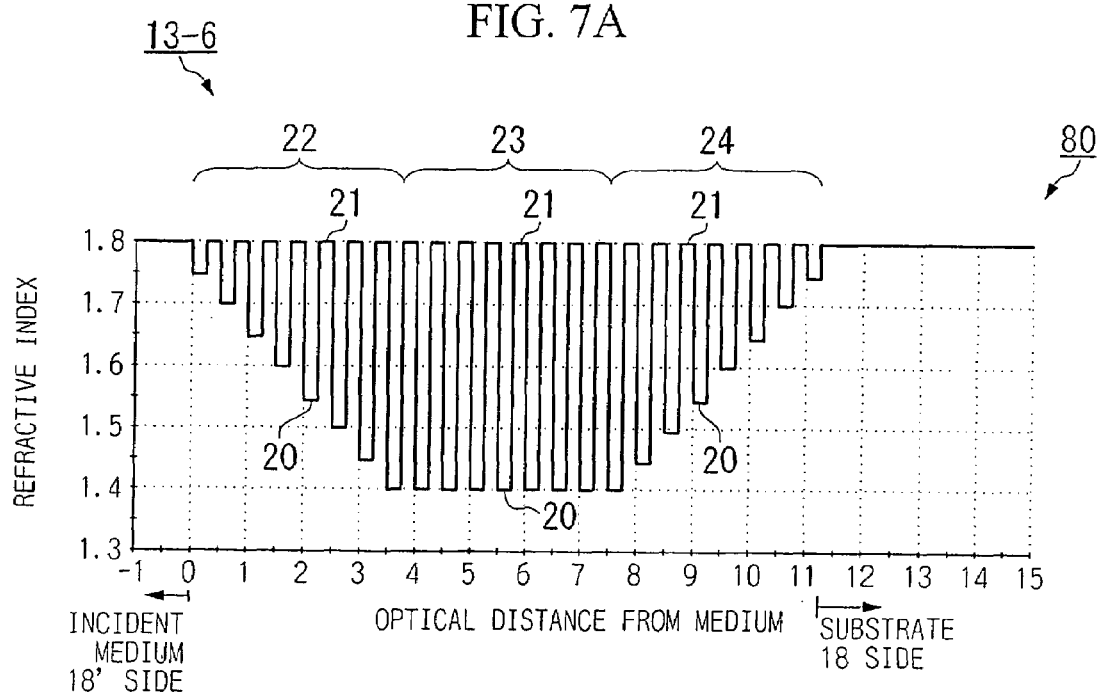
FIGS. 7A and 7B are graphs showing a film structure and spectral characteristics of an absorption filter in a sixth embodiment of the present invention.

Next, the sixth embodiment will be described with reference made to FIG. 7A. Note that in the description given below, component elements that are the same as those in the above described embodiments are given the same symbols and a description thereof is omitted.

The absorption filter 13-6 of the sixth embodiment is provided with a thin film 80. The thin film 80 is formed by a first laminated portion 22, a second laminated portion 23, and a third laminated portion 24. From the substrate 18 side towards the incident medium 18', the laminated portions are formed in order of the third laminated portion 24, the second laminated portion 23, and the first laminated portion 22. In addition, each laminated portion has low refractive index layers 20 and high refractive index layers 21.

In the first laminated portion 22, the refractive indices of the high refractive index layers 21 are substantially uniform. In addition, the refractive indices of the low refractive index layers 20 become gradually lower approaching the substrate 18.

The second laminated portion 23 is adjacent to the first laminated portion 22. In this second laminated portion 23, the refractive indices of the high refractive index layers 21 are substantially uniform. In addition, in this second laminated portion 23, the refractive indices of the low refractive index layers 20 are substantially uniform. The refractive indices of the low refractive index layers 20 are substantially the same as the lowest refractive index of the low refractive index layers 20 constituting the first laminated portion 22.

The third laminated portion 24 is adjacent to the second laminated portion 23. In this third laminated portion 24, the refractive indices of the high refractive index layers 21 are substantially uniform. In addition, in the third laminated portion 24, the refractive indices of the low refractive index layers 20 become gradually higher from the second laminated portion 23 side.

In the present embodiment, the refractive index of the substrate 18 is set to 1.8. The refractive indices of the high refractive index layers 21 is a uniform value of 1.8. In addition, the refractive indices of the low refractive index layers 20 change from 1.4 to 1.75.

Here, the results are shown when a simulation was performed for spectral transmittance of the absorption filter. In this simulation, in addition to the above structure, the total number of laminated layers is set at 45. A substrate having a refractive index of 1.8 is also inserted on the incident medium 18' side of the thin film 70. In this simulation, there is also no refractive index dispersion in each layer. The results of a simulation with these parameters and conditions are shown in FIG. 7B.

Figure 7B:
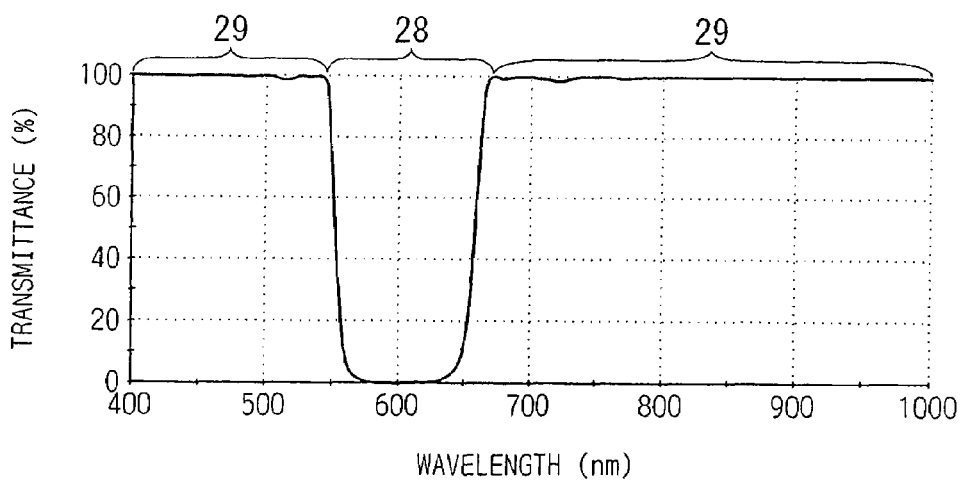

According to the absorption filter 13-6 of the present embodiment, as is shown, for example, in FIG. 7B, in the same way as in the above described embodiments, it is possible to suppress ripples in the transmission bands and consistently obtain a sufficient quantity of light. Moreover, because the refractive indices of the high refractive index layers 21 are uniform, control of the refractive indices during film formation is a simple matter.

Note that in the above described embodiment, with n=1, the design wavelength is set to 600 nm, which is the same as the central wavelength, and the optical thicknesses of the high refractive index layers 21 and the low refractive index layers 20 are set to one quarter of the design wavelength. However, it is also possible to set n=2, and set the design wavelength at 300 nm. If n=2, the optical thicknesses of the high refractive index layers 21 and the low refractive index layers 20 are one half of the design wavelength. Even if a thin film is formed with the optical thicknesses set in this manner, it is possible to obtain an optical filter having exactly the same spectral characteristics.

For a central wavelength of 600 nm, the design wavelength is set to 600/n (wherein n is an integer) nm. In addition, the optical thicknesses of the high refractive index layers 21 and the low refractive index layers 20 are set to n/4 of the design wavelength. Even if a thin film is formed with the optical thicknesses set in this manner, it is possible to obtain an optical filter having exactly the same spectral characteristics.

Next, the seventh through eleventh embodiments will be described. The filter 13 of the seventh through eleventh embodiments differs from those of the above described embodiments in the following point. Namely, in the above described embodiments, the optical thicknesses of the low refractive index layers 20 and the high refractive index layers 21 are the same, however, in the present embodiment these optical thicknesses are different.

Figure 8A:
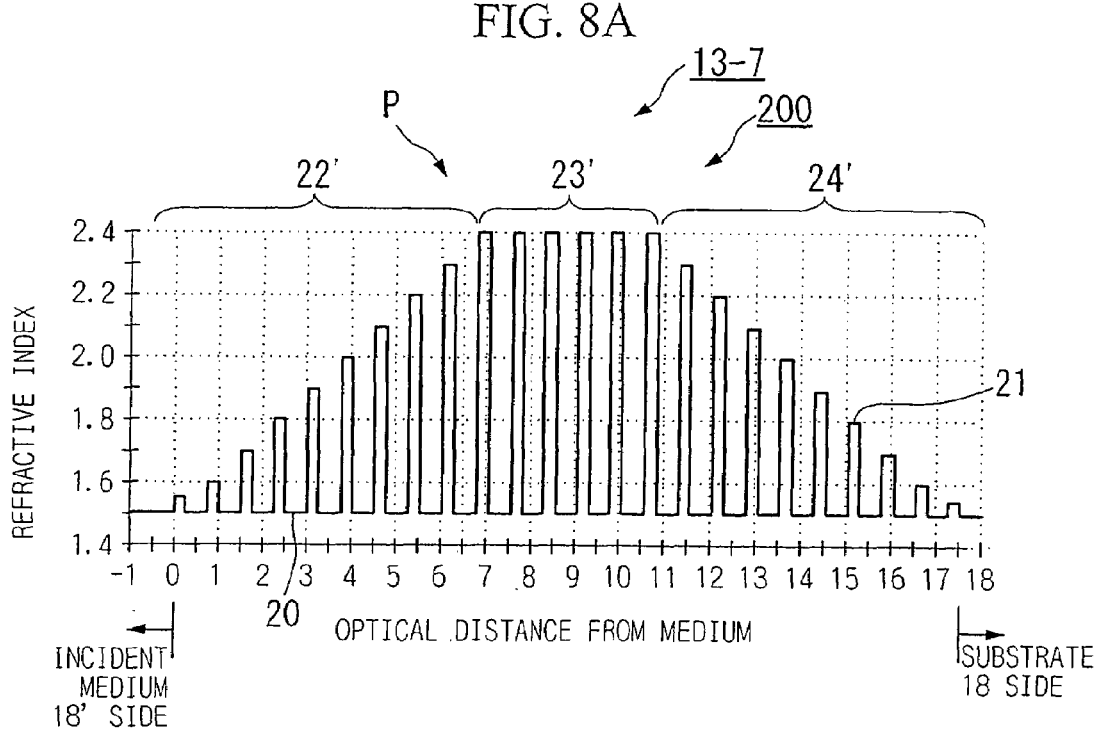
FIGS. 8A and 8B are graphs showing a film structure and spectral characteristics of an absorption filter in a seventh embodiment of the present invention.

The seventh embodiment will now be described with reference made to FIG. 8A. Note that, in the description given below, component elements that are the same as those in the above described embodiments are given the same symbols and a description thereof is omitted.

The absorption filter 13-7 of the seventh embodiment is provided with a thin film 200. As is shown in FIG. 8A, in the thin film 200, low refractive index layers 20 whose refractive indices are relatively low and high refractive index layers 21 whose refractive indices are relatively high are laminated alternatingly from the substrate 18 side.

A refractive index profile P is represented by a first laminated portion 22', a second laminated portion 23', and a third laminated portion 24'. The thin film 200 is formed by these three laminated portions. From the substrate 18 side towards the incident medium 18', the laminated portions are formed in order of the third laminated portion 24', the second laminated portion 23', and the first laminated portion 22'. In addition, each laminated portion has low refractive index layers 20 and high refractive index layers 21.

In the first laminated portion 22', the refractive indices of the high refractive index layers 21 become gradually higher approaching the substrate 18 side. In addition, in the first laminated portion 22', the refractive indices of the low refractive index layers 20 are substantially uniform.

The third laminated portion 24' is laminated on the substrate 18 side of the first laminated portion 22'. In the third laminated portion 24', the refractive indices of the high refractive index layers 21 become gradually lower approaching the substrate 18 side. In addition, in the third laminated portion 24', the refractive indices of the low refractive index layers 20 are substantially uniform.

The second laminated portion 23' is laminated between the first laminated portion 22' and the third laminated portion 24'. In this second laminated portion 23', the refractive indices of the high refractive index layers 21 are substantially uniform. The refractive indices of these high refractive index layers 21 are substantially the same as the highest refractive index from among the high refractive index layers 21 constituting the first laminated portion 22'. In addition, in the second laminated portion 23', the refractive indices of the low refractive index layers 20 are substantially uniform.

In the present embodiment, the refractive indices of the low refractive index layers 20 are substantially the same in each of the first laminated portion 22', the second laminated portion 23', and the third laminated portion 24'. Moreover, the optical thickness of the high refractive index layers 21 and the optical thickness of the low refractive index layers 20 are different from each other. In addition, the refractive indices of the low refractive index layers 20 are substantially the same as the refractive index of the substrate 18.

Here, the low refractive index layers 20 are mainly formed from silicon oxide. The high refractive index layers 21 are mainly formed from niobium oxide.

In the present embodiment, the refractive index of the substrate 18 and the low refractive index layers 20 are set to 1.5. In addition, the refractive indices of the high refractive index layers 21 are changed between 1.5 and 2.4.

Here, the results are shown when a simulation was performed for spectral transmittance of the absorption filter. In this simulation, in addition to the above structure, the total number of laminated layers of the thin film 200 is set at 47. This total number of layers is the number of layers from the substrate 18 side to the final layer that is adjacent to the incident side medium 18'. The design wavelength is 600 nm. The optical thicknesses of the high refractive index layers 21 are 0.25 times the design wavelength, while the optical thicknesses of the low refractive index layers 20 are 0.5 times the design wavelength.

Moreover, in this simulation, in the refractive index profile P, there is no refractive index dispersion in the respective layers. The results when transmittance was simulated using these parameters and conditions are shown in FIG. 8B.

This absorption layer 13-7 is provided with a stopband 22A, a stopband 22B, a transmission band 23A, and a transmission band 23B. In the stopband 22A, a central wavelength where transmission is obstructed is 450 nm, and the bandwidth where transmittance is 0% is approximately 40 nm. In the stopband 22B, a central wavelength where transmission is obstructed is 920 nm, and the bandwidth where transmittance is 0% is approximately 160 nm. The transmission band 23A and the transmission band 23B are provided with bandwidths that allow wavelengths other than these to be transmitted.

Figure 8B:
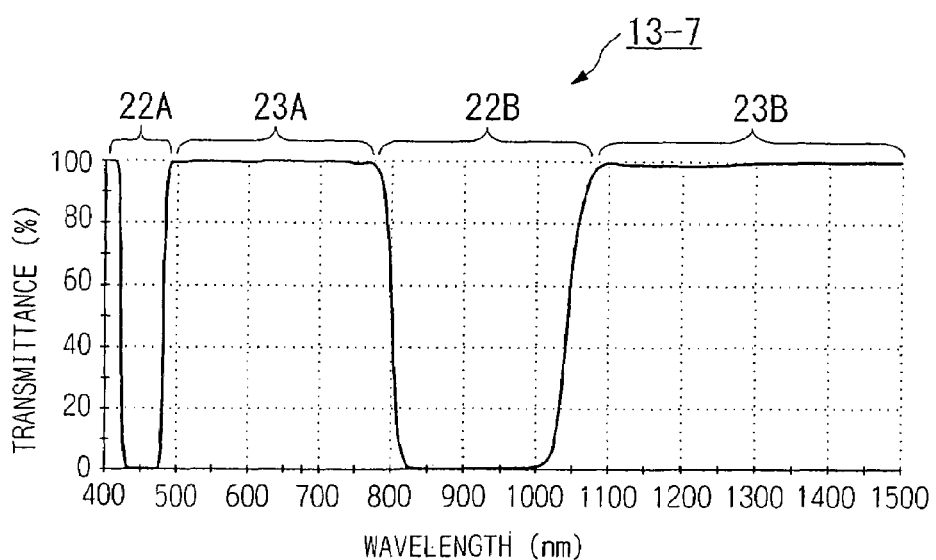

According to this absorption filter 13-7, as is shown, for example, in FIG. 8B, it is possible to form sharp boundaries between the stopbands 22A and 22B and the transmission bands 23A and 23B. As a result, it is possible to increase the amount of transmitted light in the transmission bands 23A and 23B. Furthermore, in addition to these effects, it is possible to suppress ripples.

Moreover, the optical thickness ratio between the high refractive index layers 21 and the low refractive index layers 20 is set to 1:2 without changing the refractive index in each layer of the refractive index profile P. By employing this type of structure, compared with when they have the same optical thicknesses (i.e. as is the case conventionally), it is possible to narrow the bandwidth in the stopband 22A where transmittance is 0%. Specifically, for example, it is possible to contract a bandwidth of approximately 130 nm in a conventional stopband to a bandwidth of approximately 40 nm. In addition, it is possible to move the central wavelength where transmittance is 0% from 600 nm towards the shorter wavelength side, for example, to 450 nm. Moreover, it is possible to newly set a stopband 22B in a wavelength band having 920 nm as the central wavelength. Accordingly, out of the incident light that it is irradiated into the absorption filter, it is possible to prevent the transmission of light in the wavelength bands 22A and 22B, whose central wavelength is 450 nm and 920 nm, and to allow the transmission of light in the transmission bands 23A and 23B. Therefore, fluorescent dyes are selected that are excited by the light of the wavelength bands 22A and 22B to generate fluorescent light in the transmission bands 23A and 23B. By employing this type of structure, it is possible to make an observation with little loss of fluorescent light, and it is possible to make considerable improvements in the detection sensitivity when measuring fluorescent light. As a result, for example, in genome analysis and the like, it is possible to improve analysis accuracy and detection accuracy, and to shorten the observation time.

Moreover, in the present embodiment, the refractive indices of the low refractive index layers 20 are set to the same value as the refractive index of the substrate 18. Accordingly, it is possible to suppress loss at boundaries between the substrate 18 and the thin film 200, and to further improve the amount of light transmitted in the transmission bands 23A and 23B.

Next, the eighth embodiment of the present invention will be described with reference made to FIG. 9A. Note that, in the description given below, component elements that are the same as those in the above described embodiments are given the same symbols and a description thereof is omitted.

The eighth embodiment differs from the seventh embodiment in the following point. Namely, in the seventh embodiment, the refractive indices of the low refractive index layers 20 are the same as that of the substrate 18, however, in the eighth embodiment the refractive indices of the low refractive index layers 20 are gradually changed.

The absorption filter 13-8 of the present embodiment is provided with a thin film 210. The refractive index profile 27 of the thin film 210 is represented by a first laminated portion 31 and a second laminated portion 30. The thin film 210 is formed by these two laminated portions. From the substrate 18 side towards the incident medium 18', the laminated portions are formed in order of the second laminated portion 30 and the first laminated portion 31. In addition, each laminated portion has low refractive index layers 20 and high refractive index layers 21.

In the first laminated portion 31, the refractive indices of the high refractive index layers 21 become gradually higher approaching the substrate 18 side. In addition, in the first laminated portion 31, the refractive indices of the low refractive index layers 20 become gradually lower approaching the substrate 18 side.

The second laminated portion 30 is adjacent to the first laminated portion 31 on the substrate 18 side thereof. In this second laminated portion 30, the refractive indices of the high refractive index layers 21 become gradually lower approaching the substrate 18 side. In addition, in the second laminated portion 30, the refractive indices of the low refractive index layers 20 become gradually higher approaching the substrate 18 side.

Moreover, the optical thickness of the high refractive index layers 21 and the optical thickness of the low refractive index layers 20 are different from each other.

Figure 9A:
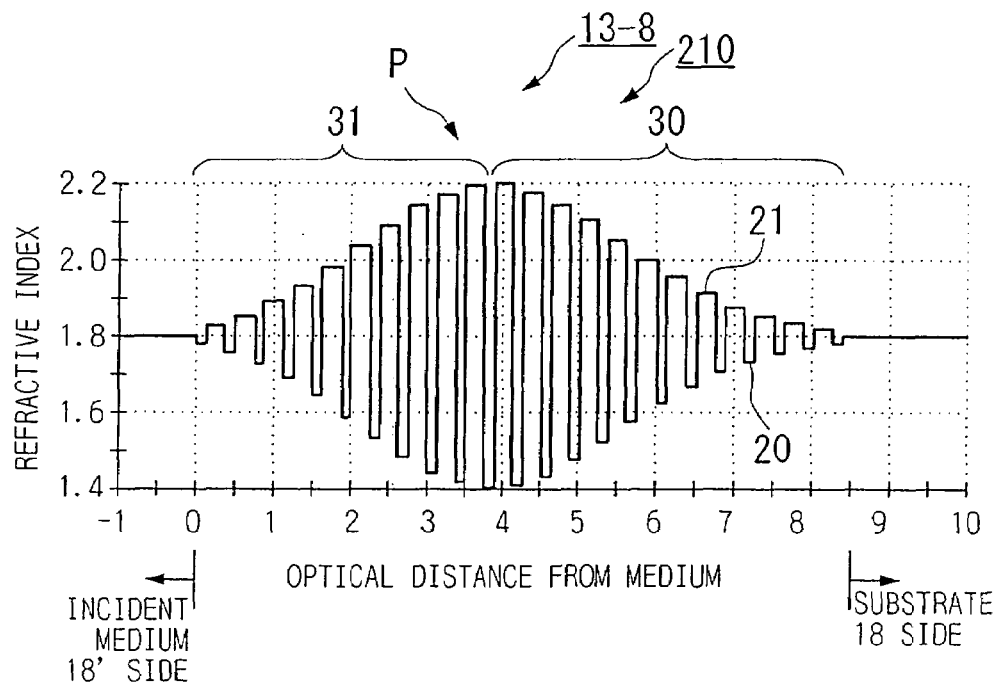
FIGS. 9A and 9B are graphs showing a film structure and spectral characteristics of an absorption filter in an eighth embodiment of the present invention.

In the present embodiment, as is shown in FIG. 9A, the refractive index of the substrate 18 is set to 1.8. In addition, the refractive indices of the low refractive index layers 20 change between less than 1.80 and 1.4. Moreover, the refractive indices of the high refractive index layers 21 change between 1.82 and 2.2.

Here, the results are shown when a simulation was performed for spectral transmittance of the absorption filter. In this simulation, in addition to the above structure, the total number of laminated layers of the thin film 210 is set at 45. The design wavelength is 800 nm. The optical thicknesses of the high refractive index layers 21 are 0.25 times the design wavelength, while the optical thicknesses of the low refractive index layers 20 are 0.125 times the design wavelength.

Moreover, in this simulation, there is no refractive index dispersion in the respective layers of the thin film 210. The results when transmittance was simulated using these parameters and conditions are shown in FIG. 9B.

This absorption layer 13-8 is provided with a stopband 33A, a transmission band 35A, and a transmission band 35B. In the stopband 33A, the central wavelength is 610 nm, and the bandwidth where transmittance is 0% is approximately 60 nm. The transmission bands 35A and 35B are provided with bandwidths that allow wavelengths other than these to be transmitted.

Figure 9B:
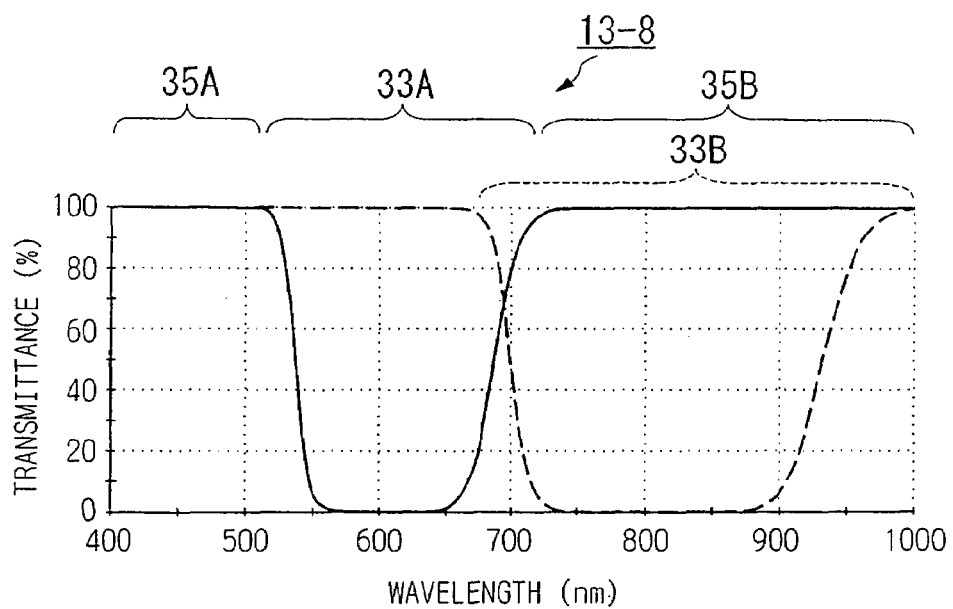

According to this absorption filter 13-8, as is shown, for example, in FIG. 9B, in the same way as in the seventh embodiment, it is possible to reduce ripples in the transmission bands of fluorescent light. Accordingly, when making an observation of fluorescent light, it is possible to consistently obtain a sufficient quantity of fluorescent light. In addition, the optical thicknesses of the high refractive index layers 21 and the low refractive index layers 20 are set at a ratio of 2:1. As a result, compared with when the optical thicknesses of the two are the same (i.e. as is the case conventionally), it is possible to narrow the bandwidth in the stopband 33B where transmittance is 0%. Specifically, for example, it is possible to contract a bandwidth of approximately 150 nm in a conventional stopband to a bandwidth of approximately 60 nm. In addition, it is possible to move the central wavelength of the stopband 33A from 800 nm towards the shorter wavelength side, for example, to 610 nm.

Figure 10A:
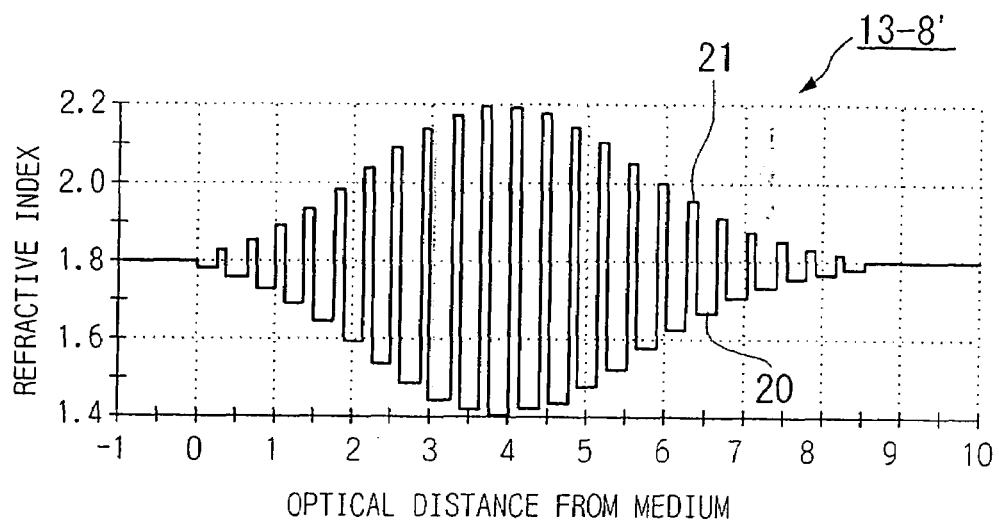
FIGS. 10A and 10B are graphs showing a film structure and spectral characteristics of an absorption filter in another example of the eighth embodiment of the present invention.
Figure 10B:
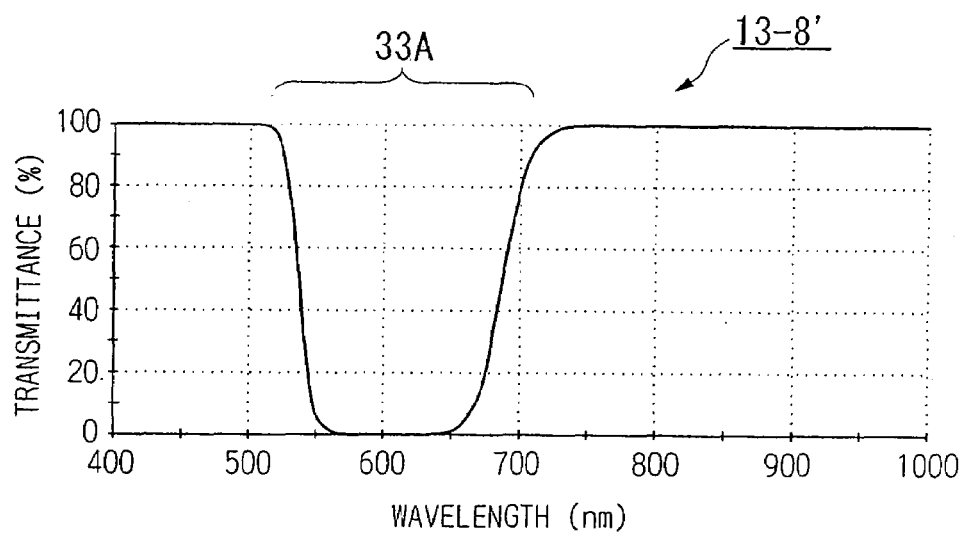

Note that, as in the case of the absorption filter 13-8' shown in FIG. 10A, it is possible to change the ratio of the optical thicknesses. For example, it is possible to set the optical thicknesses of the high refractive index layers 21 to 0.125 times the design wavelength, and to set the optical thicknesses of the low refractive index layers 20 to 0.25 times the design wavelength. In this case, the optical thickness ratio becomes 1:2, which is the reverse to that shown in FIG. 9A. However, even if this structure is employed, as is shown in FIG. 10B, it is still possible to form a stopband 33A that is the same as that shown in FIG. 9B. In FIG. 10B, the central wavelength and the bandwidth of the stopband 33A are substantially the same as those shown in FIG. 9B. In this way, it is possible to obtain the same operation and effects as those described above even if the ratio of the optical thicknesses is changed.

Figure 11A:
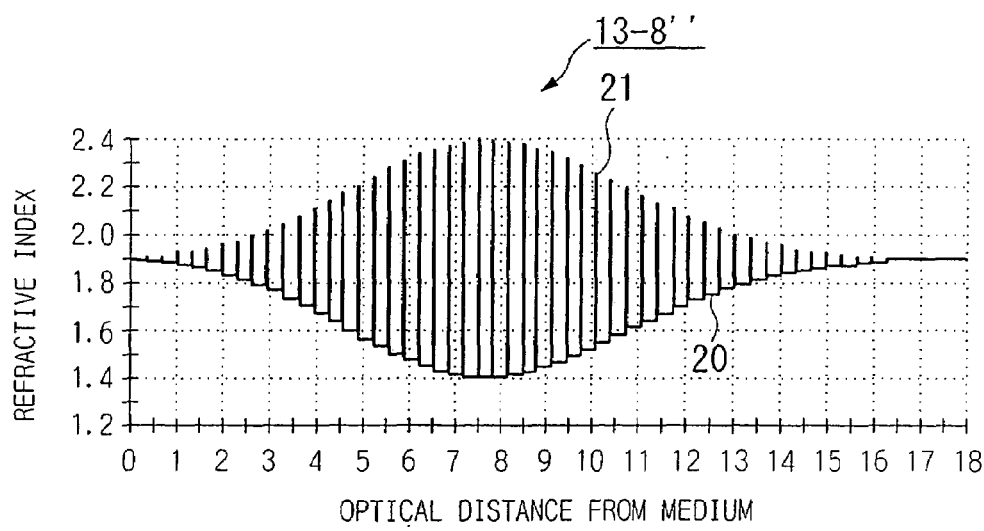
FIGS. 11A and 11B are graphs showing a film structure and spectral characteristics of an absorption filter in another example of the eighth embodiment of the present invention.
Figure 11B:
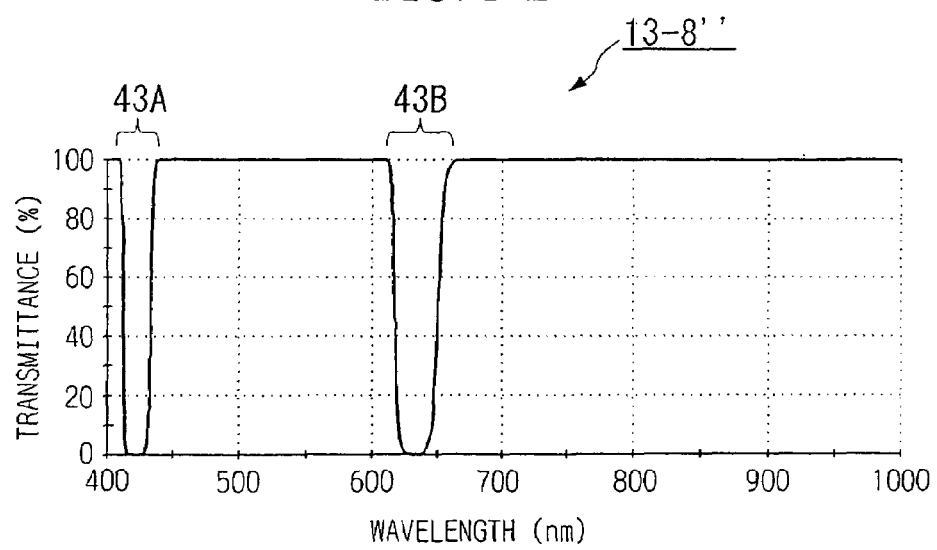

It is also possible to change the total number of layers of the thin film. A case in which the total number of layers of the thin film is 100 and the design wavelength is 1200 nm is shown in FIG. 11A. Here, the optical thicknesses of the high refractive index layers 21 are 0.025 times the design wavelength, while the optical thicknesses of the low refractive index layers 20 are 0.5 times the design wavelength. Accordingly, the optical thickness ratio is 1:20. In this case, the spectral transmittance characteristics of the absorption filter 13-8'' are as is shown in FIG. 11B. Here, in the stopband 43B, it is possible to contract a bandwidth where transmittance is 0% from a conventional approximately 80 nm to approximately 10 nm. In addition, it is possible to move the central wavelength from 610 nm to 420 nm. At the same time, it is possible to set a new stopband 43B in which the central wavelength is 630 nm.

Figure 12A:
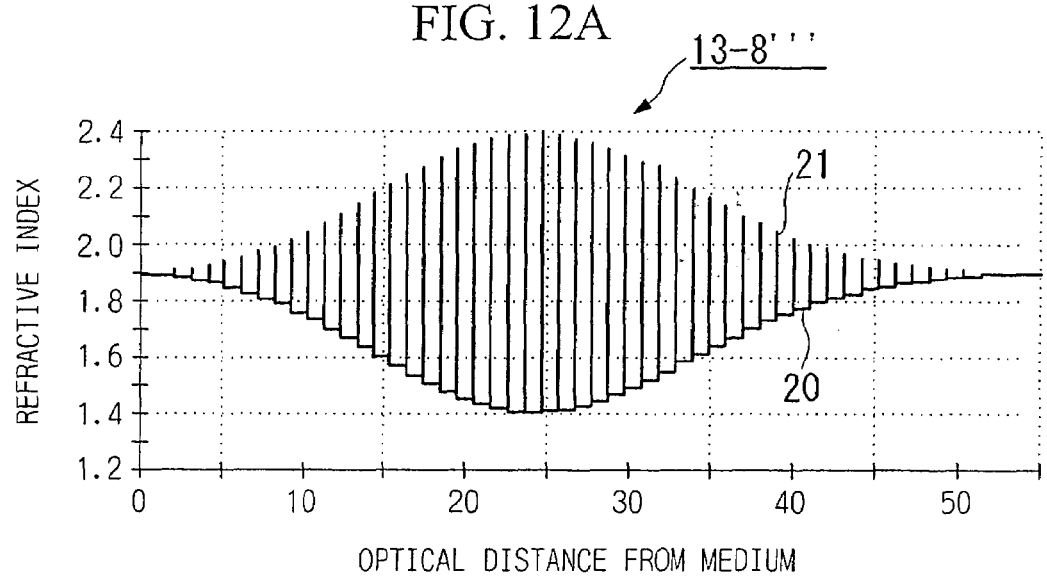
FIGS. 12A and 12B are graphs showing a film structure and spectral characteristics of an absorption filter in another example of the eighth embodiment of the present invention.
Figure 12B:
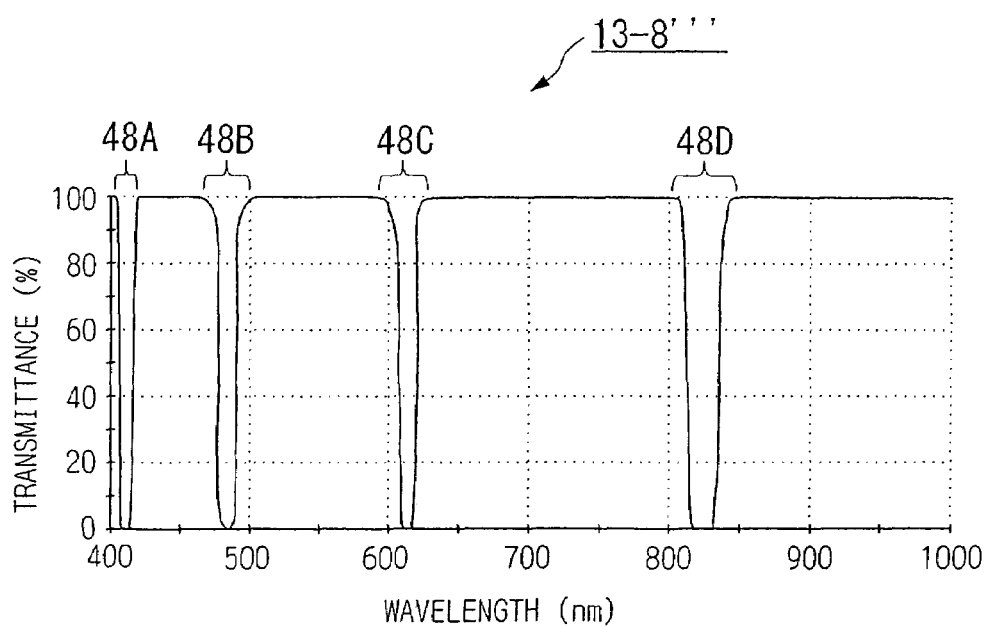

Another example in which the ratio of the optical thicknesses has been changed is shown in FIG. 12A. Here, the optical thicknesses of the high refractive index layers 21 are 0.025 times the design wavelength, while the optical thicknesses of the low refractive index layers 20 are 1.0 times the design wavelength. In this case, the optical thickness ratio is 1:40. In this case, the spectral transmittance characteristics of the absorption filter 13-8''' are as is shown in FIG. 12B. Here, in the stopband 48A, it is possible to contract a bandwidth where transmittance is 0% from a conventional approximately 30 nm to approximately 5 nm. In addition, it is possible to move the central wavelength of the stopband 48A to 410 nm. At the same time, it is possible to form a new stopband 48B in which the central wavelength is 490 nm, a new stopband 48C in which the central wavelength is 615 nm, and a new stopband 48D in which the central wavelength is 820 nm.

In these cases as well, is possible to obtain the same operation and effects as those described above.

In this way, by changing the optical thickness ratio between the high refractive index layers and the low refractive index layers, it is possible to move the stopband to an optional position. In addition, it is possible to set the bandwidth of the stopbands to an optional width. At this time, stopbands can be set in a plurality of wavelength bands.

Next, the ninth embodiment will be described with reference made to FIG. 13A. Note that, in the description given below, component elements that are the same as those in the above described embodiments are given the same symbols and a description thereof is omitted.

The absorption filter 13-9 of the ninth embodiment is provided with a thin film 220. The ninth embodiment differs from the above described embodiments in the following points. Namely, in the ninth embodiment, the thin film 220 is provided with a first refractive index profile P1 and a second refractive index profile P2. In addition, a laminated portion having the first refractive index profile P1 and a laminated portion having the second refractive index profile P2 are laminated consecutively.

The first refractive index profile P1 is represented by a first laminated portion 56 and a second laminated portion 58. The second refractive index profile P2 is represented by a first laminated portion 61 and a second laminated portion 63. The thin film 220 is formed by these four laminated portions. From the substrate 18 side towards the incident medium 18', the laminated portions are formed in order of the second laminated portion 63, the first laminated portion 61, the second laminated portion 58, and the first laminated portion 56. In addition, each laminated portion has low refractive index layers and high refractive index layers.

The first refractive index profile P1 will now be described. In the first laminated portion 56, the refractive indices of the high refractive index layers 55A become gradually higher approaching the substrate 18 side. In addition, in the first laminated portion 56, the refractive indices of the low refractive index layers 55B become gradually lower approaching the substrate 18 side.

The second laminated portion 58 is adjacent to the first laminated portion 56 on the substrate 18 side thereof. In this second laminated portion 58, the refractive indices of the high refractive index layers 57A become gradually lower approaching the substrate 18 side. In addition, in the second laminated portion 58, the refractive indices of the low refractive index layers 57B become gradually higher approaching the substrate 18 side.

The second refractive index profile P2 will now be described. The first laminated portion 61 is adjacent to the second laminated portion 58 on the substrate 18 side thereof. In this first laminated portion 61, the refractive indices of the high refractive index layers 60A become gradually higher approaching the substrate 18 side. In addition, in the first laminated portion 61, the refractive indices of the low refractive index layers 60B become gradually lower approaching the substrate 18 side.

The second laminated portion 63 is laminated on the substrate 18 side of the first laminated portion 61. In this second laminated portion 63, the refractive indices of the high refractive index layers 62A become gradually lower approaching the substrate 18 side. In addition, in the second laminated portion 63, the refractive indices of the low refractive index layers 62B become gradually higher approaching the substrate 18 side.

Out of the optical thicknesses of the high refractive index layers 55A and 57A in the first refractive index variation portion 52, the optical thicknesses of the low refractive index layers 55B and 57B in the first refractive index variation portion 52, the optical thicknesses of the high refractive index layers 60A and 62A in the second refractive index variation portion 53, and the optical thicknesses of the low refractive index layers 60B and 62B in the second refractive index variation portion 53, at least one refractive index variation portion has a optical thickness that is different from that of the others.

Figure 13A:
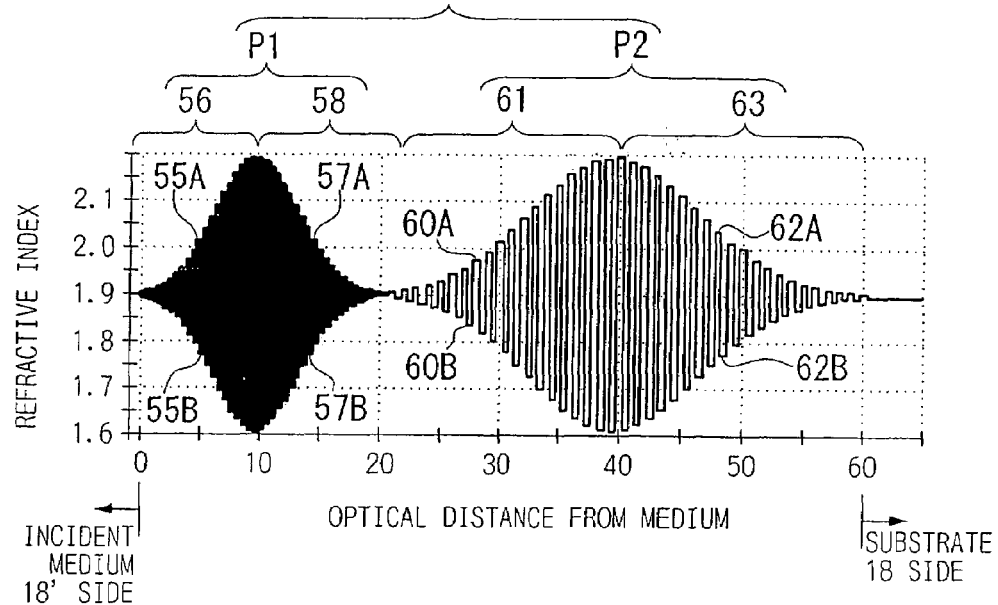
FIGS. 13A and 13B are graphs showing a film structure and spectral characteristics of an absorption filter in a ninth embodiment of the present invention.

In the present embodiment, as is shown in FIG. 13A, the refractive index of the substrate 18 is set to 1.9. In addition, the refractive indices of the high refractive index layers 55A, 57A, 60A, and 62A are changed between 1.9 and 2.2. The refractive indices of the low refractive index layers 55B, 57B, 60B, and 62B are changed between less than 1.9 and 1.6.

The laminated portion having the first refractive index profile P1 and the laminated portion having the second refractive index profile P2 each have a total of 80 laminated layers. Accordingly, in the thin film 220 as a whole, the total number of laminated layers is 160. The design wavelength is 1500 nm. In addition, in the first refractive index profile P1, the optical thicknesses of the high refractive index layers 55A and 57A and of the low refractive index layers 55B and 57B are each set to 0.25 times the design wavelength. In the second refractive index profile P2, the optical thicknesses of the high refractive index layers 60A and 62A and of the low refractive index layers 60B and 62B are each set to 0.5 times the design wavelength.

Figure 13B:
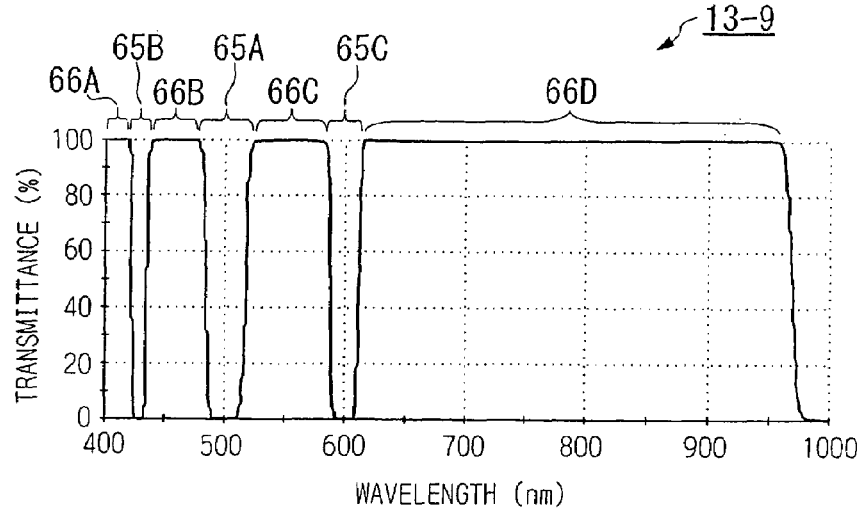

Here, the results are shown when a simulation was performed for spectral transmittance of the absorption filter. In this simulation, there is no refractive index dispersion in the respective layers of the thin film 51. The results when transmittance was simulated using these parameters and conditions are shown in FIG. 13B.

This absorption filter 13-9 is provided with a stopband 65A, a stopband 65B, a stopband 65C, and transmission bands 66A, 66B, 66C, and 66D. In the stopband 65A, a central wavelength where transmission is obstructed is 500 nm, and the bandwidth where transmittance is 0% is approximately 20 nm. In the stopband 65B, a central wavelength where transmission is obstructed is 430 nm, and the bandwidth where transmittance is 0% is approximately 10 nm. In the stopband 65C, a central wavelength where transmission is obstructed is 600 nm, and the bandwidth where transmittance is 0% is approximately 10 nm. The transmission bands 66A, 66B, 66C, and 66D are provided with bandwidths that allow wavelengths other than these to be transmitted.

According to the absorption filter 13-9 of the present embodiment, it is possible to form sharp boundaries between the stopbands 65A, 65B, and 65C, and the transmission bands 66A, 66B, 66C, and 66D, which are bands excluding these stopbands. Therefore, for example, even if the wavelength band of the fluorescent light is close to the wavelength of the excitation light, the excitation light and fluorescent light can be excellently separated. As a result, it is possible to increase the amount of fluorescent light that is transmitted. In addition, it is possible to more effectively suppress ripples in the transmission bands. Moreover, three stopbands 65A, 65B, and 65C can be set using a single absorption filter 13-9.

Next, the tenth embodiment will be described with reference made to FIG. 14A. Note that, in the description given below, component elements that are the same as those in the above described embodiments are given the same symbols and a description thereof is omitted.

The absorption filter 13-10 of the tenth embodiment is provided with a thin film 230. The tenth embodiment differs from the ninth embodiment in the following points. Namely, in the tenth embodiment, the refractive index maximum value in the high refractive index layers of the first refractive index profile P1 is different from the refractive index maximum value in the high refractive index layers of the second refractive index profile P2. In addition, the refractive index minimum value in the first refractive index profile P1 is different from the refractive index minimum value in the second refractive index profile P2.

Figure 14A:
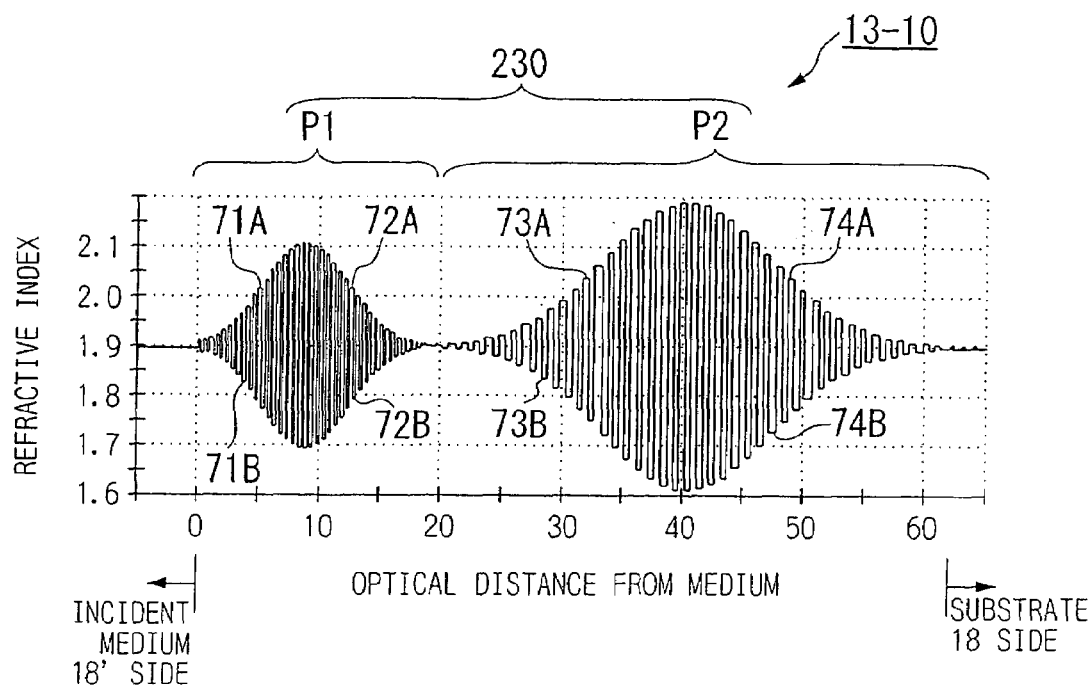
FIGS. 14A and 14B are graphs showing a film structure and spectral characteristics of an absorption filter in a tenth embodiment of the present invention.

In the present embodiment, as is shown in FIG. 14A, the refractive index of the substrate 18 is set to 1.9. In addition, in the first refractive index profile P1, the refractive indices of the high refractive index layers 71A and 72A are changed between 1.9 to 2.1. In contrast, in the first refractive index profile P1, the refractive indices of the low refractive index layers 71B and 72B are changed between less than 1.9 to 1.7. In the second refractive index profile P2, the refractive indices of the high refractive index layers 73A and 74A are changed between 1.9 to 2.2. In contrast, in the second refractive index profile P2, the refractive indices of the low refractive index layers 73B and 74B are changed between less than 1.9 to 1.6.

Figure 14B:
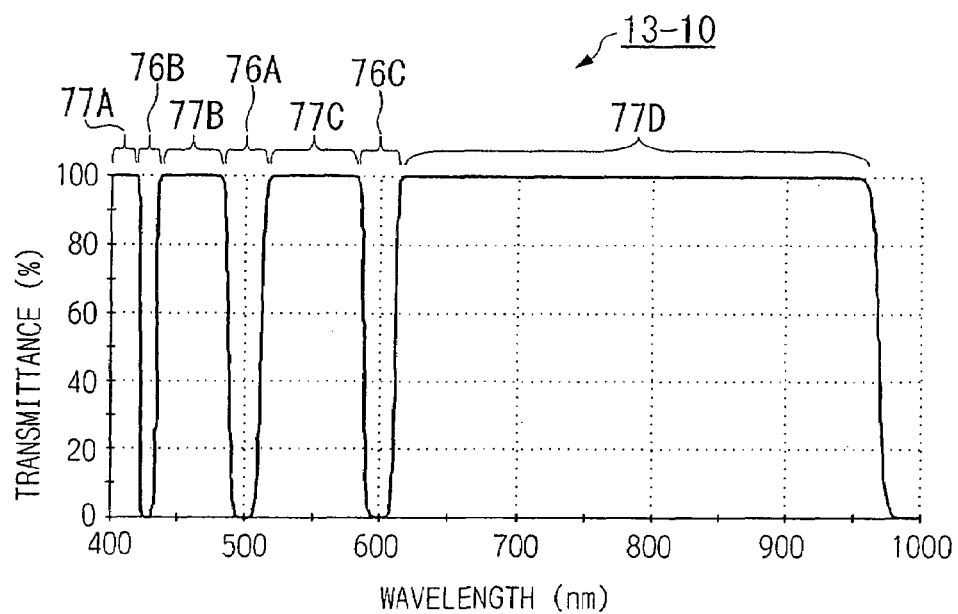

Here, the results are shown when a simulation was performed for spectral transmittance of the absorption filter. In this simulation, there is no refractive index dispersion in the respective layers of the thin film 67. The results when transmittance was simulated using these parameters and conditions are shown in FIG. 14B.

This absorption filter 13-10 has the same spectral characteristics as the absorption filter 13-9 according to the ninth embodiment. Namely, the absorption filter 13-10 is provided with a stopband 76A, a stopband 76B, a stopband 76C, and transmission bands 77Aa, 77B, 77C, and 77D. In the stopband 76A, the central wavelength is 500 nm. In the stopband 76B, the central wavelength is 430 nm. In the stopband 76C, the central wavelength is 600 nm. The transmission bands 77A, 77B, 77C, and 77D allow light of wavelengths other than these to pass through. Here, the bandwidth where the transmittance is 0% in the stopband 76A is 5 nm. In addition, the bandwidth of the stopband 76A is narrower than that of the stopband 65A of the absorption filter 13 according to the ninth embodiment.

According to this absorption filter 13-10 of the present embodiment, the same operation and effects as those from the absorption filter 13-9 of the ninth embodiment can be obtained. Moreover, by varying the refractive indices, the width of the stopbands can be optionally changed.

Figure 15A:
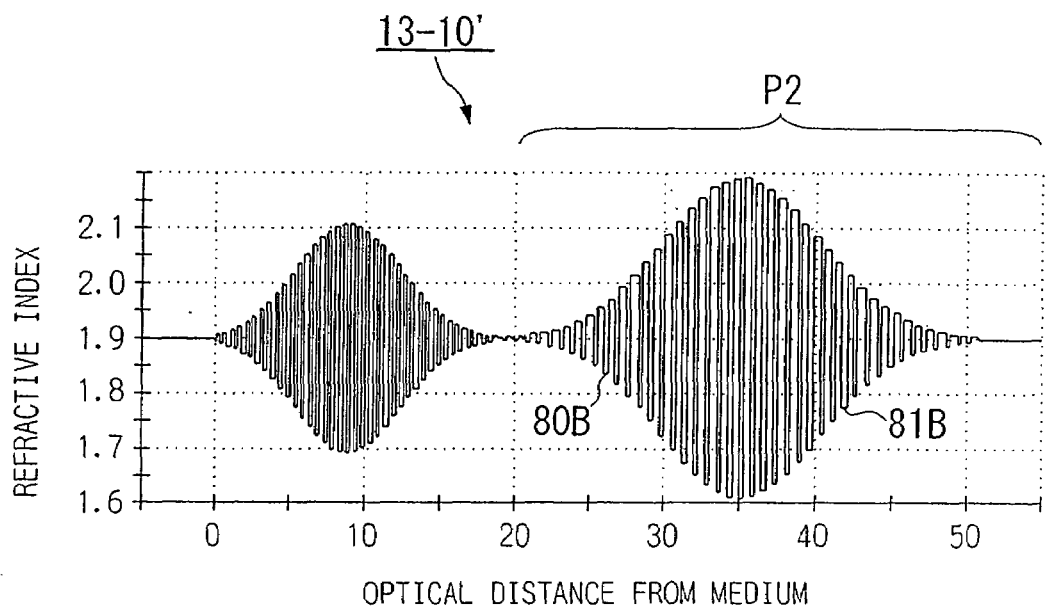
FIGS. 15A and 15B are graphs showing a film structure and spectral characteristics of an absorption filter in another example of the tenth embodiment of the present invention.
Figure 15B:
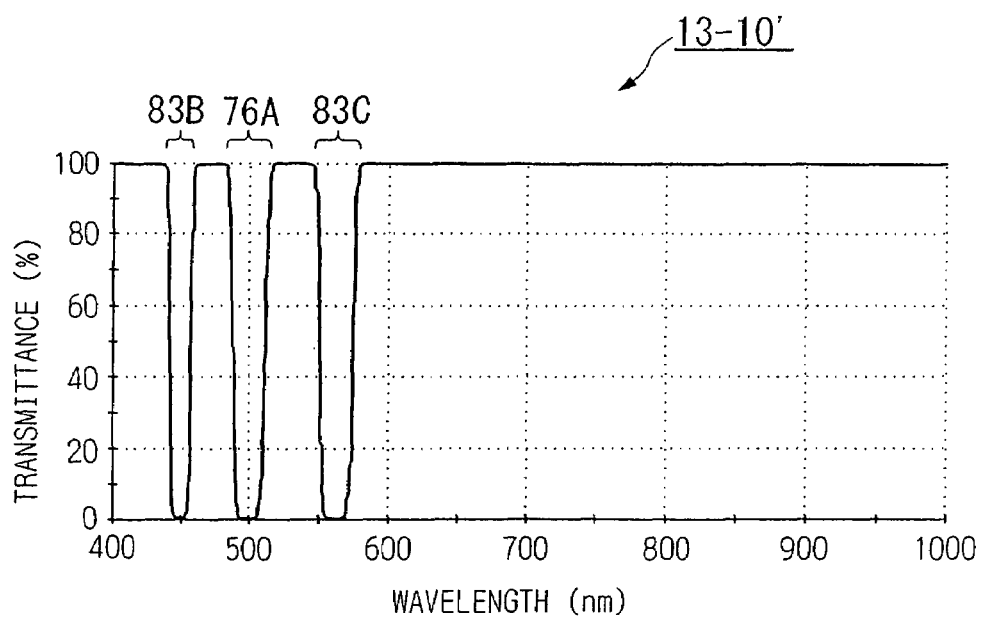

Note that it is also possible to alter the optical thicknesses in the second refractive index profile P2. An example of this is shown in FIG. 15A. In FIG. 15A, the optical thicknesses of the low refractive index layers 80B and 81B are altered. Specifically, the optical thicknesses of the low refractive index layers 80B and 81B are altered from 0.5 times the design wavelength to 0.25 times the design wavelength. The spectral transmittance characteristics of the absorption filter 13-10' in this case are shown in FIG. 15B. In the absorption filter 13-10' shown in FIG. 15A, in comparison with FIG. 14A, it is possible to move the central wavelength of the stopband 83B from 430 nm to 450 mn. In addition to this, it is possible to move the central wavelength of the stopband 83C from 600 nm to 570 mn.

Figure 16A:
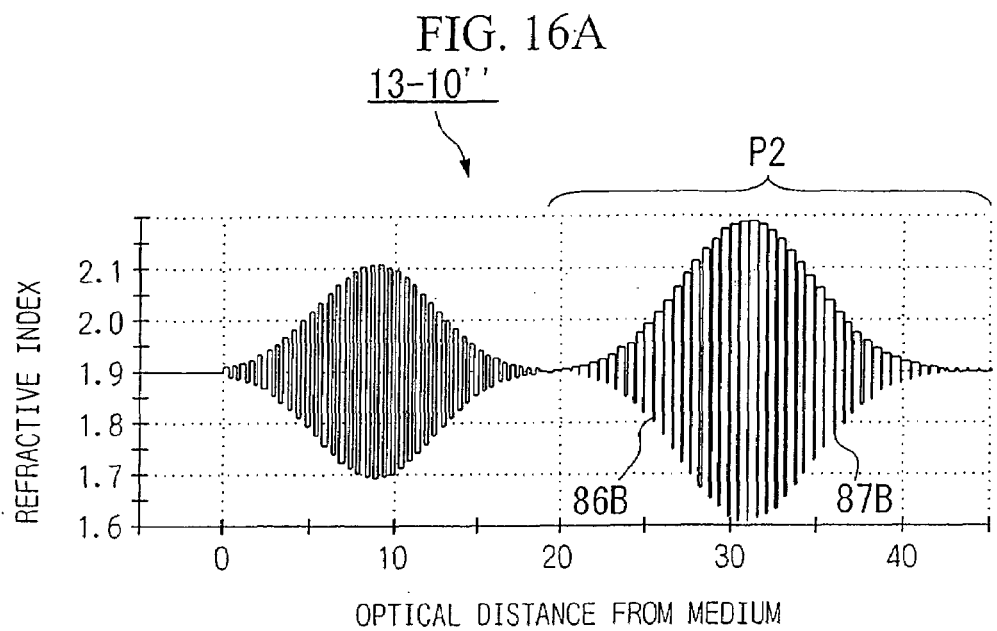
FIGS. 16A and 16B are graphs showing a film structure and spectral characteristics of an absorption filter in another example of the tenth embodiment of the present invention.
Figure 16B:
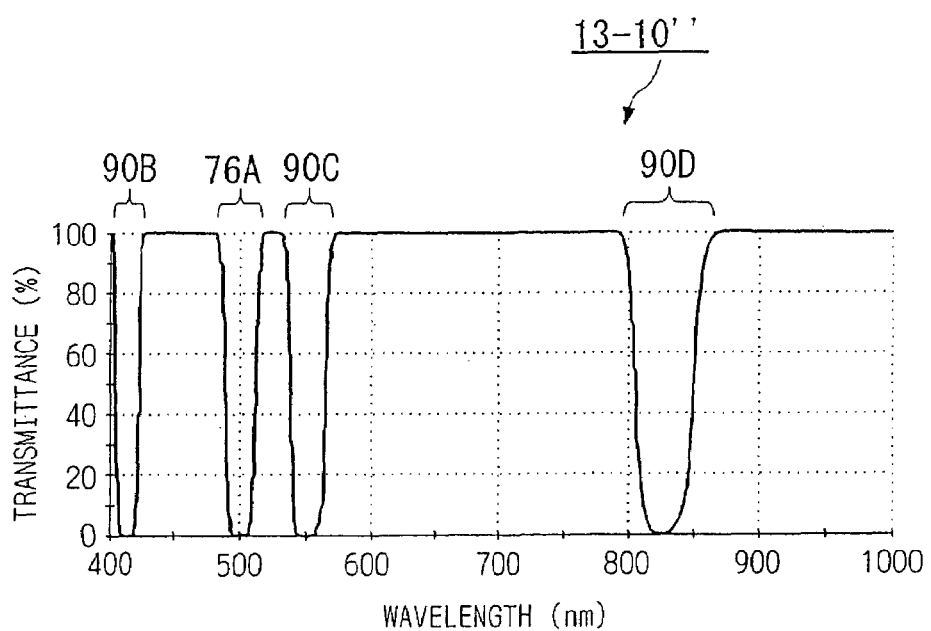

FIG. 16A shows another example. In this example, the optical thicknesses of the low refractive index layers 86B and 87B are 0.05 times the design wavelength. The spectral transmittance characteristics of the absorption filter 13-10" in this case are shown in FIG. 16B. In the absorption filter 13-10" shown in FIG. 16A, in comparison with FIG. 14A, it is possible to move the central wavelength of the stopband 90B from 430 nm to 420 nm. In addition to this, it is possible to move the central wavelength of the stopband 90C from 570 nm to 550 nm. Moreover, a new stopband 90D can be formed in which the central wavelength is 830 nm, and the bandwidth where the transmittance is 0% is approximately 10 nm.

According to these absorption filters 13-10' and 13-10", the same operation and effects as in the above described embodiments can be obtained. Moreover, by changing the optical thickness ratio, the positions of the stopbands can be set to optional positions.

Next, the eleventh embodiment of the present invention will be described with reference made to FIG. 17A. Note that, in the description given below, component elements that are the same as those in the above described embodiments are given the same descriptive symbols and a description thereof is omitted.

The absorption filter 13-11 of the eleventh embodiment is provided with a thin film 240. The eleventh embodiment differs from the tenth embodiment in the following points. Namely, in the thin film 240 of the absorption filter 13-11 according to the eleventh embodiment, the refractive indices of the low refractive index layers are substantially the same as the refractive index of the substrate.

The thin film 240 is provided with a first refractive index profile P1 and a second refractive index profile P2. In addition, a laminated portion having the first refractive index profile P1 and a laminated portion having the second refractive index profile P2 are laminated consecutively.

The first refractive index profile P1 is represented by a first laminated portion 96, a second laminated portion 97, and a third laminated portion 98. The second laminated portion 97 is laminated between the first laminated portion 96 and the third laminated portion 98. The second refractive index profile P2 is represented by a first laminated portion 103, a second laminated portion 105, and a third laminated portion 106. The second laminated portion 105 is laminated between the first laminated portion 103 and the third laminated portion 106.

The thin film 240 is formed by these six laminated portions. From the substrate 18 side towards the incident medium 18', the laminated portions are formed in order of the third laminated portion 106, the second laminated portion 105, the first laminated portion 103, the third laminated portion 98, the second laminated portion 97, and the first laminated portion 96. In addition, each laminated portion has low refractive index layers and high refractive index layers.

The first refractive index profile P1 will now be described. In the first laminated portion 96, the refractive indices of the high refractive index layers 101 become gradually higher approaching the substrate 18 side. In contrast, the refractive indices of the low refractive index layers 111 are uniform. In the third laminated portion 98, the refractive indices of the high refractive index layers 102 become gradually lower approaching the substrate 18 side. In contrast, the refractive indices of the low refractive index layers 111 are uniform. In the second laminated portion 97, the refractive indices of the high refractive index layers 100 are uniform. The refractive indices of the high refractive index layers 100 are substantially the same as the highest refractive index of the high refractive index layers 101 of the first laminated portion 96. Note that the refractive indices of the high refractive index layers 100 are substantially the same as the highest refractive index of the high refractive index layers 102 of the third laminated portion 98.

The second refractive index profile P2 will now be described. In the first laminated portion 103, the refractive indices of the high refractive index layers 108 become gradually higher approaching the substrate 18 side. In contrast, the refractive indices of the low refractive index layers 112 are uniform. In the third laminated portion 106, the refractive indices of the high refractive index layers 110 become gradually lower approaching the substrate 18 side. In contrast, the refractive indices of the low refractive index layers 112 are uniform. In the second laminated portion 105, the refractive indices of the high refractive index layers 107 are uniform. The refractive indices of the high refractive index layers 107 are substantially the same as the highest refractive index of the high refractive index layers 108 of the first laminated portion 103. Note that the refractive indices of the high refractive index layers 107 are substantially the same as the highest refractive index of the high refractive index layers 110 of the third laminated portion 106.

In addition, the refractive indices of the low refractive index layers 111 in the first refractive index profile P1 and the refractive indices of the low refractive index layers 112 in the second refractive index profile P2 are substantially the same as the refractive index of the substrate 18.

Figure 17A:
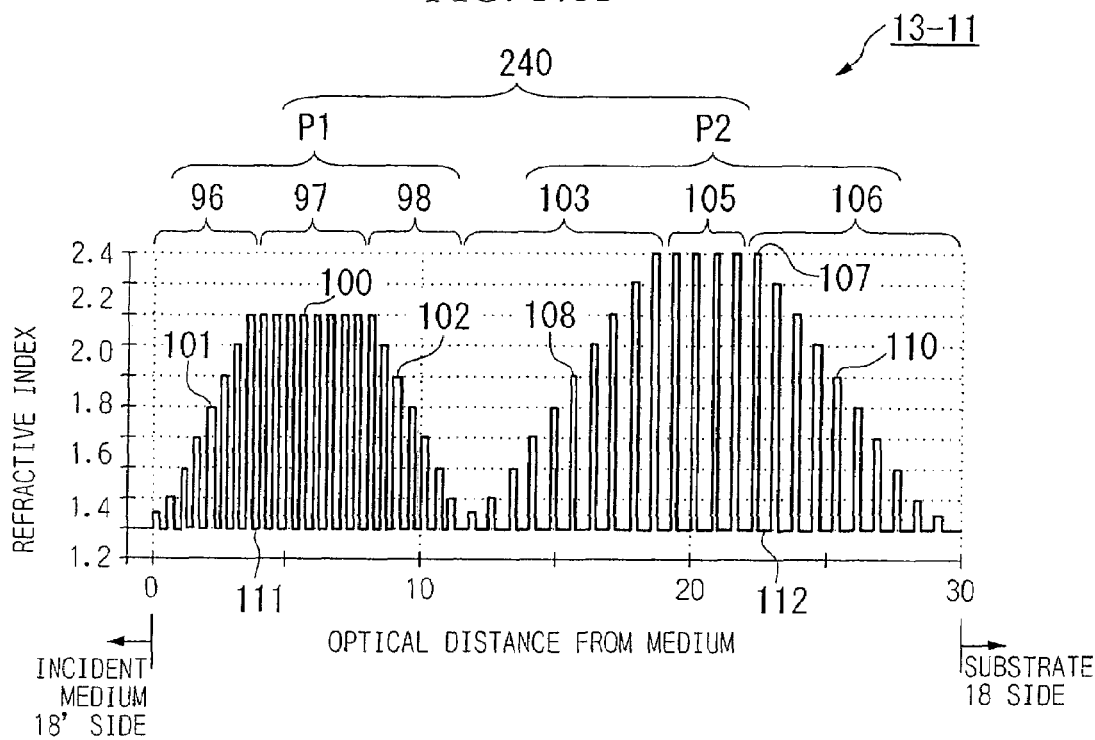
FIGS. 17A and 17B are graphs showing a film structure and spectral characteristics of an absorption filter in a eleventh embodiment of the present invention.

In the present embodiment, as is shown in FIG. 17A, the refractive index of the substrate 18 and the refractive indices of the low refractive index layers 111 and 112 are set to 1.5. The refractive indices of the high refractive index layers 101 and 102 are changed between 1.55 and 2.2. In addition, the refractive indices of the high refractive index layers 100 are set to 2.2. The refractive indices of the high refractive index layers 108 and 110 are changed between 1.55 and 2.4. The refractive indices of the high refractive index layers 107 are set to 2.4.

The total number of the laminated sections having the first refractive index profile P1 and the laminated sections having the second refractive index profile P2 is 97. Moreover, the design wavelength is 600 nm. In the first refractive index profile P1, the optical thicknesses of the high refractive index layers 100, 101, and 102 and of the low refractive index layers 111 are each 0.25 times the design wavelength. In contrast, in the second refractive index profile P2, the optical thicknesses of the high refractive index layers 107, 108, and 110 are each 0.25 times the design wavelength, while the optical thicknesses of the low refractive index layers 112 are 0.5 times the design wavelength.

Figure 17B:
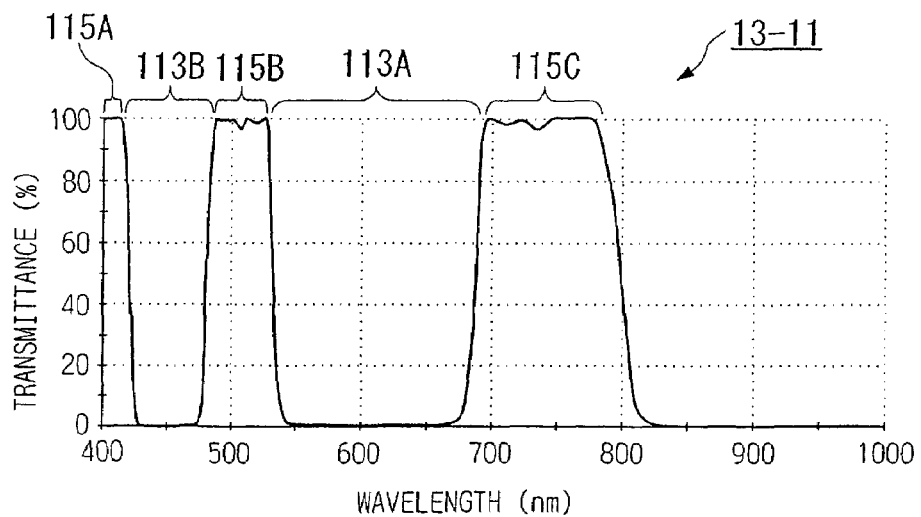

Here, the results are shown when a simulation was performed for spectral transmittance of the absorption filter. In this simulation, there is no refractive index dispersion in the respective layers of the thin film 240. The results when transmittance was simulated using these parameters and conditions are shown in FIG. 17B.

This absorption filter 13-11 is provided with a stopband 113A, a stopband 113B, and transmission bands 115A, 115B, and 115C. In the stopband 113A, the central wavelength is 600 nm and the bandwidth where transmittance is 0% is approximately 120 nm. In the stopband 113B, the central wavelength is 450 nm and the bandwidth where transmittance is 0% is approximately 40 nm. The transmission bands 115A, 115B, and 115C are provided with bandwidths that allow wavelengths other than these to pass through.

According to this absorption filter 13-11, the same operation and effects as in the above described embodiments can be obtained. Moreover, by changing the optical thickness ratio, the positions of the stopbands can be set to optional positions. In addition to this, by changing the refractive indices, the width of the stopbands can be adjusted to an optional width.

Figure 18A:
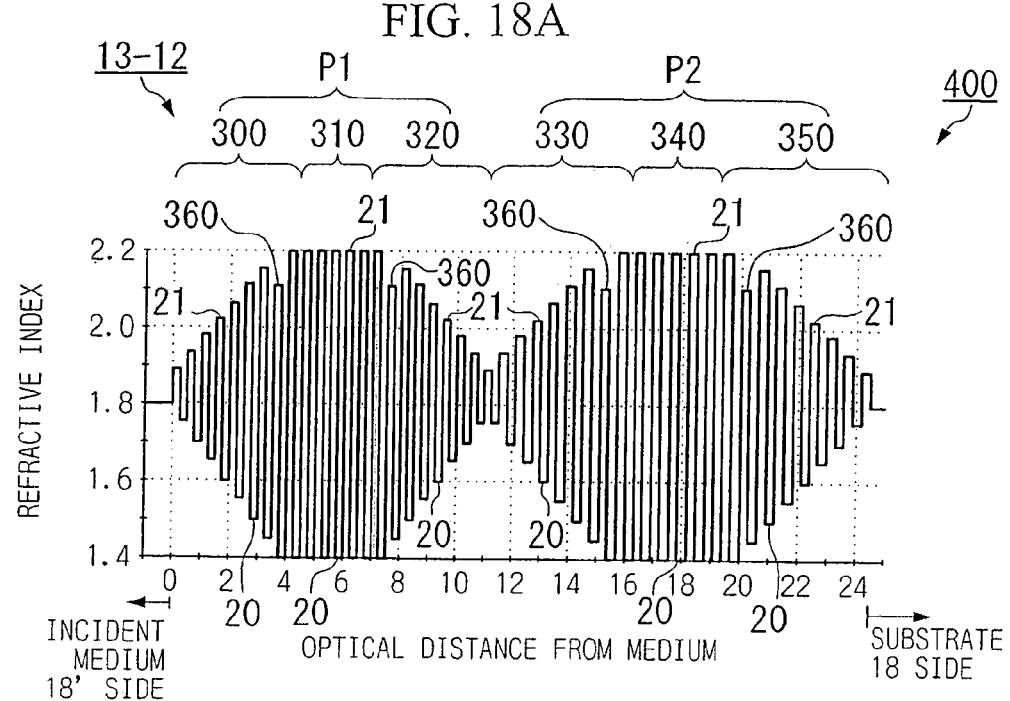
FIGS. 18A and 18B are graphs showing a film structure and spectral characteristics of an absorption filter in a twelfth embodiment of the present invention.

Next, the twelfth embodiment will be described with reference made to FIG. 18A.

The absorption filter 13-12 of the present embodiment is provided with a thin film 400. As is shown in FIG. 18A, this thin film 400 is formed by a laminated portion having a first refractive index profile P1 and a laminated portion having a second refractive index profile P2. Each laminated portion has low refractive index layers and high refractive index layers. These low refractive index layers and high refractive index layers are laminated alternatingly.

The first refractive index profile P1 is represented by a first laminated portion 300, a second laminated portion 310, and a third laminated portion 320. These three laminated portions are laminated from the substrate 18 side in order of the third laminated portion 320, the second laminated portion 310, and the first laminated portion 300. Here, the refractive index distributions of each laminated portion are as is described below.

In the first laminated portion 300, the refractive indices of the high refractive index layers 21 become gradually higher approaching the substrate 18. In addition, in the first laminated portion 300, the refractive indices of the low refractive index layers 20 become gradually lower approaching the substrate 18.

The second laminated portion 310 is adjacent to the first laminated portion 300. In the second laminated portion 310, the refractive indices of the high refractive index layers 21 are uniform. The refractive indices of these high refractive index layers 21 are substantially the same as the highest refractive index of the high refractive index layers 21 that constitute the first laminated portion 300. In addition, in the second laminated portion 310, the refractive indices of the low refractive index layers 20 are uniform. The refractive indices of the low refractive index layers 20 are substantially the same as the lowest refractive index of the first laminated portion 300.

The third laminated portion 320 is adjacent to the second laminated portion 310. In the third laminated portion 320, the refractive indices of the high refractive index layers 21 become gradually lower from the second laminated portion 310 side. In addition, in the third laminated portion 320, the refractive indices of the low refractive index layers 20 become gradually higher from the second laminated portion 310.

The second refractive index profile P2 has the same profile as that of the first refractive index profile P1. The second refractive index profile P2 is represented by a fourth laminated portion 330, a fifth laminated portion 340, and a sixth laminated portion 350. These three laminated portions are laminated from the substrate 18 side in order of the sixth laminated portion 350, the fifth laminated portion 340, and the fourth laminated portion 330.

The fourth laminated portion 330 has the same refractive index distribution as that of the first laminated portion 300. The fifth laminated portion 340 has the same refractive index distribution as that of the second laminated portion 310. The sixth laminated portion 350 has the same refractive index distribution as that of the third laminated portion 320.

The low refractive index layers 20 are mainly formed from magnesium fluoride, while the high refractive index layers 21 are mainly formed from niobium oxide.

In the present embodiment, the refractive index of the substrate 18 is set to 1.8. In addition, the refractive indices of the high refractive index layers 21 are changed from 1.9 to 2.2. The refractive indices of the low refractive index layers 20 are changed from 1.4 to 1.75.

This thin film 400 has refractive index variation layer portions. For example, if the vicinity of the boundary between the first laminated portion 330 and the second laminated portion 310 is observed, it can be seen that a layer 360 is present here that is lower than the high refractive index layers 21 on both sides thereof. Because this layer 360 is on the high refractive index side, here, it is taken as a high refractive index variation layer portion 360. This high refractive index variation layer portion 360 is provided on the first laminated portion 330 side.

In the same way, a high refractive index variation layer portion 360 is also provided in the vicinity of the boundary between the second laminated portion 310 and the third laminated portion 320. This high refractive index variation layer portion 360 is provided on the third laminated portion 320 side. In the present embodiment, the refractive indices of the high refractive index layers 21 and the second laminated portion 310 are 2.2. In addition, the refractive index of the high refractive index variation layer portions 360 are set to 2.1.

In the first and second refractive index profile is P1 and P2, in each profile, the central wavelengths of the wavelength bands where transmission is blocked are taken as λ1 and λ2. The design wavelength is taken as λ1/n, λ2/m (wherein n and m are integers). At this time, if, for example, n=m=1, the design wavelength become respectively λ1 and λ2. The optical thicknesses of the high refractive index layers 21 and the low refractive index layers 20 in each refractive index profile are each set at one quarter of the design wavelength.

In the present embodiment, λ1 is set to 600 nm and λ2 is set to 720 nm. Accordingly, the respective optical thicknesses are 150 nm and 180 nm.

Figure 18B:
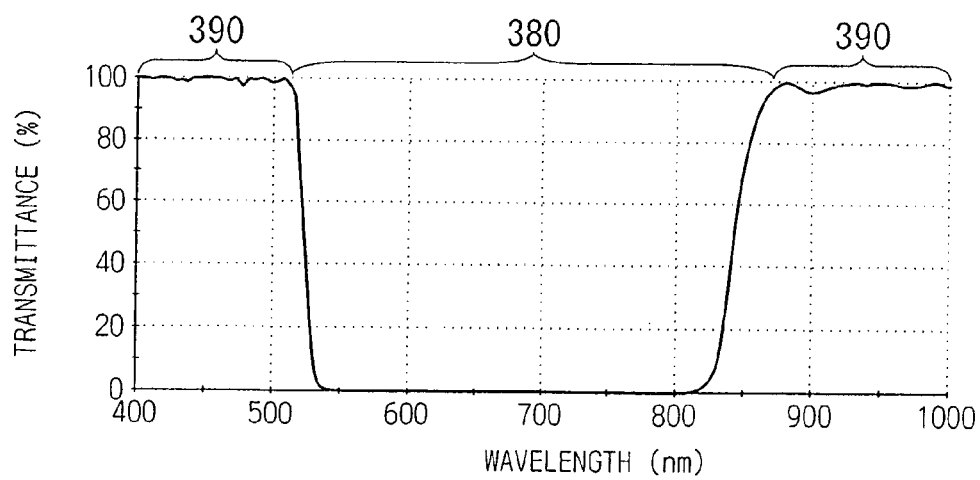

Here, the results are shown when a simulation was performed for spectral transmittance of the absorption filter. In this simulation, in addition to the above structure, the total number of laminated layers is set at 89. In addition, a substrate having a refractive index of 1.8 is also provided on the incident medium 18' side of the thin film 400. In this simulation, there is also no refractive index dispersion in each layer. The results of a simulation with these parameters and conditions are shown in FIG. 18B. In FIG. 18B, transmission bands 390 are formed on both sides of a stopband 380. Here, the stopband 380 is the waveband to which, for example, excitation light and the like belongs. Accordingly, in this waveband, excitation light is prevented from being irradiated onto the observation side (i.e., onto the ocular lens 14 shown in FIG. 1). In contrast, the transmission bands 390 are wavebands to which fluorescent light belongs. Accordingly, in these wavebands, fluorescent light is allowed to pass through to the observation side.

According to this absorption filter 13-12, for example, as is shown in FIG. 18B, it is possible to widen the stopband 380. This is because the refractive index distribution is the same and also because a plurality of lamination patterns of different optical thicknesses are employed. Moreover, the first refractive index profile P1 and the second refractive index profile P2 only have different optical thicknesses from each other, and the refractive index distributions of the respective refractive index profiles are the same. Consequently, the film structure allows control to be simplified during film formation. As a result, it is possible to improve the consistency of the optical characteristics.

Figure 19A:
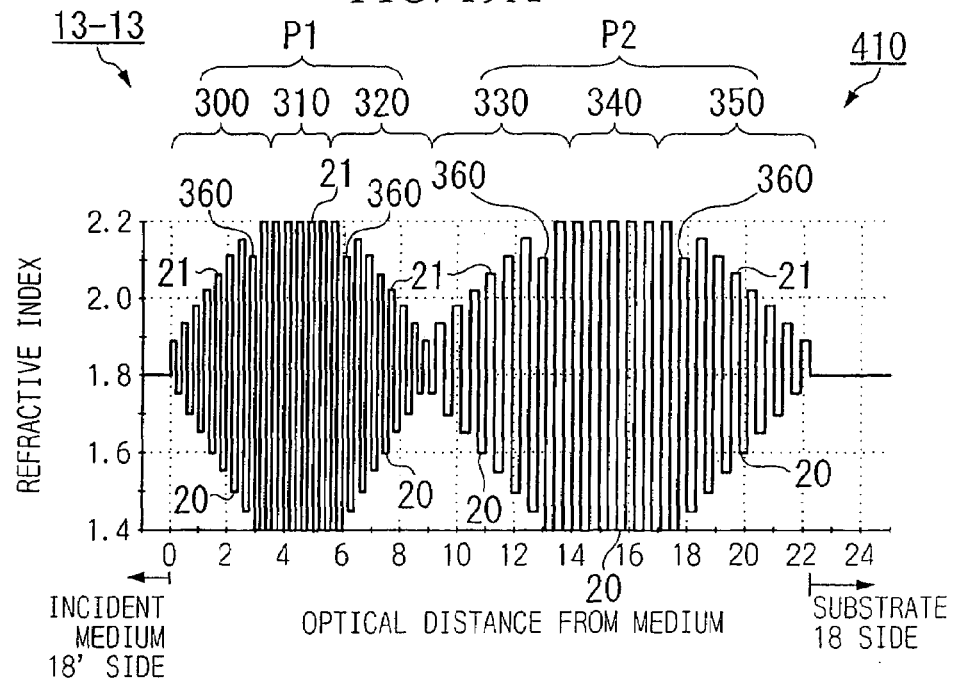
FIGS. 19A and 19B are graphs showing a film structure and spectral characteristics of an absorption filter in a thirteenth embodiment of the present invention.

Next, the thirteenth embodiment will be described with reference made to FIG. 19A. Note that, in the description given below, component elements that are the same as those in the above described embodiments are given the same symbols and a description thereof is omitted.

The absorption filter 13-13 of the thirteenth embodiment differs from that of the twelfth embodiment in the following points. Namely, in that the wavelength λ1 in the first refractive index profile P1 is 480 nm, and in that the optical thickness thereof is 120 nm.

In the present embodiment as well, the total number of laminated layers of the thin film 410 is 89. In addition, a substrate having a refractive index of 1.8 is also provided on the incident medium 18' side of the thin film 410. In this simulation, there is also no refractive index dispersion in each layer. The results of a simulation with these parameters and conditions are shown in FIG. 19B.

Figure 19B:
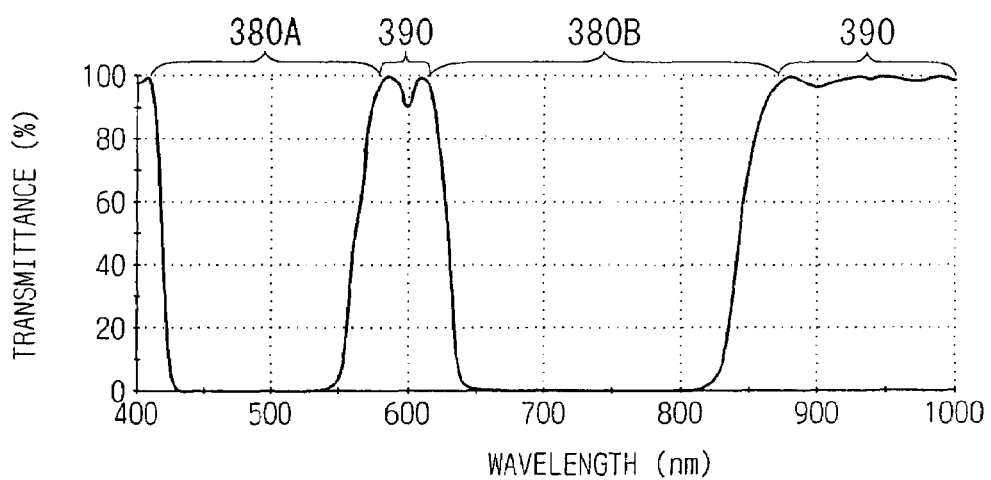

According to the absorption filter of the present embodiment, as is shown in FIG. 19B, a stopband 380A is formed by the first refractive index profile P1 and a stopband 380B is formed by the second refractive index profile P2. At this time, the stopband 380A and the stopband 380B are formed in separated positions. Accordingly, it is possible to obtain filter characteristics having a transmission region 390 between the two.

Figure 20A:
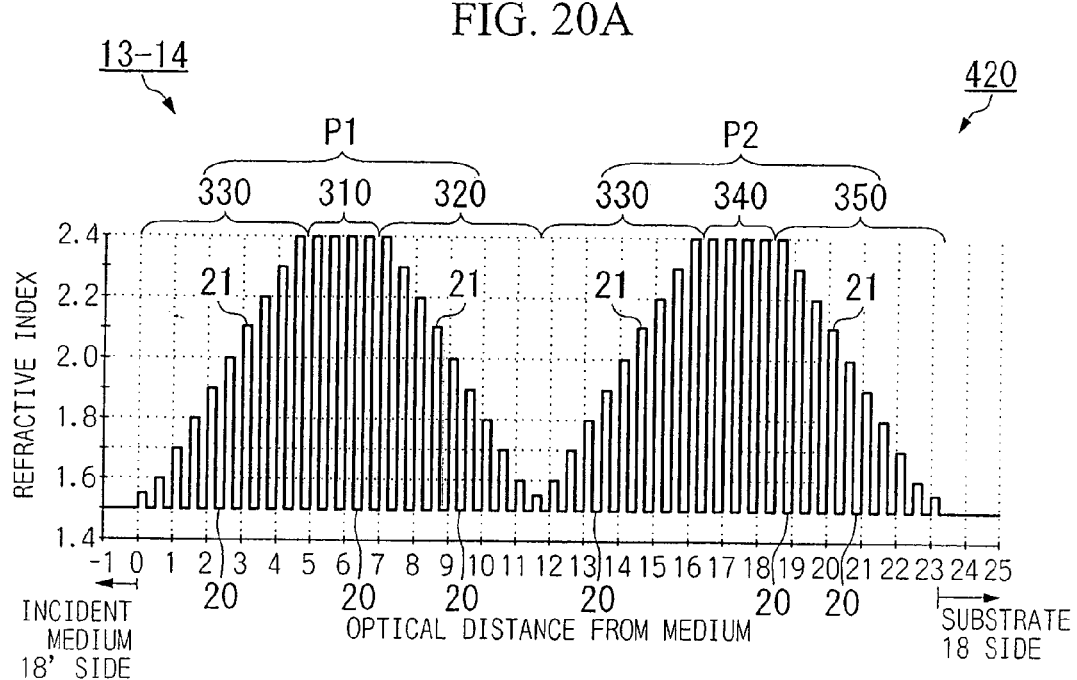
FIGS. 20A and 20B are graphs showing a film structure and spectral characteristics of an absorption filter in a fourteenth embodiment of the present invention.

Next, the fourteenth embodiment will be described with reference made to FIG. 20A. Note that, in the description given below, component elements that are the same as those in the above described embodiments are given the same symbols and a description thereof is omitted.

The absorption filter 13-14 of the fourteenth embodiment differs from that of the twelfth embodiment in the following points. Namely, in the thin film 420 of the fourteenth embodiment, the refractive indices of the low refractive index layers 20 are uniformly set to the same value as the refractive index of the substrate 18. This is the same in both the first refractive index profile P1 and the second refractive index profile P2. The absorption filter 13-14 also differs in that there are no refractive index variation layer portions 360.

Namely, the thin film 420 is formed by first through sixth laminated portions 300 to 350, however, the refractive indices of the low refractive index layers 20 that constitute each laminated portion are set to the same value as the refractive index of the substrate 18.

In the present embodiment, the refractive index of the substrate 18 is set to 1.5. The refractive indices of the high refractive index layers 21 are changed from 1.55 to 2.4. In addition, the refractive indices of the low refractive index layers 20 are set to a uniform value of 1.5.

Here, the results are shown when a simulation was performed for spectral transmittance of the absorption filter. In this simulation, in addition to the above structure, the total number of laminated layers is set at 93. In addition, a substrate having a refractive index of 1.5 is also provided on the incident medium 18' side of the thin film 420. In this simulation, there is also no refractive index dispersion in each layer. The results of a simulation with these parameters and conditions are shown in FIG. 20B.

Figure 20B:
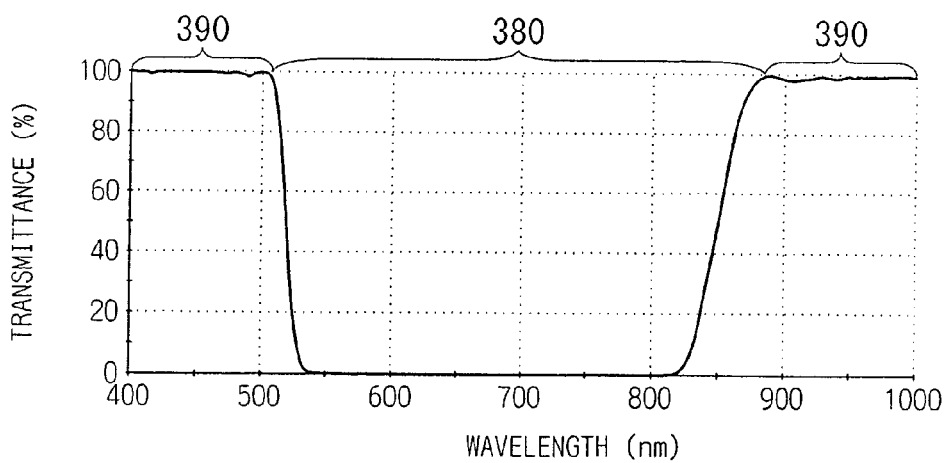

According to the absorption filter of the present embodiment as well, for example as is shown in FIG. 20B, it is possible to obtain a wide stopband 380 in the same way as in the above described first embodiment. Namely, it is possible to obtain filter characteristics in which the stopband of the first refractive index profile P1 and the stopband of the second refractive index profile P2 are combined.

Note that, in the above described embodiment, n=m=1. In addition, the design wavelength is the same as the central wavelength in each lamination pattern. Moreover, the optical thicknesses of the high refractive index layers 21 and the low refractive index layers 20 are set to one quarter of the design wavelength. However, it is also possible for n=m=2. In this case, the optical thicknesses of the high refractive index layers 21 and the low refractive index layers 20 are set to one half of the design wavelength. It is possible to obtain a spectral filter having exactly the same spectral characteristics even if a thin film is formed under these conditions.

Furthermore, it is also possible to use a design wavelength of 600/n (wherein n is an integer) nm for a central wavelength of 600 nm. In addition, the optical thicknesses of the high refractive index layers 21 and the low refractive index layers 20 are set at n/4 of the design wavelength. Even when a thin film is formed under these conditions, it is still possible to obtain an absorption filter having exactly the same spectral characteristics.

Next, the fifteenth embodiment of the present invention will be described with reference made to FIG. 21A.

The absorption filter 13-15 is formed by a glass substrate 18, and by a thin film 500 that is formed on top of the substrate 18. This absorption filter 13-15 differs from the absorption filters previously described in that there is no incident side medium 18'. Due to this structure, the absorption filter 13-15 of the present embodiment selectively allows only the above described fluorescent light to pass through.

As is shown in FIG. 21A, the thin film 500 is formed by an outermost layer portion 600 and a portion having a refractive index profile 610. The portion having the refractive index profile 610 has low refractive index layers and high refractive index layers. In the portion having the refractive index profile 610, these low refractive index layers and high refractive index layers are laminated alternatingly.

The outermost layer portion 600 is in contact with air (i.e., an optical medium) 18" whose refractive index is lower than that of the substrate 18. The refractive indices of the low refractive index layers 20 of the portion having the refractive index profile 610 are higher than the refractive index of the air 18" and equal to or lower than the refractive index of the substrate 18. The refractive indices of the high refractive index layers 21 of the portion having the refractive index profile 610 are relatively higher than the refractive indices of the low refractive index layers 20.

The outermost layer portion 600 will now be described. As is described above, the outermost layer portion 600 is in contact with the air 18". This outermost layer 600 has an outermost low refractive index layer 600A, a first outermost high refractive index layer 600B, and a second outermost high refractive index layer 600C.

In the outermost low refractive index layer 600A, the refractive index is set to be higher than the refractive index of air and equal to or lower than the refractive index of the substrate. The first outermost high refractive index layer 600B is laminated onto the outermost low refractive index layer 600A. In the first outermost high refractive index layer 600B, the refractive index is set to be higher than the refractive index of the outermost low refractive index layer 600A. The second outermost high refractive index layer 600C is laminated onto the first high refractive index layer 600B. In the second outermost high refractive index layer 600C, the refractive index is set to be higher than the refractive index of the first outermost high refractive index layer 600B.

The refractive index profile P will now be described. The refractive index profile P is represented by a first laminated portion 610A, a second laminated portion 610B, and a third laminated portion 610C.

The first laminated portion 610A is laminated on the substrate 18 side of the outermost layer portion 600. In the first laminated portion 610A, low refractive index layers 20 are adjacent to the outermost layer portion 600. In addition, high refractive index layers 21 are adjacent to the outermost layer portion 600. In the first laminated portion 610A, the refractive indices of the high refractive index layers 21 are higher than the refractive index of the second outermost high refractive index layer 600C. Moreover, in the first laminated portion 610A, the refractive indices of the high refractive index layers 21 become gradually higher approaching the substrate 18 side. In addition, in the first laminated portion 610A, the refractive indices of the low refractive index layers 20 are uniform. The refractive indices of the low refractive index layers 20 are substantially the same as the refractive index of the outermost low refractive index layer 600A.

The third laminated portion 610C is laminated on the substrate 18 side of the first laminated portion 610A. In the third laminated portion 610C, the refractive indices of the high refractive index layers 21 become gradually lower approaching the substrate 18 side. In addition, in the third laminated portion 610C, the refractive indices of the low refractive index layers 20 become gradually higher approaching the substrate 18 side. Note that the refractive indices of the low refractive index layers 20 ultimately become substantially the same as the refractive index of the substrate 18.

The second laminated portion 610B is laminated between the first laminated portion 610A and the third laminated portion 610C. In the second laminated portion 610B, the refractive indices of the high refractive index layers 21 are uniform. The refractive indices of the high refractive index layers 21 are substantially the same as the highest refractive index of the high refractive index layers 21 in the first laminated portion 610A. In addition, in the second laminated portion 610B, the refractive indices of the low refractive index layers 20 are uniform. The refractive indices of the low refractive index layers 20 are substantially the same as the refractive index of the outermost low refractive index layer 600A.

Here, the low refractive index layers 20 are mainly formed from magnesium fluoride, while the high refractive index layers 21 are mainly formed from tantalum oxide.

In the present embodiment, the refractive index of the substrate 18 is set to 1.52. In addition, the refractive index of the outermost low refractive index layer 600A in the outermost layer portion 600 is set to 1.4, while the refractive indices of the first outermost high refractive index layer 600B and the second outermost high refractive index layer 600C of the outermost layer portion 600 are set respectively to 1.5 and 1.6.

Moreover, in the first laminated portion 610A, the refractive indices of the high refractive index layers 21 are changed from 1.7 to 2.2. In addition, in the third laminated portion 610C, the refractive indices of the high refractive index layers 21 are changed from 1.52 to 2.2. In the first laminated portion 610A and the second laminated portion 610B, the refractive indices of the low refractive index layers 20 are set to 1.4. In addition, in the third laminated portion 610C the refractive indices of the low refractive index layers 20 are changed from 1.4 to less than 1.52.

In the thin film 500 of the present embodiment, the total number of laminated layers is 45. This number is the total number from the substrate 18 side to the outermost low refractive index layer 600A of the outermost layer portion 600. The design wavelength is 600 nm. The optical thickness of each layer is 0.25 times the design wavelength.

In the simulation, there was no refractive index dispersion in the respective layers. The results of a simulation with these parameters and conditions are shown in FIG. 21B.

This absorption filter 13-15 is provided with a stopband 700 and transmission bands 710A and 710B. In the stopband 700, the central wavelength where transmission is obstructed is approximately 610 nm. In addition, in the stopband 700, the bandwidth where transmittance is approximately 0% is approximately 140 nm. The transmission bands 710A and 710B allow wavelengths other than these to be transmitted.

According to this absorption filter 13-15, for example, as is shown in FIG. 21B, it is possible to form sharp boundaries between the stopband 700 and transmission bands 710A and 710B. As a result, the amount of light transmitted in the transmission bands 710A and 710B can be increased. Furthermore, it is possible to suppress the generation of ripples in the vicinity of the boundaries. Moreover, because the film structure simplifies control of the optical thickness during film formation, it is possible to improve the consistency of the optical characteristics.

Figure 22:
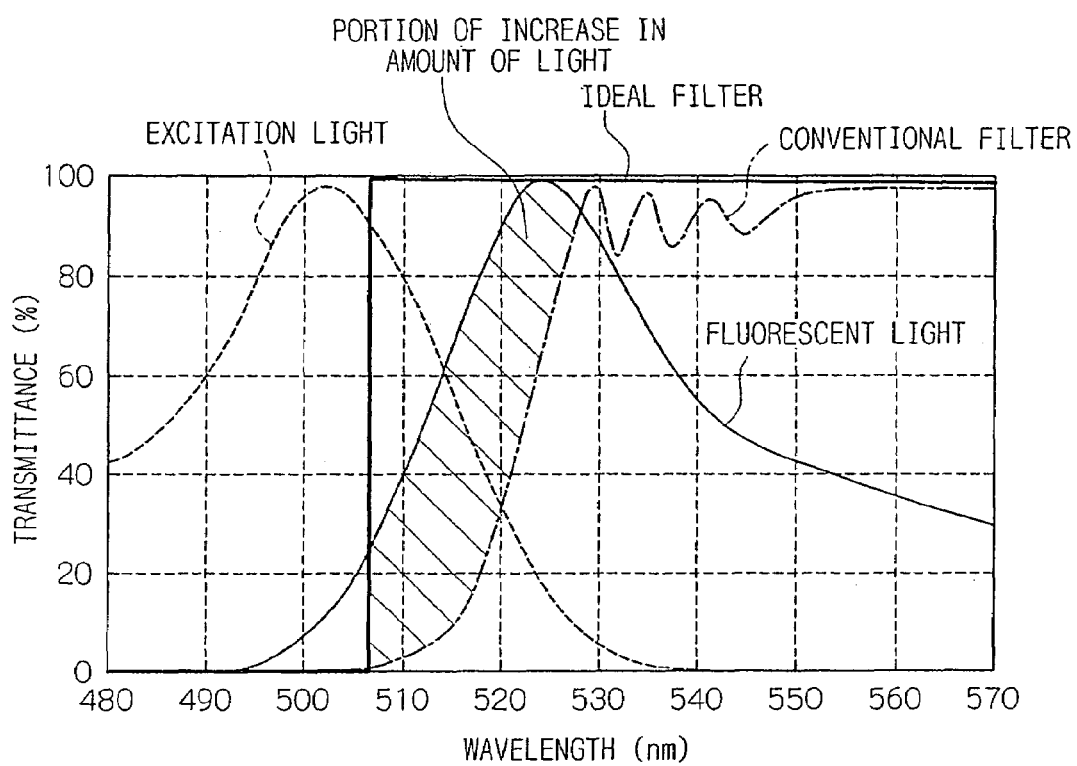
FIG. 22 is a graph showing a relationship between transmittance and a wavelength of the fluorescence microscope of the fifteenth embodiment of the present invention.

Furthermore, as is shown in FIG. 22, the absorption filter 13-15 has optical characteristics that are close to those of an ideal filter. Therefore, if this absorption filter 13-15 is used in the fluorescence microscope 10, the detection sensitivity when measuring fluorescent light can be improved considerably. Namely, in a conventional filter, the transmittance is reduced in wavelength regions that are close to excitation light from among the wavelength regions of fluorescent light. As a result, in the conventional filter, the amount of transmitted fluorescent light is reduced. However, in the filter of the present embodiment, it is possible to transmit the amount of light of these wavelength regions (i.e., the increased portion of the amount of light) at a high transmittance.

As a result, for example, in genome analysis and the like, it is possible to improve analysis accuracy and detection accuracy, and to shorten the observation time.

Moreover, as described above, in the filter of the present embodiment, the refractive indices of the low refractive index layers 20 are laminated as they change. Accordingly, it is possible to suppress loss at boundaries between the substrate 18 and the thin film 500. As a result, it is possible to further improve the amount of light transmitted in the transmission bands 710A and 710B.

Figures 23A, 23B:
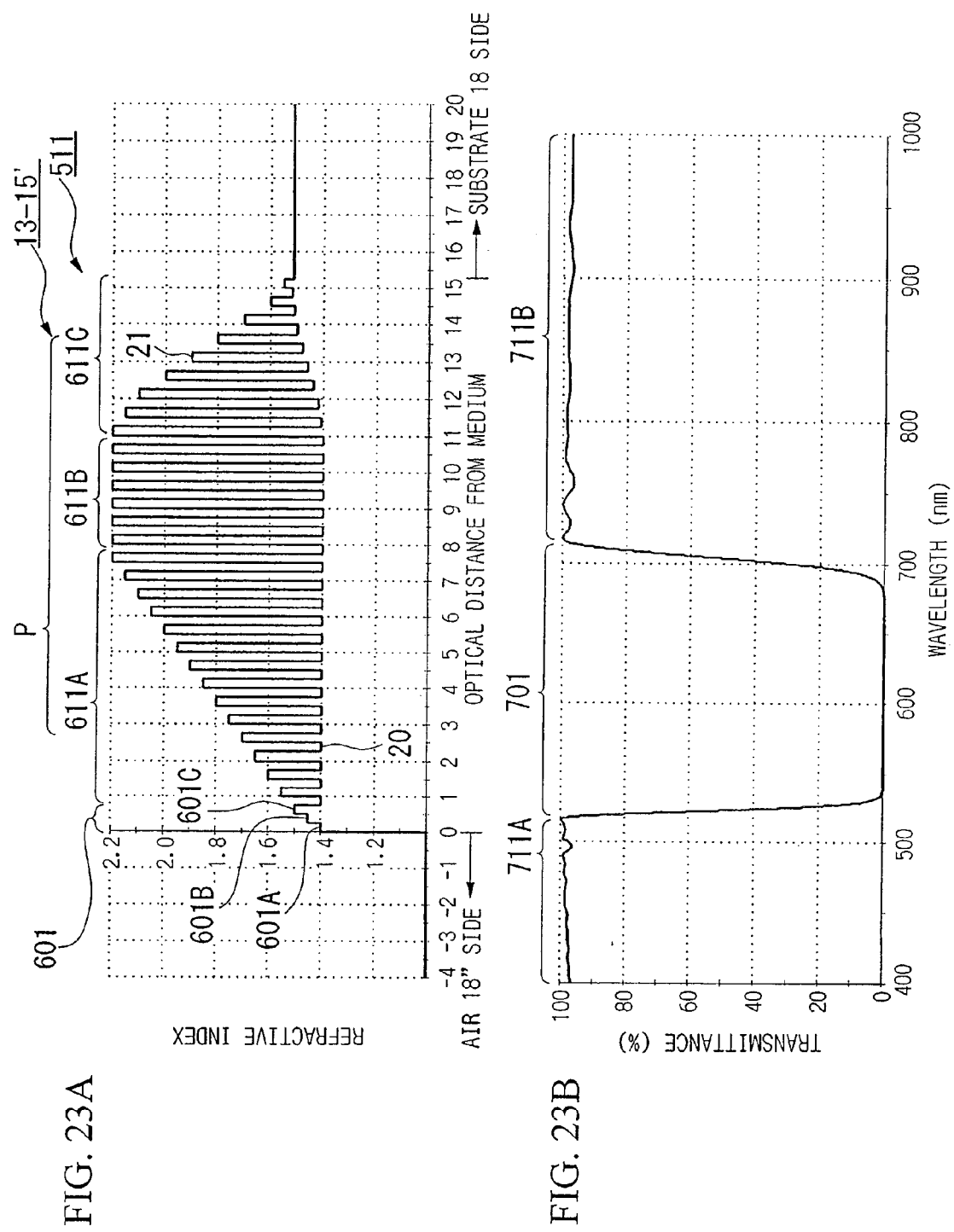
FIGS. 23A and 23B are graphs showing a film structure and spectral characteristics of an absorption filter in another example of the fifteenth embodiment of the present invention.
Figure 24A:
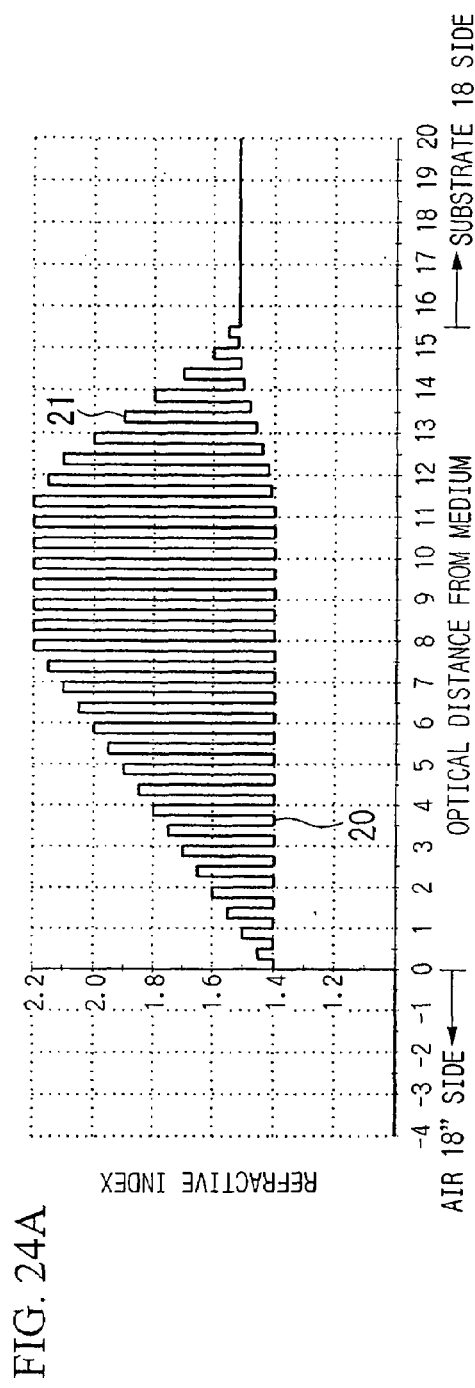
FIGS. 24A and 24B are graphs showing a film structure and spectral characteristics of a conventional absorption filter.
Figure 24B:
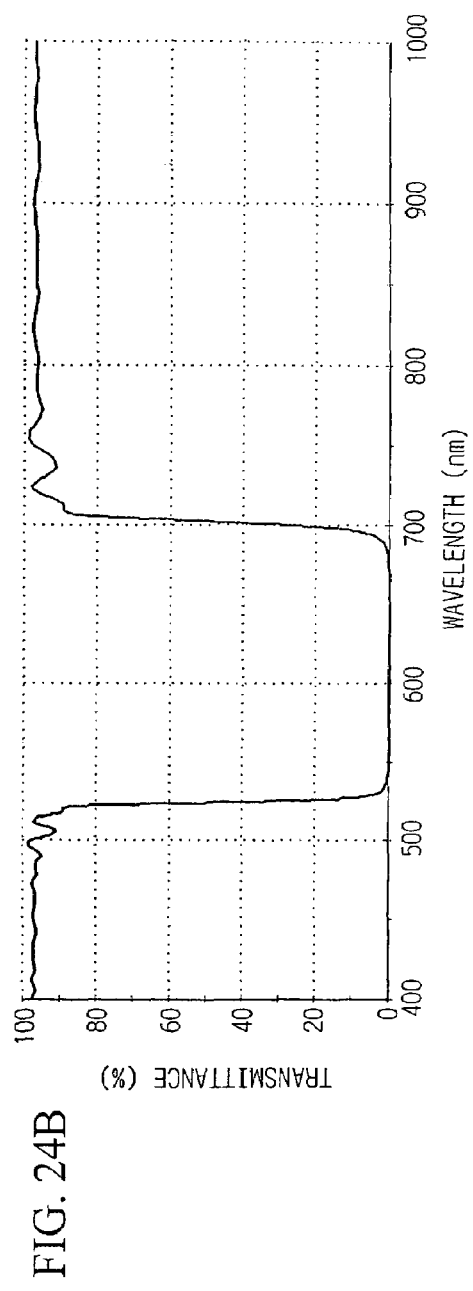

Note that the absorption filter may also be formed like the absorption filter 13-15' shown in FIG. 23A. Here, the refractive index profile of the thin film 511 is changed. Specifically, in the first laminated portion 611A, the total number of laminated layers is increased from 12 to 28. As a result, the rate of change of the high refractive index layers 21 is a more gently sloping rate of change than that of the first laminated portion 610A shown in FIG. 21A. As is shown in FIG. 23B, it is possible to obtain substantially the same spectral transmittance characteristics as those shown in FIG. 21B even when this type of structure is employed. Namely, it is possible to form a stopband 20 that is provided with the same central wavelength and bandwidth as that shown in FIG. 21B. FIG. 24A and FIG. 24B are comparative examples. In FIG. 24A, the outermost layer portion 601 is not provided. In this comparative example, ripples are generated in the vicinity of the boundaries. Compared with the case shown in FIG. 24A, in the absorption filter shown in FIG. 23A, the same operation and effects as those shown in FIG. 21A can be obtained.

Figures 25A, 25B:
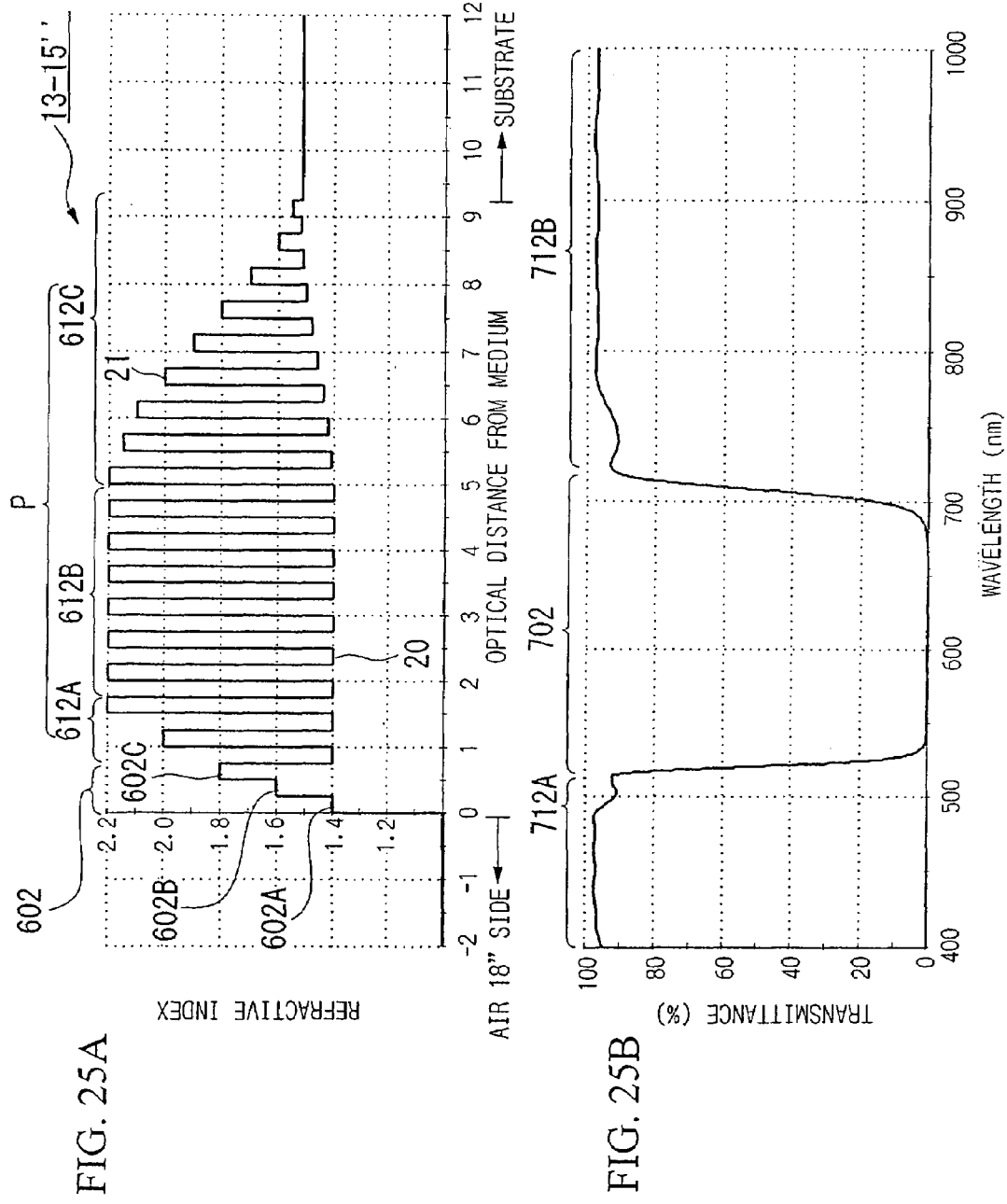
FIGS. 25A and 25B are graphs showing a film structure and spectral characteristics of an absorption filter in another example of the fifteenth embodiment of the present invention.
Figure 26A:
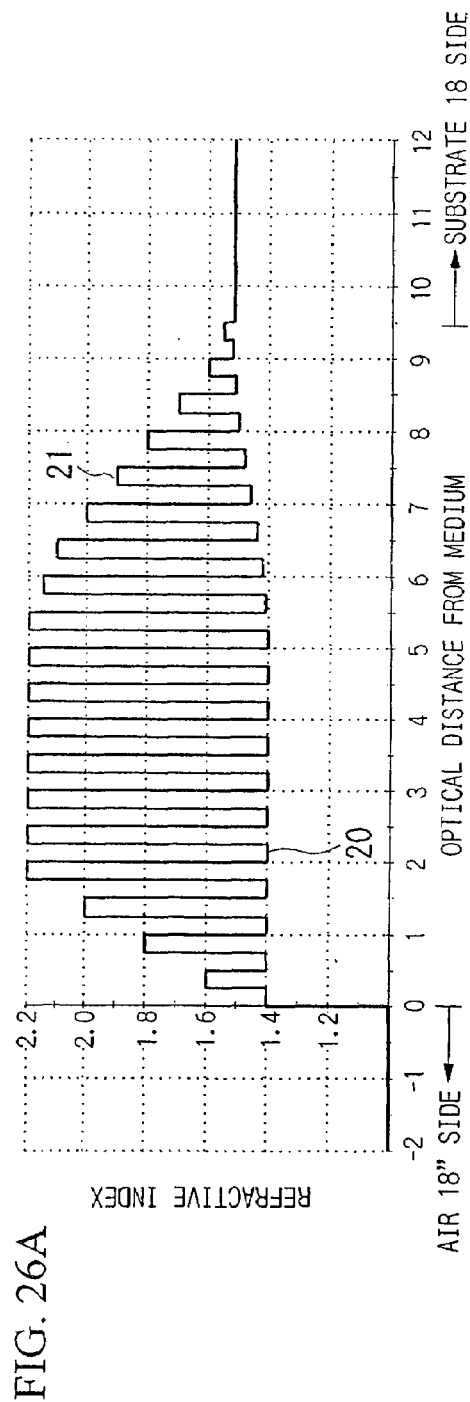
FIGS. 26A and 26B are graphs showing a film structure and spectral characteristics of a conventional absorption filter.
Figure 26B:
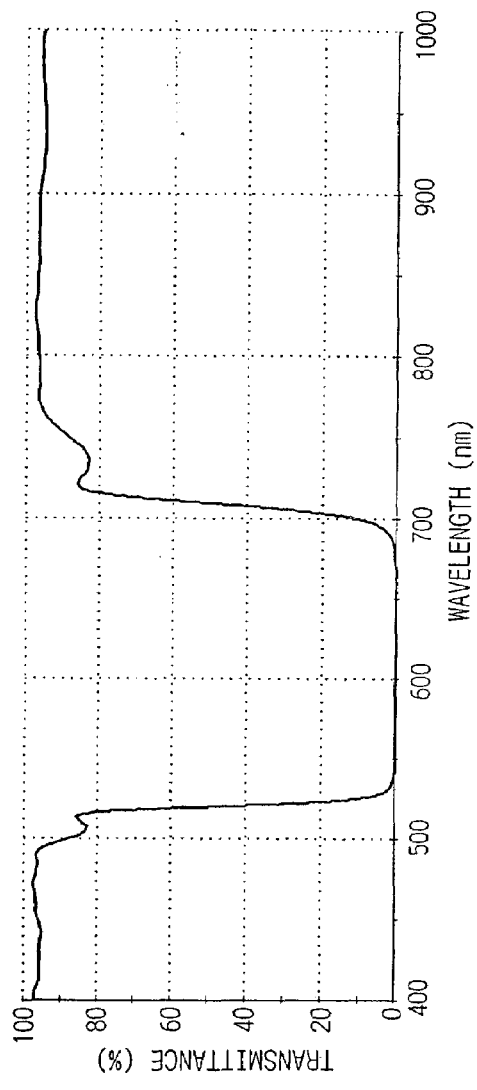

Note that the absorption filter may also be formed like the absorption filter 13-15" shown in FIG. 25A. Here, a different refractive index profile P is formed. Specifically, the total number of laminated layers of the first laminated portion 612A is decreased from 12 to 4. As a result, the rate of change of the high refractive index layers 21 is a more abruptly sloping rate of change than that of the first laminated portion 18A shown in FIG. 21A. As is shown in FIG. 25B, it is possible to obtain substantially the same spectral transmittance characteristics as those shown in FIG. 21B even when this type of structure is employed. FIG. 26A and FIG. 26B are comparative examples in which the outermost layer portion 15 is not provided. In this comparative example as well, ripples are generated in the vicinity of the boundaries. Compared with the case shown in FIG. 26A, in the absorption filter shown in FIG. 25A, the same operation and effects as those shown in FIG. 21A can be obtained.

Next, the sixteenth embodiment of the present invention will be described with reference made to FIG. 27A. Note that, in the description given below, component elements that are the same as those in the above described embodiments are given the same symbols and a description thereof is omitted.

The sixteenth embodiment differs from the fifteenth embodiment in the following points. Namely, in the fifteenth embodiment, there is only one refractive index profile in the substrate 18, however, in the sixteenth embodiment there are two refractive index profiles in the substrate 18. Specifically, as a refractive index profile P, the thin film 510 of the absorption filter 13-16 is provided with a first refractive index profile P1 and a second refractive index profile P2. In addition, laminated portions having these profiles are laminated adjacent to each other in sequence approaching the substrate 18 side.

Figures 27A, 27B:
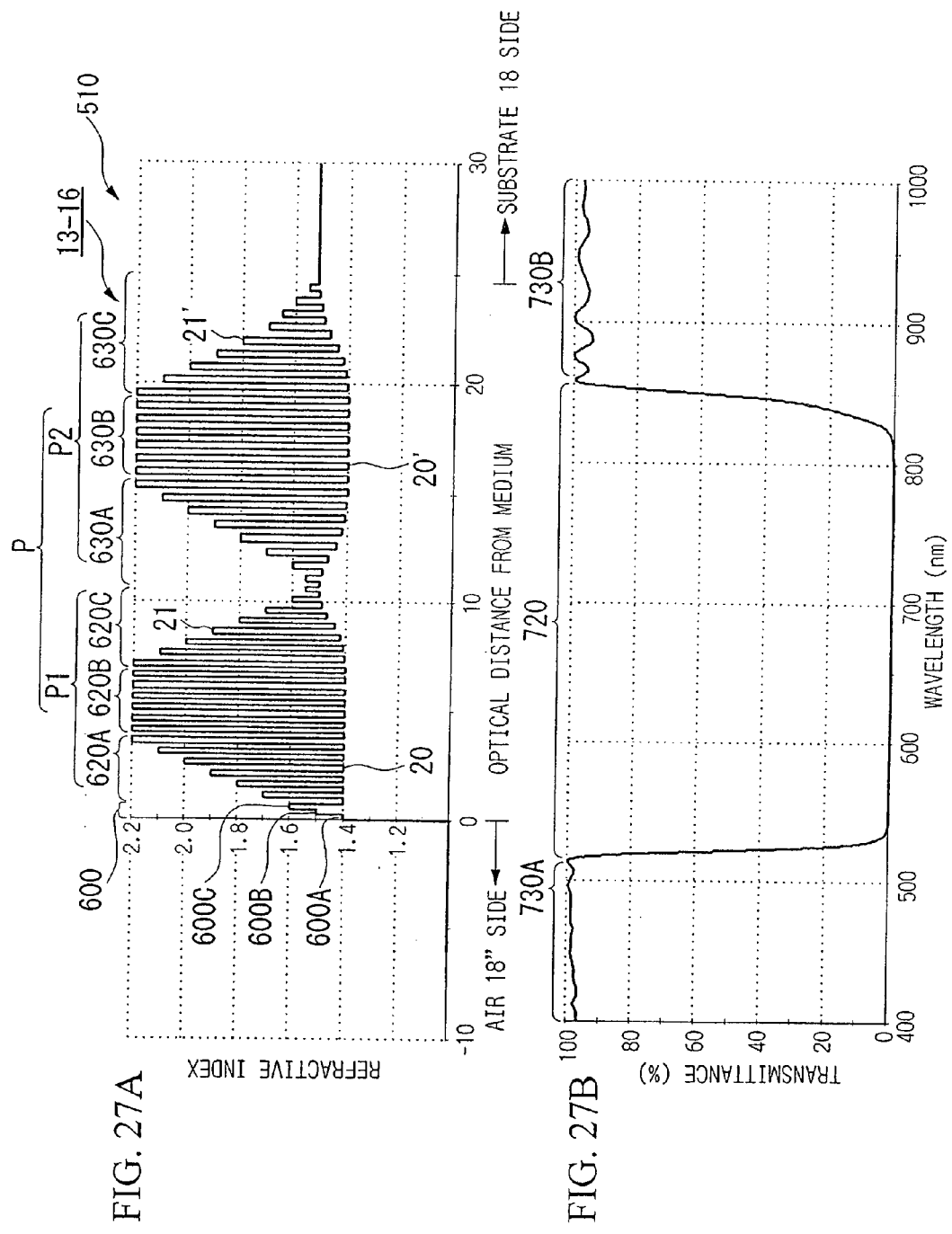
FIGS. 27A and 27B are graphs showing a film structure and spectral characteristics of an absorption filter in a sixteenth embodiment of the present invention.

Namely, in the thin film 510, as is shown in FIG. 27A, a laminated portion having the second refractive index profile P2 is laminated on the substrate 18. A laminated portion having the first refractive index profile P1 is then laminated on top of that, and an outermost layer portion 600 is then further laminated on top of that.

Moreover, the optical thicknesses of each layer in the outermost layer portion 600 and the optical thicknesses of each layer in the first refractive index profile P1 are different from the optical thicknesses of each layer in the second refractive index profile P2. Note that the term "each layer in the first refractive index profile P1" refers to the high refractive index layers 21 and the low refractive index layers 20. In addition, the term "each layer in the second refractive index profile P2" refers to the high refractive index layers 21' and the low refractive index layers 20'.

In the present embodiment, the refractive index of the substrate 18 is 1.52, which is the same as in the fifteenth embodiment. In addition, the first refractive index profile P1 is represented by a first laminated portion 620A, a second laminated portion 620B, and a third laminated portion 620C. Note that the first refractive index profile P1 is the same as the refractive index profile P in the fifteenth embodiment. Namely, the refractive indices of the first laminated portion 620A, the second laminated portion 620B, and the third laminated portion 620C are the same as those of the first laminated portion 610A, the second laminated portion 610B, and the third laminated portion 610C.

The second refractive index profile P2 is represented by a first laminated portion 630A, a second laminated portion 630B, and a third laminated portion 630C. Here, in the first laminated portion 630A and the third laminated portion 630C, the refractive indices of the low refractive index layers 20' change between less than 1.52 and 1.4. In addition, in the second laminated portion 630B, the refractive indices of the low refractive index layers 20' are set to 1.4. Moreover, in the second laminated portion 630B, the refractive indices of the high refractive index layers 21' are changed between 1.52 and 2.2.

In the thin film 510 of the present embodiment, the total number of laminated layers is 89. This number is the total number from the substrate 18 to the outermost low refractive index layer 600A of the outermost layer portion 600. The design wavelength is 600 nm. The optical thicknesses of each layer in the first refractive index profile P1 are 0.25 times the design wavelength. The optical thicknesses of each layer in the second refractive index profile P2 are 0.3 times the design wavelength.

In the simulation, there is no refractive index dispersion in the respective layers of the thin film 510. The results of the simulation using these parameters and conditions are shown in FIG. 27B.

This absorption filter 13-16 is provided with a stopband 720 and transmission bands 730A and 730B. In the stopband 720, the central wavelength where transmission is obstructed is substantially 680 nm. In addition, in the stopband 720, the bandwidth where transmittance is substantially 0% is approximately 280 nm. The transmission bands 730A and 730B allow light of wavelengths other than these to pass through.

Figures 28A, 28B:
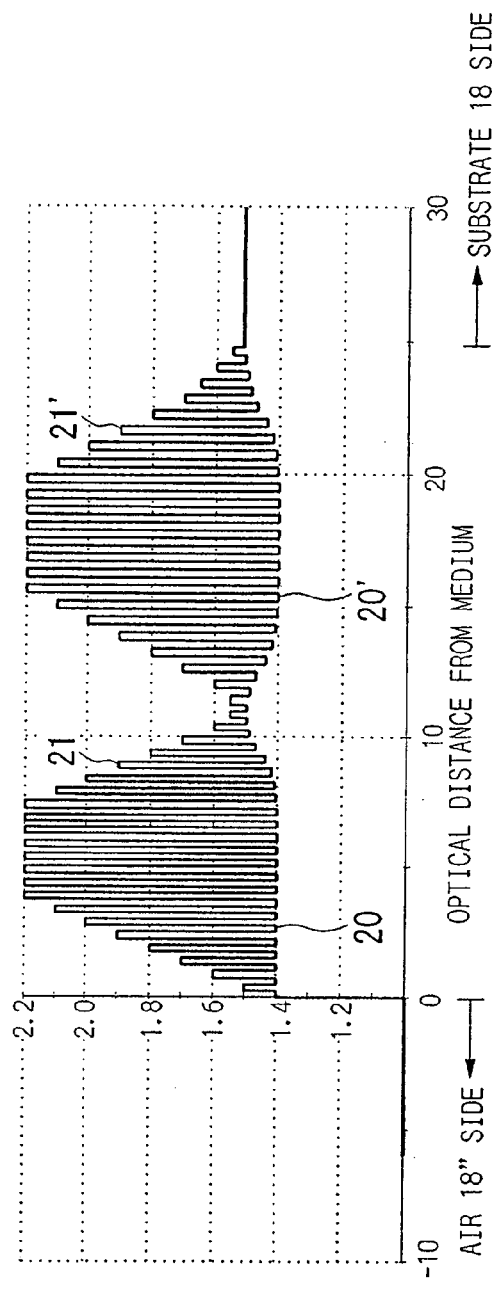
FIGS. 28A and 28B are graphs showing a film structure and spectral characteristics of a conventional absorption filter.

FIG. 28A and FIG. 28B show a case in which the outermost layer portion 600 is not provided. As can be seen in a comparison with FIG. 28A, according to the absorption filter 13-16 of the present embodiment, in the same way as in the first embodiment, it is possible to reduce ripples in the fluorescent light transmission bands 730A and 730B. In addition, according to this absorption filter 13-16, it is possible to consistently obtain a sufficient amount of light. Moreover, it is also possible to change the optical thicknesses of each layer between the outermost layer portion 600 and first refractive index profile P1 and the second refractive index profile P2. By employing this type of structure, the position of the central wavelength of the stopband 720 can be moved to an optional position. In addition to this, the width of the stopband 720 can be set to an optional size.

Next, the 17th embodiment of the present invention will be described with reference made to FIG. 29A. Note that, in the description given below, component elements that are the same as those in the fifteenth embodiment are given the same symbols and a description thereof is omitted.

The seventeenth embodiment differs from the fifteenth embodiment in the following point. Namely, in that, in the absorption filter 13-17 of the seventeenth embodiment, the refractive indices of each layer of an outermost layer portion 640 of a thin film 520 and of each layer in a refractive index profile P are different from those in the fifteenth embodiment.

Figures 29A, 29B:
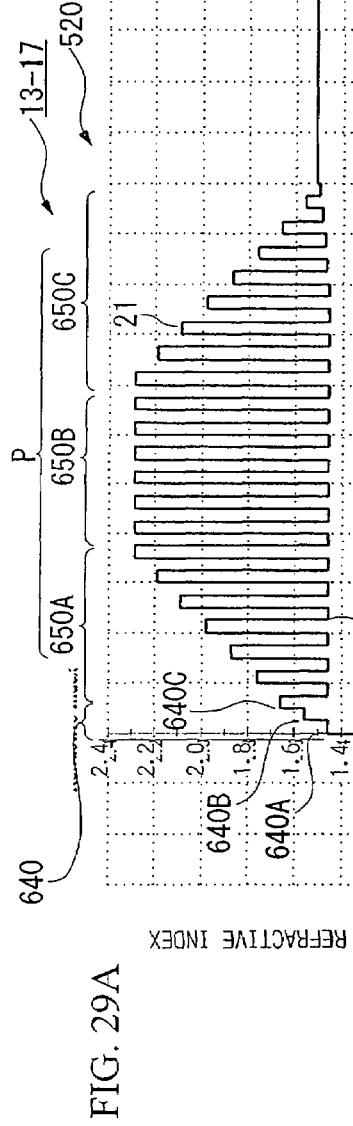
FIGS. 29A and 29B are graphs showing a film structure and spectral characteristics of an absorption filter in another example of a seventeenth embodiment of the present invention.

Namely, in the present embodiment, as is shown in FIG. 29A, in the outermost layer portion 640, the refractive index of the outermost low refractive index layer 640A is set to 1.46, the refractive index of the first outermost high refractive index layer 640B is set to 1.56, and the refractive index of the second outermost high refractive index layer 640C is set to 1.66.

Moreover, in a first laminated portion 650A, the refractive indices of the high refractive index layers 21 are changed from 1.76 to 2.29. In addition, in a third laminated portion 650C, the refractive indices of the high refractive index layers 21 are changed from 1.52 to 2.29. In the first laminated portion 650A and the second laminated portion 650B, the refractive indices of the low refractive index layers 20 are set to 1.46. In the third laminated portion 650C, the refractive indices of the low refractive index layers 20 are changed between 1.46 and less than 0.1.52.

In this thin film 520, the total number of laminated layers is 44. This number is the total number of layers from the substrate 18 side to the outermost low refractive index layer 640A of the outermost layer portion 640. The design wavelength is 600 nm. The optical thicknesses of each layer are 0.25 times the design wavelength.

Here, the low refractive index layers 20 are mainly formed from silicon oxide, while the high refractive index layers 21 are mainly formed from titanium oxide.

In the simulation, there is no refractive index dispersion in the respective layers of the thin film 520. The results of the simulation using these parameters and conditions are shown in FIG. 29B.

This absorption filter 13-17 is provided with a stopband 750 and transmission bands 750A and 750B. In the stopband 750, the central wavelength where transmission is obstructed is substantially 610 nm. In addition, in the stopband 750, the bandwidth where transmittance is substantially 0% is approximately 140 nm. The transmission bands 750A and 750B allow light of wavelengths other than these to pass through.

Figure 30A:
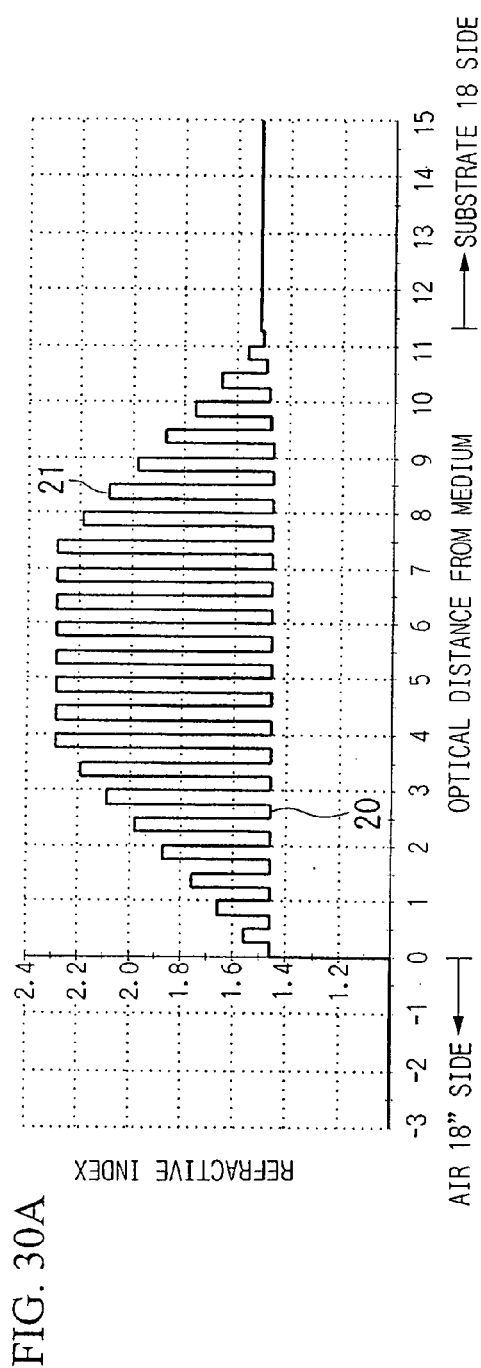
FIGS. 30A and 30B are graphs showing a film structure and spectral characteristics of a conventional absorption filter.
Figure 30B:
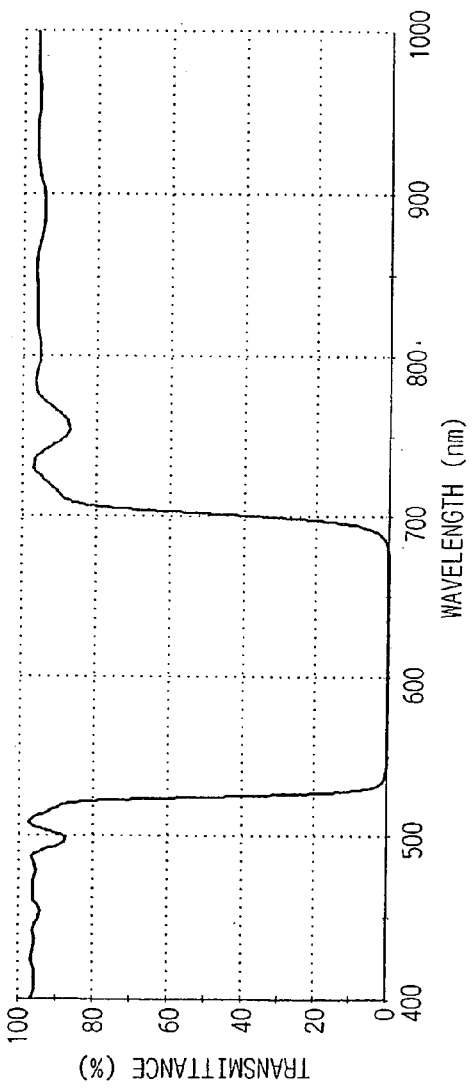

FIG. 30A and FIG. 30B show a case in which the outermost layer portion 640 is not provided. As can be seen in a comparison with FIG. 30A, according to this absorption filter 13-17, the same operation and effects as those obtained in the first embodiment can be obtained when the refractive indices of each layer are different from the refractive indices in the fifteenth embodiment. Namely, according to this absorption filter 13-17 as well, it is possible to reduce ripples in the transmission bands 750A and 750B.

Moreover, compared with the constituent materials of each layer in the fifteenth embodiment, because the constituent materials of the present embodiment are easily applied to spattering, the degree of freedom in the film formation process can be increased.

Figures 31A, 31B:
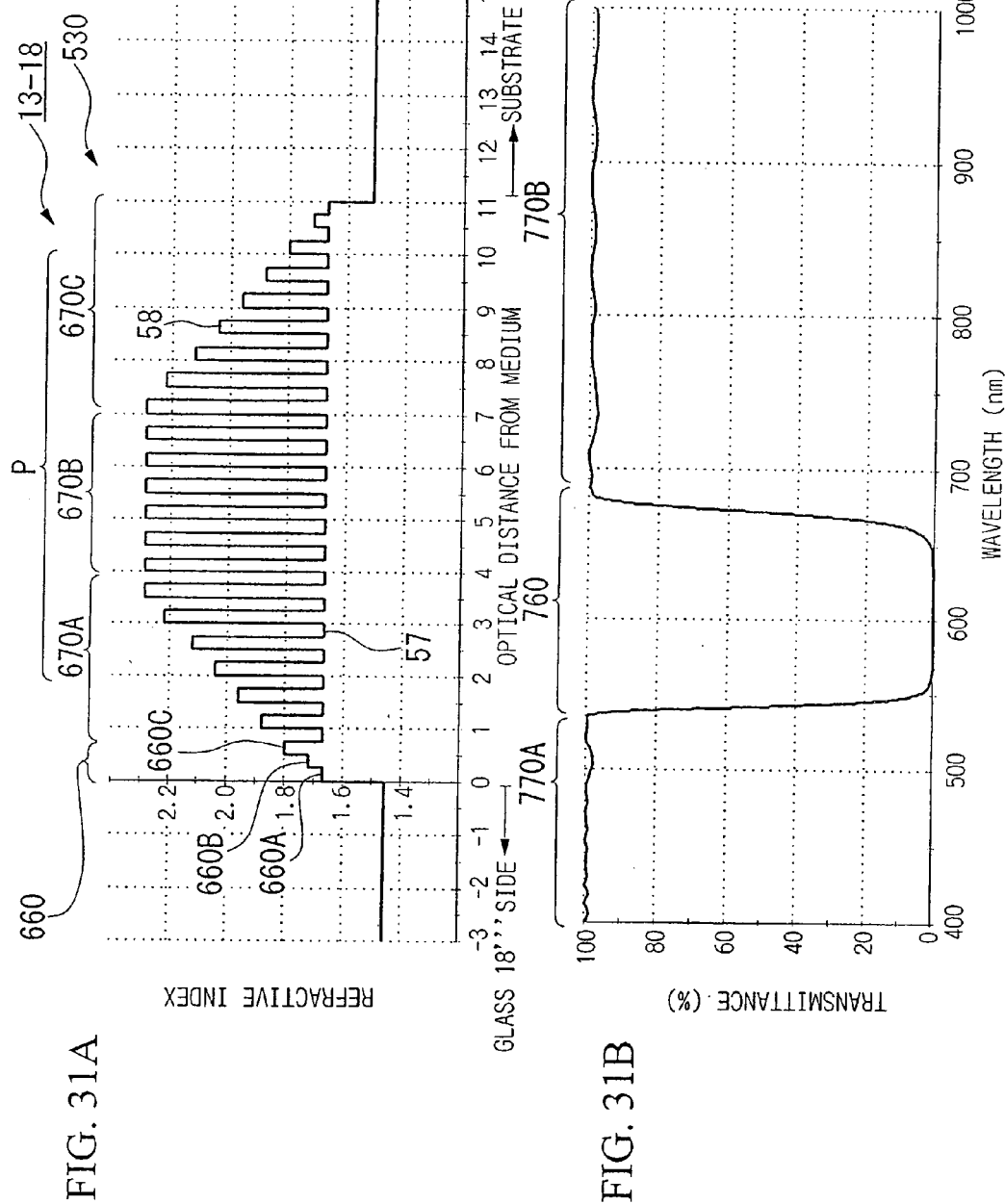
FIGS. 31A and 31B are graphs showing a film structure and spectral characteristics of an absorption filter in an eighteenth embodiment of the present invention.

Next, the eighteenth embodiment of the present invention will be described with reference made to FIG. 31A. Note that, in the description given below, component elements that are the same as those in the above described embodiments are given the same symbols and a description thereof is omitted.

The eighteenth embodiment differs from the seventeenth embodiment in the following point. Namely, as is shown in FIG. 31A, in the thin film 530 of the absorption filter 13-18 of the eighteenth embodiment, the outermost layer portion 660 is not in contact with air 13, but is in contact with glass (i.e., an optical medium) 18''' having a refractive index of 1.46.

In addition, in the present embodiment, the difference with the refractive index of the glass 18''' is clearly evident. Therefore, in an outermost low refractive index layer 660A and in a first laminated portion 670A and second laminated portion 670B, the refractive indices of the low refractive index layers 20 are set to 1.67. In addition, in a third laminated portion 670C, the refractive indices of the low refractive index layers 20 are changed between 1.67 and 2.29.

Furthermore, the refractive index of a first outermost high refractive index layer 660B is set to 1.72, and the refractive index of a second outermost high refractive index layer 660C is set to 1.8. In addition, in the first laminated portion 670A, the refractive indices of the high refractive index layers 21 are changed between 1.8 and 2.29.

In the thin film 530, the total number of laminated layers is 44. This number is the total number of layers from the substrate 18 side to the outermost low refractive index layer 660A of the outermost layer portion 660. The design wavelength is 600 nm. The optical thicknesses of each layer are 0.25 times the design wavelength.

Here, the outermost low refractive index layer 660A and the low refractive index layers 20 are mainly formed from alumina.

In the simulation, there is no refractive index dispersion in the respective layers of the thin film 530. The results of the simulation using these parameters and conditions are shown in FIG. 31B.

This absorption filter 13-18 is provided with a stopband 760 and transmission bands 770A and 770B. In the stopband 760, the central wavelength is substantially 610 nm. In addition, in the stopband 760, the bandwidth where transmittance is substantially 0% is approximately 90 nm. The transmission bands 770A and 770B allow light of wavelengths other than these to pass through.

Figure 32A:
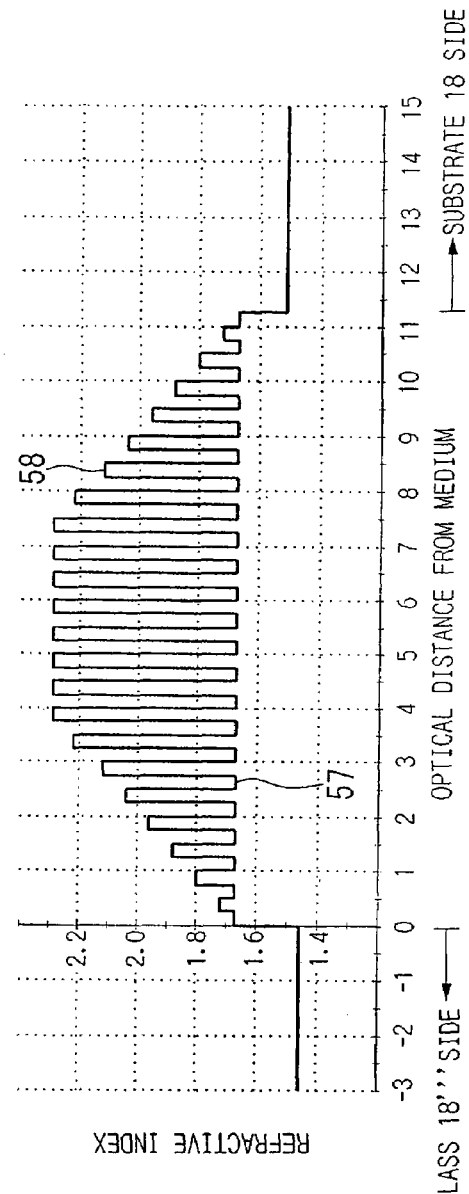
FIGS. 32A and 32B are graphs showing a film structure and spectral characteristics of a conventional absorption filter.
Figure 32B:
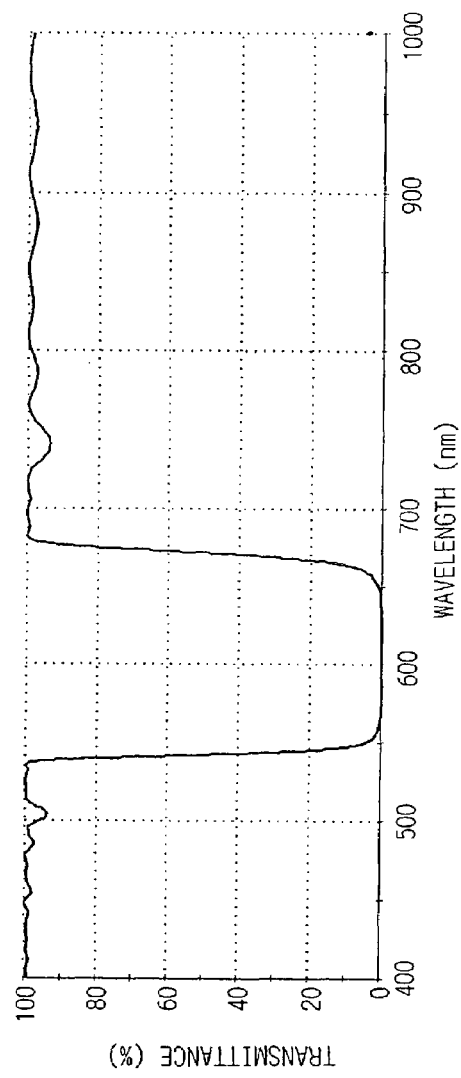
Figure 33A:
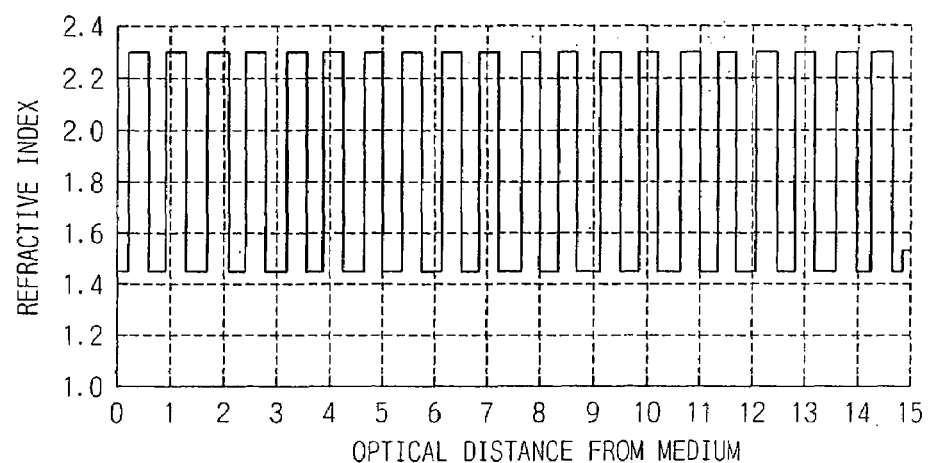
FIGS. 33A and 33B are graphs showing a film structure and spectral characteristics of a conventional absorption filter.
Figure 33B:
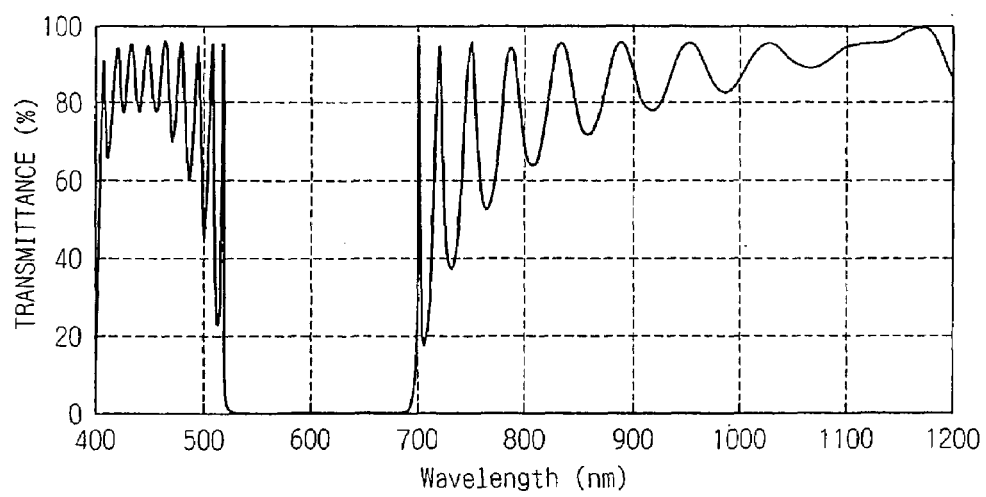
Figure 34A:
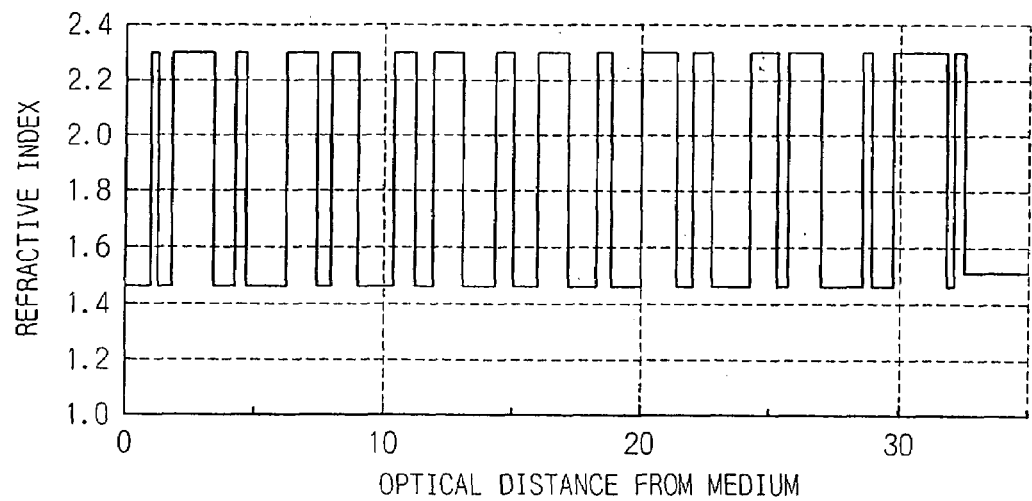
FIGS. 34A and 34B are graphs showing a film structure and spectral characteristics of a conventional absorption filter.
Figure 34B:
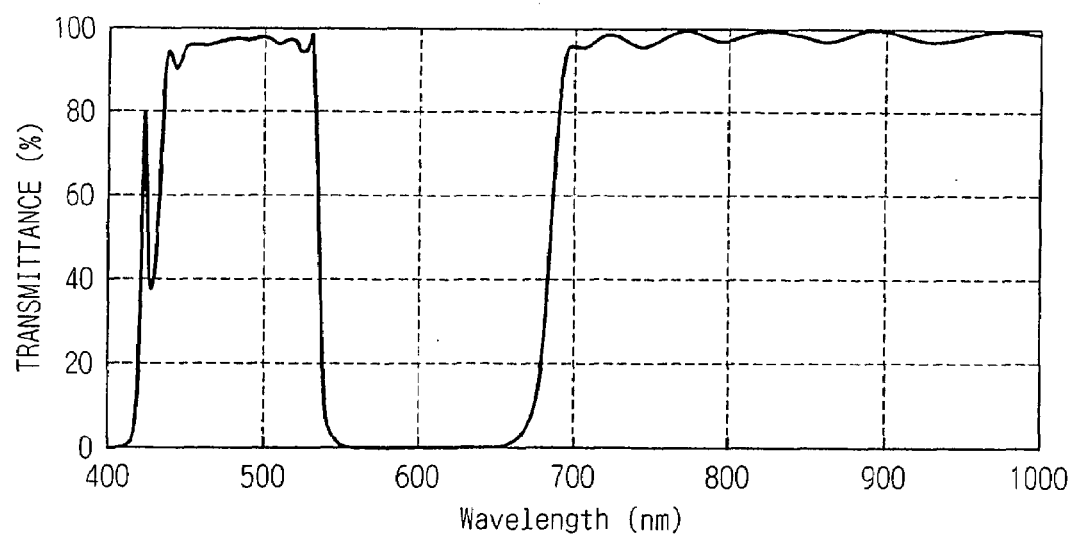
Figure 35A:
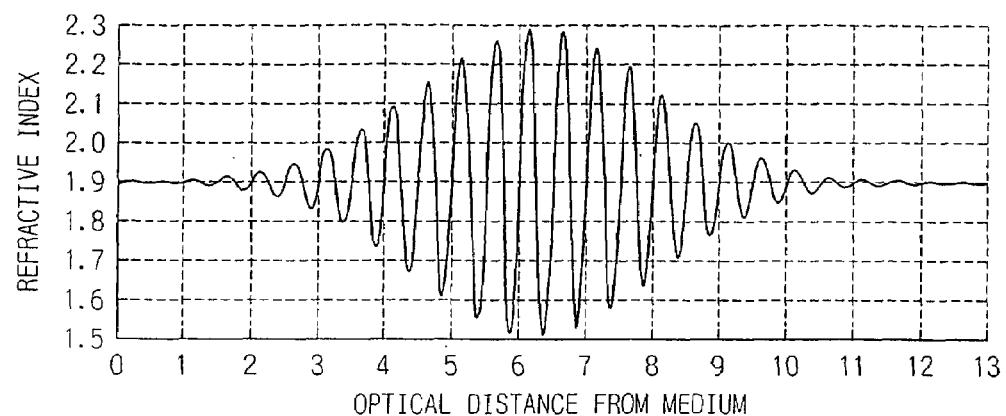
FIGS. 35A and 35B are graphs showing a film structure and spectral characteristics of a conventional absorption filter.
Figure 35B:
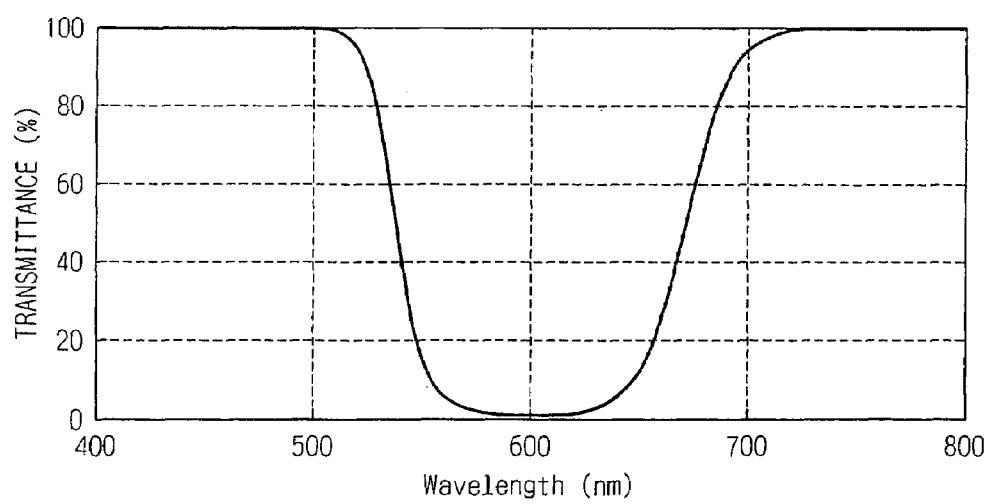
Figure 36A:
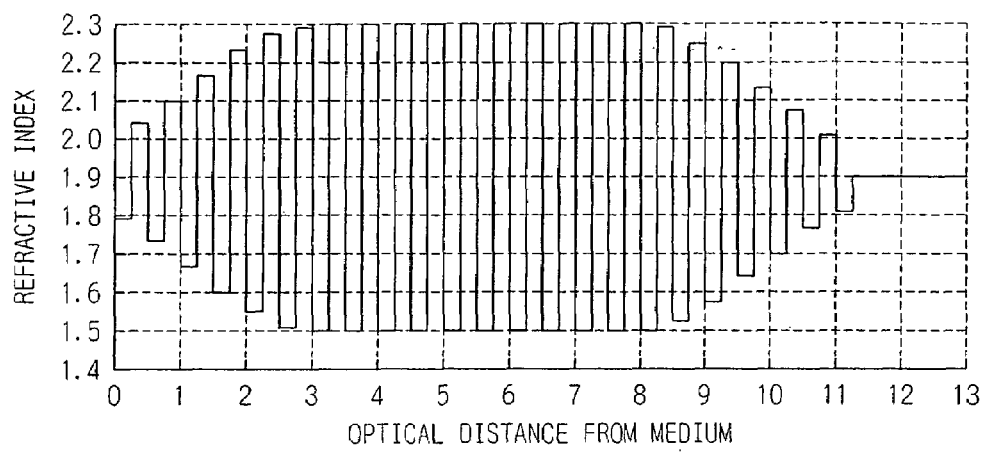
FIGS. 36A and 36B are graphs showing a film structure and spectral characteristics of a conventional absorption filter.
Figure 36B:
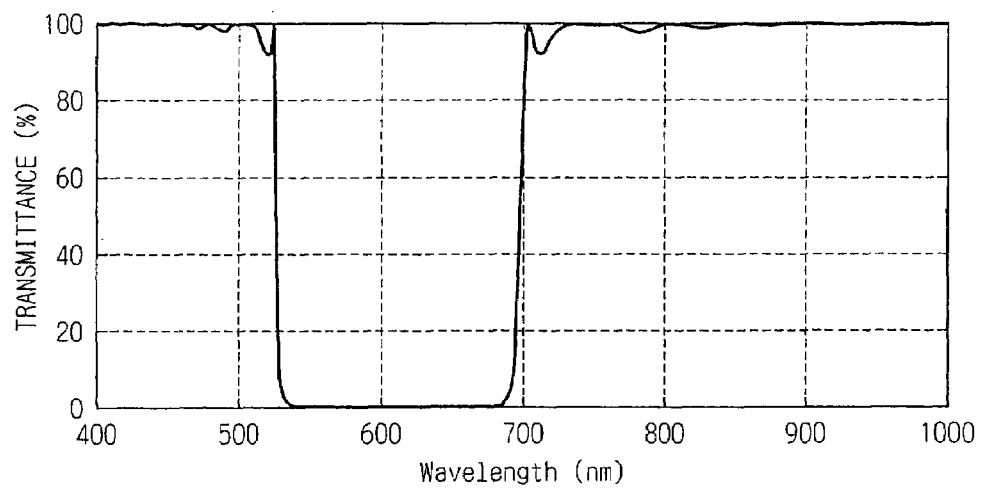
Figure 37A:
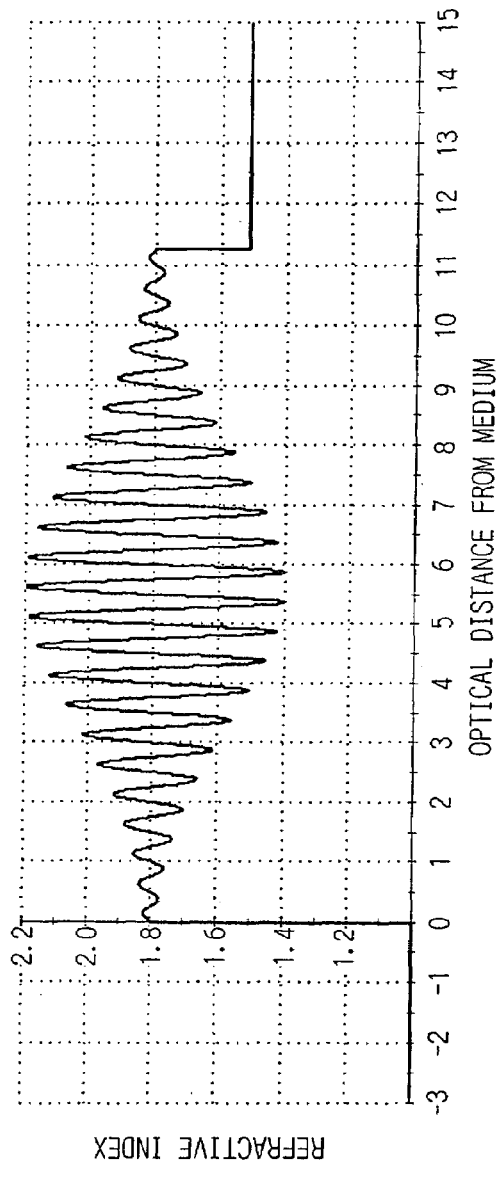
FIGS. 37A and 37B are graphs showing a film structure and spectral characteristics of a conventional absorption filter.
Figure 37B:
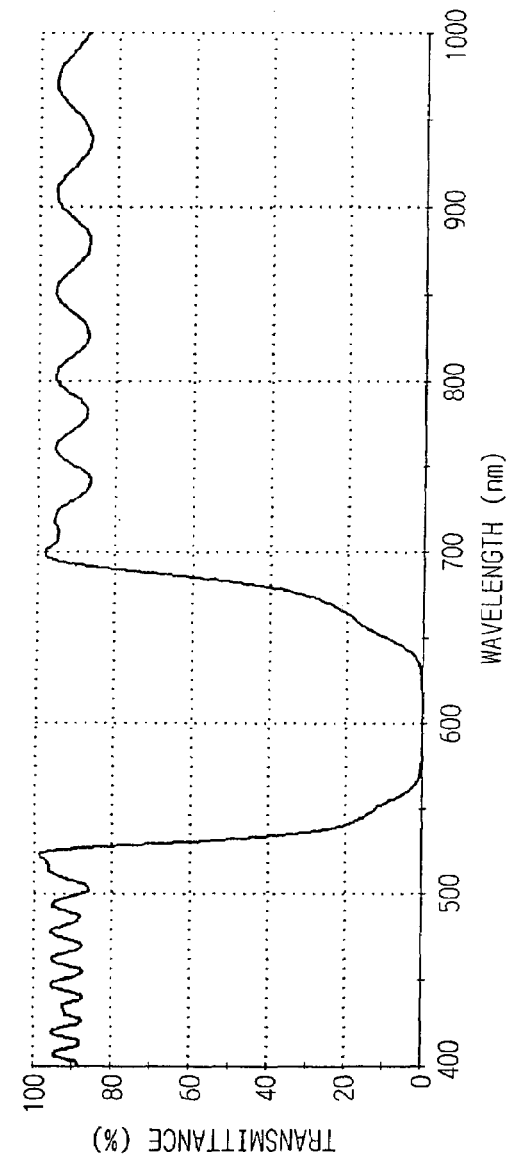
Figure 38A:
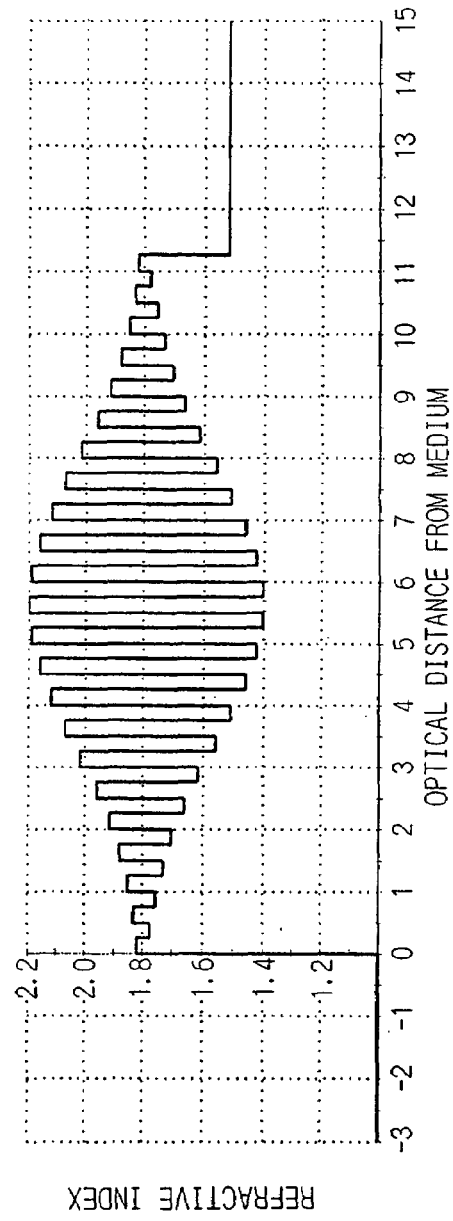
FIGS. 38A and 38B are graphs showing a film structure and spectral characteristics of a conventional absorption filter.
Figure 38B:
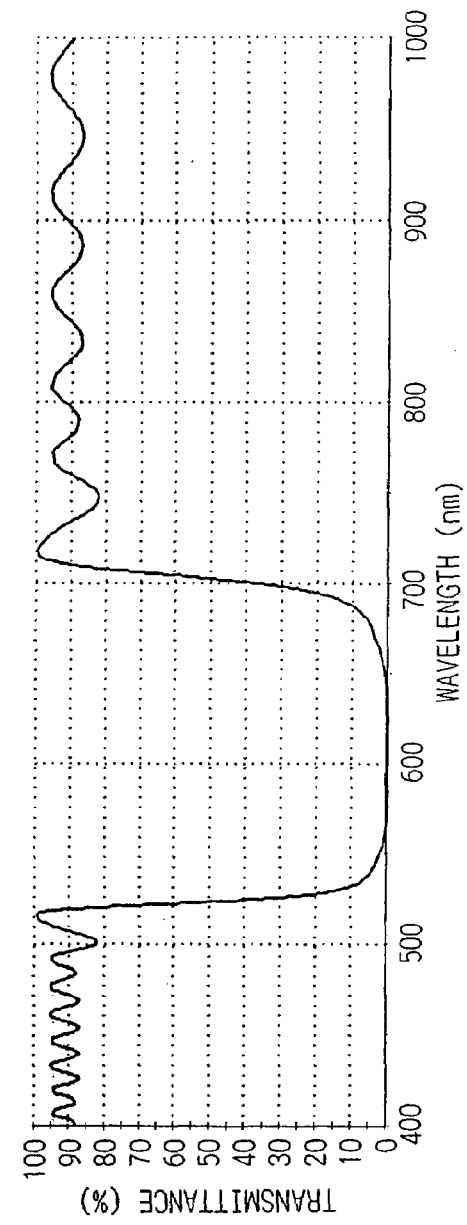

FIG. 32A and FIG. 32B show a case in which the outermost layer portion 660 is not provided. As can be seen in a comparison with FIG. 32A, according to this absorption filter 13-18, the same operation and effects as those obtained in the seventeenth embodiment can be obtained even if the outermost layer portion 660 is in contact with an optical medium other than air such as the glass 18'''.

Note that the technological range of the present invention is not limited by the above described embodiments, and various modifications can be made without departing from the spirit or scope of the present invention.

For example, the central wavelength ($\lambda$) is not limited to 600 nm, and by appropriately changing the value of $\lambda$ in accordance with the wavelength of the excitation light and the wavelength of the fluorescent light to be detected, it is possible to obtain the desired spectral characteristics.

In addition, the material of the substrate is not limited to glass, and plastic may also be used.

What is claimed is:

1. An optical filter provided with a substrate and a thin film that is formed on the substrate, wherein
   the thin film has an outermost layer portion that is in contact with an optical medium whose refractive index is lower than the refractive index of the substrate, and has laminated portions having predetermined refractive profiles, and wherein
   the refractive index profiles are formed by laminating low refractive index layers alternatingly with high refractive index layers approaching the substrate side, and wherein
   the refractive indices of the low refractive index layers is higher than the refractive index of the optical medium, and
   the refractive indices of the high refractive index layers is relatively higher than the refractive index of the low refractive index layers, and wherein
   the outermost layer portion is provided with an outermost low refractive index layer, a first outermost high refractive index layer that is laminated on the outermost low refractive index layer, and a second outermost high refractive index layer that is laminated on the first outermost high refractive index layer, and wherein
   the refractive index of the outermost low refractive index layer is higher than the refractive index of the optical medium,
   the refractive index of the first outermost high refractive index layer is higher than the refractive index of the outermost low refractive index layer, and
   the refractive index of the second outermost high refractive index layer is higher than the refractive index of the first outermost high refractive index layer, and wherein
   the refractive index profile is represented by a first laminated portion that is laminated on the outermost layer portion side, a second laminated portion that is laminated on the substrate side of the first laminated portion, and a third laminated portion that is laminated on the substrate side of the second laminated portion, and wherein
   in the first laminated portion, the refractive indices of the high refractive index layers are higher than the second outermost high refractive index layer, and become gradually higher approaching the substrate side,
   in the second laminated portion, the refractive indices of the high refractive index layers are substantially equal to the highest refractive index of the high refractive index layers constituting the first laminated portion, and
   in the third laminated portion, the refractive indices of the high refractive index layers become gradually lower approaching the substrate side.

2. The optical filter according to claim 1, wherein a plurality of laminated portions having the refractive index profiles are laminated adjacent to each other approaching the substrate side,
   when any two of the plurality of the refractive index profiles are taken as the first refractive index profile and the second refractive index profile, at least one of an optical thickness of the high refractive index layers in the first refractive index profile, an optical thickness of the low refractive index layers in the first refractive index profile, an optical thickness of the high refractive index layers in the second refractive index profile, and an optical thickness of the low refractive index layers in the second refractive index profile is different from the others.

3. The optical filter according to claim 1, wherein
   in the first laminated portion and the second laminated portion, the refractive indices of the low refractive index layers are substantially the same as the refractive index of the outermost low refractive index layer, and
   in the third laminated portion, the refractive indices of the low refractive index layers become gradually higher approaching the substrate side until reaching the refractive index of the substrate.

4. An optical instrument provided with the optical filter according to claim 1.

* * * * *